United States Patent [19]

Davis et al.

[11] Patent Number: 4,561,059

[45] Date of Patent: Dec. 24, 1985

[54] MICROPROCESSOR CONTROLLED WELDING APPARATUS

[75] Inventors: Clint A. Davis, League City; Melvin P. Trail, Houston, both of Tex.

[73] Assignee: Beckworth Davis International, Inc., Houston, Tex.

[21] Appl. No.: 469,519

[22] Filed: Feb. 24, 1983

[51] Int. Cl.[4] .................. G06F 15/46; B23K 9/20
[52] U.S. Cl. .................. 364/477; 219/130.21; 219/130.33; 219/137 R; 901/42
[58] Field of Search ................. 364/477, 513; 219/121 EA, 121 EM, 124.02, 124.03, 130.1, 130.21, 130.33, 130.5, 137 R, 137 PS; 901/42

[56] References Cited

U.S. PATENT DOCUMENTS

| | | | |
|---|---|---|---|
| 3,883,714 | 5/1975 | James | 219/131 WR |
| 4,024,371 | 5/1977 | Drake | 219/110 |
| 4,063,075 | 12/1977 | Collom | 364/477 X |
| 4,071,885 | 1/1978 | Bilczo et al. | 219/130.33 X |
| 4,093,844 | 6/1978 | Fellure et al. | 219/124.02 |
| 4,101,753 | 7/1978 | Buff et al. | 219/97 |
| 4,104,724 | 8/1978 | Dix et al. | 364/477 |
| 4,109,130 | 8/1978 | Oku | 219/130.21 |
| 4,241,285 | 12/1980 | Golonka, Sr. et al. | 219/130.32 |
| 4,254,466 | 3/1981 | Jurek | 364/477 |
| 4,280,137 | 7/1981 | Ashida et al. | 358/101 |
| 4,289,948 | 9/1981 | Jurek et al. | 219/110 |
| 4,289,951 | 9/1981 | Jurek | 219/110 |
| 4,301,351 | 11/1981 | Mathews | 219/114 |
| 4,315,129 | 2/1982 | Wilkinson et al. | 219/99 |
| 4,390,954 | 6/1983 | Manning | 364/477 |
| 4,442,339 | 4/1984 | Mizuno et al. | 219/130.33 |
| 4,445,022 | 4/1984 | Muri | 219/130.5 X |
| 4,448,342 | 5/1984 | Abe et al. | 364/477 X |
| 4,456,808 | 6/1984 | Wilkinson et al. | 364/477 X |

FOREIGN PATENT DOCUMENTS

WO82/03033 9/1982 PCT Int'l Appl. .

OTHER PUBLICATIONS

"Recent Developments", Engineering, pp. 304-307 (Apr., 1981).
"Arc Welding: New Equipment, Evolving Technologies", Production pp. 56-61 (Mar., 1978).
"Microcomputers Automate Welding", American Machinist, pp. 95-98 (Oct. 1978).
"Welding In The 1980's", Engineering Materials And Design, pp. 1-6 (Oct., 1980).

Primary Examiner—Jerry Smith
Assistant Examiner—Gary V. Harkcom
Attorney, Agent, or Firm—Arnold, White & Durkee

[57] ABSTRACT

A microprocessor-controlled arc welding power supply is disclosed. A silicon controlled rectifier ("SCR") bank is used to generate a direct current arc welding current under program control. Positive sychronization is provided by the microprocessor using a phase locked loop and a polarity detector, so that the gating signals applied to the SCRs are correctly timed. Optimum tradeoffs between hardware and software are accomplished by using look up tables to store correction factors that can be quickly accessed during execution, and by using timers as smart interface chips to fire the SCRs at the same angle during each cycle until changed or updated by the microprocessor. The arc welding power supply is capable of operating in a constant current or constant voltage mode without rewiring the circuit.

20 Claims, 13 Drawing Figures (ONE OF SIX IDENTICAL CIRCUITS)

MICROPROCESSOR CONTROLLED WELDING APPARATUS

BACKGROUND OF THE INVENTION

This invention relates to arc welding power supplies, and, more specifically, to an improved apparatus providing a programmable arc welding power supply capable of operating in a constant current mode, constant voltage mode, constant power mode, or other welding modes without hardware reconfiguration, as well as providing great flexibility and capabilities not present in conventional systems.

In the past, it was not possible to use a single arc welding power supply to operate in a constant current mode and also a constant voltage mode without a hardware reconfiguration. A separate arc welding power supply would have to be used for each mode. Precise control of arc welding modes was not practical. The quality of a weld performed with an arc welding mode was dependent upon operator skill, and consistency of welds could be very difficult to obtain.

Some attempts have been made in the past to monitor a weld, sometimes in a crude fashion. For example, U.S. Pat. No. 4,093,844, issued to Fellure et al., represents an attempt to use an optical device to optically sense an arc, which is a crude way to monitor an arc welding procedure. Efforts to control arc length by optical scanning have been less than satisfactory. It is hardly possible to maintain a constant voltage during arc welding, or to maintain a constant current during arc welding, using nothing more than optical scanning to monitor the weld.

In the past, attempts have been made to tap the primary of the transformer used in a welding power supply. For example, U.S. Pat. No. 4,024,371, issued to Drake, represents an attempt to simply monitor a weld, and to measure the power factor on the primary of the transformer. The impedance of the weld is monitored. A computer is proposed to monitor the weld, compute statistical information concerning the weld, and if the impedance value measured for the weld is outside certain user defined limits, the computer may indicate to an operator that the weld should be rejected. The Drake device is limited to use in connection with a pulse type welder. Drake proposes the use of a timing circuit and a clock circuit which generates pulses which are counted as a means for timing a period which is assumed to be sufficient for a particular welding procedure. The technique of counting pulses in a pulse welder or resistance welder is an unsatisfactory means for controlling power output in an arc welding device.

Others have attempted to use a microprocessor's cycle time or time for executing one instruction cycle for timing purposes, the microprocessor becoming little more than a digital timer. Such attempts have often involved the use of the microprocessor to count weld cycles. An example of such a device is proposed in U.S. Pat. No. 4,104,724, issued to Dix et al. It is unsatisfactory to have to program a welding procedure in terms of number of weld cycles, because the number of weld cycles necessary may vary for a given weld, must be determined empirically, and such control techniques are totally generally inapplicable to arc welding modes. The Dix device is a spot welder, using a single phase alternating current power supply. Such control techniques are not applicable to three-phase direct current arc welding power supplies. In Dix, significantly, the illustrative microprocessor is not inside a feedback loop, but is generally used as a sophisticated timer.

There is a need for a programmable arc welding power supply, capable of controlling three phase direct current arc welding power supplies. There is a need for a programmable controller which senses current, voltage, or both, directly (instead of attempting to measure the impedance of a weld), and which is capable of adjusting the circuit parameters in a manner which causes the current, or voltage, or both, to conform to program control. There is a need for a programmable control system which directly measures current, voltage, or both and computes the first derivative of the welding current or voltage function and uses that computation as an indication of the rate of change of the welding current or voltage, which may then be used for positive control of the current or voltage, or both.

In the past, it has been necessary to completely rewire a device if it was necessary to switch from, for example, a constant voltage mode to a constant current mode. There is a need for a programmable arc welding power supply that is capable of operating in a constant voltage mode, a constant current mode, or even a constant power mode, without requiring the circuit to be rewired. There is a need for a single welding power supply which is capable of operating in all common arc welding modes.

In the past, robot devices, which are typically digital, have had to interface with welding devices, which were analog or only accepted analog input. Control has often been accomplished by translating information to a zero to ten volt analog signal, for example, which is then sent from one device to the other where the analog signal must be used, or perhaps translated back to a digital signal. This has not provided precise positive control or communication between the robot device and the welding device. Such an approach requires precise calibration of the analog to digital conversion process, and may be susceptible to the introduction of noise and errors. There has been a need for a programmable arc welding power supply controller which is capable of accomplishing direct communication to a robot device using digital data.

Conventional methods of starting a TIG weld have involved the use of high frequency pulses at voltages on the order of 15,000 to 20,000 volts. Such methods tend to cause electromagnetic interference (EMI) or radio frequency interference (RFI). EMI or RFI can interfere with the proper operation of robots, as well as other devices and instruments. There is then a need for a TIG start weld method which avoids the use of high frequency, high voltage pulses.

Other conventional attempts to start TIG welding procedures have involved the use of what is commonly referred to as a scratch start. The tungsten tip of a welding lead is quickly scratched across the metal to be welded in order to start an arc. This must be done quickly in order to avoid the tungsten tip from being welded to the metal work piece. This procedure often damages the tungsten tip and tends to contaminate the metal work piece with tungsten.

There is a need in the art for an intelligent or smart arc welding power supply which is capable of sensing contact with the metal work piece, capable of sensing the establishment of an arc utilizing a background supply, and capable of ramping up the main power supply current upon establishment of an arc.

SUMMARY OF THE INVENTION

It will be appreciated from the above discussion that arc welding supplies in the prior art leave room for significant improvement. The present invention is believed to represent an advance and improvement over prior art arc welding power sources.

A microprocessor controlled arc welding apparatus may, in a preferred embodiment, include the features of a three-phase transformer, preferably six SCRs connected between the transformer and a common welding lead, where the SCRs are used to control the amount of current or voltage which is output onto the common welding lead. A sensor is coupled to the common welding lead for directly sensing either the current, or the voltage, or both.

The present invention includes the feature of a microprocessor, having an input port coupled to the voltage and current sensors, a memory, and an output port coupled to the SCRs so that the microprocessor can control the firing angle of the SCRs in order to control the voltage or current which is output to the common welding lead.

A significant feature of the present invention involves the method of synchronizing to both the frequency and the phase of the AC power signal. If the firing angle of the SCRs is to be controlled by the microprocessor, it is extremely important that the microprocessor have a means for positively synchronizing to the AC wave form which appears at the secondary of the transformer and which is coupled to the anode of the SCRs. The present invention features a phase locked loop which locks onto the frequency of the AC waveform, and which provides the capability of operation over a variable range of AC line frequencies, and also maintains synchronization even if the AC line frequency varies, as could easily be the case where a portable diesel generator may be used to generate the AC line signal in the case of a portable welding apparatus. However, the phase locked loop sacrifices phase information in accomplishing its frequency lock on. The signal generated by the phase locked loop will typically be out of phase with the AC wave form. The present invention includes the feature of a polarity detector, which generates signals that are coupled to the microprocessor and evaluated by the microprocessor to synchronize with the phase of the AC waveform.

The present invention includes the feature of timing circuits which are set by the microprocessor responsive to the information provided by the phase locked loop and the polarity detector, in order to generate interrupts at six times the AC line frequency. These interrupts, which are synchronized with the AC waveform, may then be used to control the timing circuits which are used to generate firing signals for the SCRs. The present invention includes the significant feature of positive synchronization of the firing signals which are supplied to the SCR bank with the AC line frequency, thereby accomplishing positive control of the output applied to the common welding lead. This feature is superior to prior crude proposals which involved counting weld cycles using an internal crystal oscillator or the microprocessor's instruction cycle time as a means for timing welding procedures.

The present invention includes the feature of providing an economical and efficient microprocessor controlled arc welding supply which provides an optimum trade off between hardware and software. The invention includes the feature of a look-up table which is stored in memory and which permits the microprocessor to quickly determine a proper correction to be applied to the gating signal which is used to fire the SCRs when the microprocessor determines an error between the sensed voltage or current and a reference voltage or current which is desired to be maintained by the arc welding power supply.

The invention includes the feature of providing the capability of computing a first derivative parameter which is indicative of the rate of change of the welding current or voltage, and the capability of utilizing this first derivative parameter to accurately control the output of the apparatus.

The invention includes the capability of sensing external switches or other devices, and the capability for responding intelligently to such sensed inputs in accordance with program control. For example, the invention includes the capability for sensing the appropriate location at which to start a weld, and the ability to sense a location at which a weld should be stopped. The invention includes the capability of receiving input from an operator defining a desired welding procedure and either a constant current mode, constant voltage mode, or some other desired welding mode, and then controlling the arc welding power supply precisely to provide the user desired welding procedure. The invention includes the capability of sensing signals from a robot and responding intelligently to such signals.

The invention includes the capability for controlling various outputs. The invention includes the capability for controlling weld functions such as wire feed, inert gas flow (such as shielding gases), turning on and off a background voltage, signaling a robot to begin movement of a work piece to be welded, outputting to a printer a stream of data indicating quality control data such as the voltage and current which occurred at selected intervals during a welding procedure, prompts to an operator to perform certain operator initiated functions, as well as numerous other functions. The invention even includes the feature of automatically disconnecting the transformer when the apparatus is in a standby mode in order to reduce the amount of wasted power consumed by the transformer. The machine further includes the feature of providing an input/output data port which is capable of providing direct digital communication of digital data to an external digital device such as a host computer controller, a robot device, etc.

The invention provides the feature of intelligently touch starting a TIG welding mode by turning on a small background voltage, for example a 0.5 volt supply, moving the welding tip toward the work piece and sensing contact of the welding tip with the work piece by determining when the small background voltage drops to 0, turning on a higher background voltage such as an 80 volt current limited supply and withdrawing of the welding tip from the work piece, measuring the establishment of a thin arc between the welding tip and work piece by sensing the voltage or current when the welding tip has been withdrawn from the work piece, then ramping up the main welding current once an arc has been established.

The invention includes the feature of providing a capability of assisting an operator in learning how to weld. In such a mode, the apparatus is capable of teaching an inexperienced operator how to weld. The machine can automatically change its settings to compensate for welder errors, and can also generate prompts and other outputs designed to instruct the welder how to correct welding errors.

In another mode referred to as "bio-feedback", the apparatus provides the capability of sensing welder's signals, which may be provided for example by momentarily dipping the welding lead closer to the work piece to cause a momentary change in the sensed voltage or current, which the microprocessor may then be programmed to interpret as a signal to change the setting of the welding apparatus, such as increase voltage, increase current or perform some other function as increase the rate of wire feed, etc.

The invention includes the feature of providing an optimum trade off between hardware and software, not only by the use of look-up tables, but also by providing timers which are configured to fire the SCRs at the same firing angle until the information in the timers is changed or updated by the microprocessor. This feature takes the load off the microprocessor of generating the gating signals which must be used to fire the SCRs, and the microprocessor's computer power is only needed in order to update the information in the timers. In other words, the timers function as smart interface chips which interface directly to the SCRs and control the SCRs responsive to information provided by the microprocessor.

DETAILED DESCRIPTION OF A PREFERRED EMBODIMENT

Figure 1:
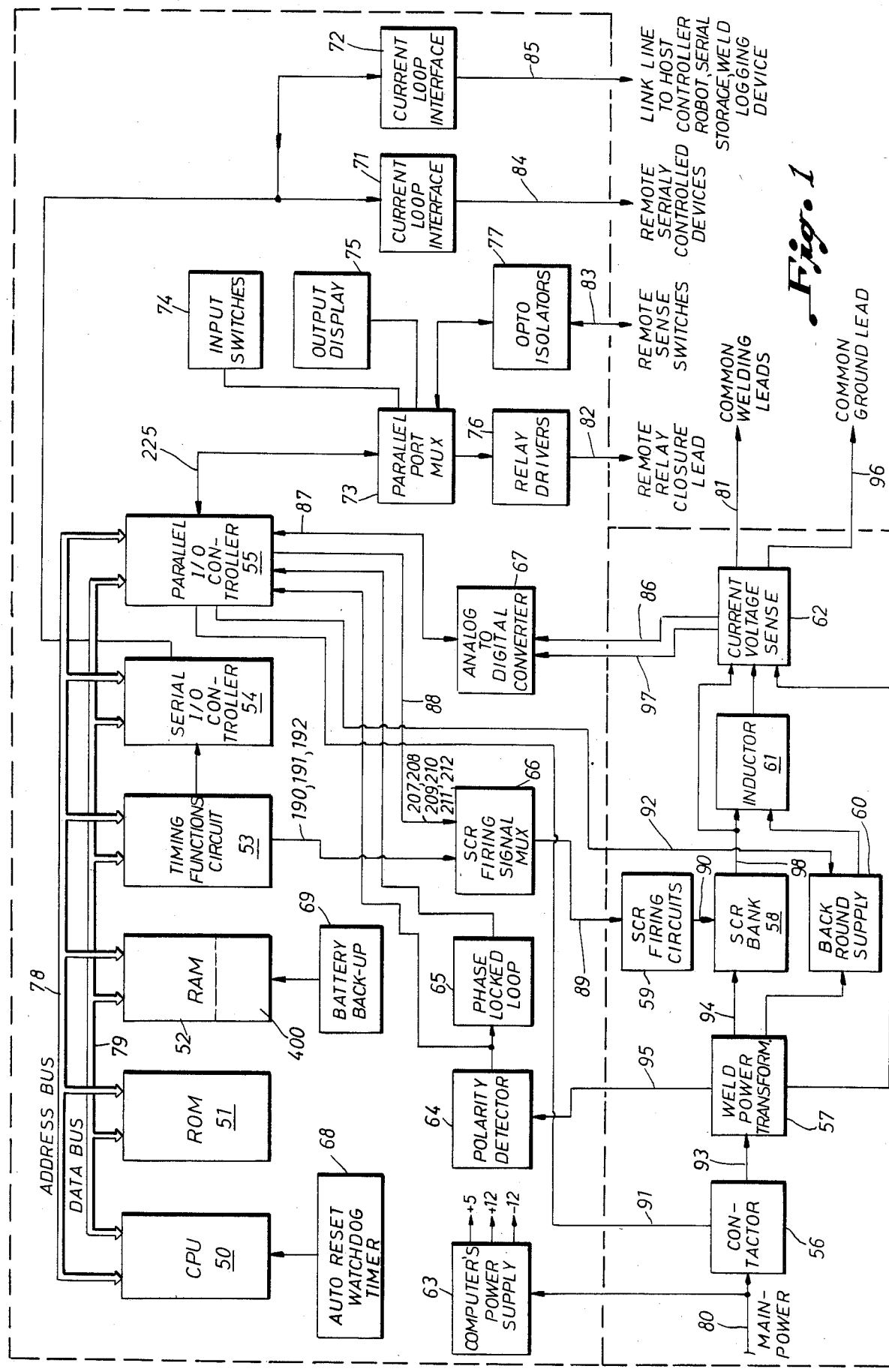
FIG. 1 is a block diagram illustrating schematically the interrelationship of the significant circuit components forming an embodiment of the present invention.

FIG. 1 shows the interrelationship of various circuits which form the present invention.

The welding apparatus draws AC power from a main power source 80. The apparatus yields a welding current or voltage between a common welding lead 81 and a common ground lead 96. A workpiece appropriately connected between the welding lead 81 and the ground lead 96 will be welded by the flow of current (in a conventional sense) from the positive common welding lead 81 to the negative common ground lead 96. The flow of welding current is developed and controlled by the circuit element illustrated in FIG. 1.

Significant components of the invention include a weld power transformer 57, an SCR bank 58, a CPU 50, and current and voltage sense elements 62. Assuming that the power is on and a welding mode has been selected by an appropriate configuration of memory 51 and 52 along with necessary inputs, power flows through the weld power transformer 57, is rectified and controlled by the SCR bank 58, and is supplied to the common welding lead 81. The sense elements 62 monitor the condition of the welding arc. The sense elements 62 communicate with the CPU 50 which compares, under program control, the actual welding conditions with the selected welding mode. The CPU signals and controls the SCRs to achieve the proper welding condition in accordance with the selected welding mode. The circuitry is capable of achieving, for example, either constant current or constant voltage arc welding, which are selectable without requiring the rewiring of circuits. Program control for both constant current and constant voltage procedures are contained in the memory 51 and 52, and are selectable by transmitting the appropriate command to the CPU 50. Since SMAW and TGAW usually require a constant current machine and MGAW requires a constant voltage machine, at least two separate conventional welding machines would have been required in the past to weld in these three most common arc welding modes. This invention provides one apparatus capable of functioning in a constant current mode, or a constant voltage mode, and which is capable of SMAW, TGAW, MGAW, SAW, as well as all arc welding modes, without hardware reconfiguration.

The invention is capable of switching substantially instantaneously between a constant voltage mode and a constant current mode, even during the course of a welding procedure. For example, the MGAW process is most easily started in a constant voltage mode, and then once the arc has been initiated, may be switched to a constant current mode. The invention is also capable of operating in a constant power mode.

The illustrated implementation of these capabilities can best be understood by referring to FIG. 1. Main power 80 is supplied to the weld power transformer 57. In a preferred embodiment, the weld power transformer 57 is a three phase transformer. The main power voltage is preferably stepped down by the weld power transformer 57 and coupled to the SCR bank 58 through conductor 94. The SCR bank 58 rectifies the alternating current on conductor 94. The SCR bank 58 preferably comprises six SCRs in a full wave, three phase rectifier configuration, sometimes referred to in the art as a six phase star. This results in a direct current output on conductor 98 having a 360 Hz ripple, if the power line frequency is 60 Hz.

In a preferred embodiment, the 360 Hz ripple may be smoothed by an inductor 61. The DC welding current is coupled to the common welding lead 81.

A significant feature of the present invention involves the direct sensing of current and voltage. Current and voltage sense elements 62 are provided which are directly connected to the common welding lead 81. In the present invention, samples of the current and voltage representative of the welding conditions at a given point in time are monitored directly at the common welding lead 81 or the common ground lead 96, rather than on the primary side of the weld power transformer 57 (such as at conductor 93). This provides more accurate control of welding conditions, and eliminates the time delays which can occur if current or voltage is sensed through the inductive winding of a transformer 57.

The amount of current or the amount of voltage appearing on conductor 98 will be determined by the SCR bank 58 responsive to gating signals fed to the SCR bank 58 through a conductor 90. The gating signals are developed by SCR firing circuits 59. The SCR firing circuit 59 develop gating signals on conductor 90 responsive to signals from the CPU 50.

It is desirable to communicate welding conditions to the CPU 50 which may be analyzed in order for the CPU 50 to provide the appropriate signals to the SCR firing circuits 59. In the illustrated embodiment, this is essentially accomplished by an analog-to-digital converter 67 which is coupled to the current and voltage sense elements 62.

The analog-to-digital converter 67 transforms the voltage signals appearing on a voltage sense conductor 86 to a digital signal which can be processed by the CPU 50. Similarly, the analog-to-digital converter 67 transforms the analog current signal appearing on a current sense conductor 97 to a digital signal which may be processed by the CPU 50. In a preferred embodiment, the analog-to-digital converter 67 is a two channel A/D converter.

In a preferred embodiment, communication to and from the CPU 50 is accomplished through a parallel I/O circuit 55. Current or voltage signals from the current or voltage sense elements 62 are transformed to digital signals by the A/D converter 67 and gated to a data bus 79 by the parallel I/O circuit 55. The digital signals from the A/D converter 67 may be stored in a random access memory or RAM 52, or temporarily placed in the CPU 50.

Timing considerations can be very significant. It is necessary that gating signals be applied to an SCR during the alternating current phase when the SCR is forward biased. Equally important, in order to correctly control the firing of the SCRs 58, it is necessary to have an accurate reference to the phase and frequency of the alternating current signal from the main power source 80 (which may vary). In the illustrated embodiment, this is essentially accomplished by a polarity detector 64, a phase locked loop 65, in cooperation with a timing function circuit 53. The phase locked loop 65 gives a reliable indication of the frequency of the AC power signal. The polarity detector 64 is used to determine phase information concerning the AC power signal.

The polarity detector 64 is coupled to the weld power transformer 57 through a conductor 95. The polarity detector 64 is tied to one phase of the alternating current signal (in the illustrated three phase embodiment), coupled to the polarity detector 64 by the conductor 95.

The phase locked loop 65 locks to the AC line frequency. The phase locked loop 65 has an internal oscillator which locks onto and synchronizes with the AC line frequency, and thus follows it. The phase locked loop 65 delivers a clean frequency signal to the CPU 50. This is significant, because the AC power signal is difficult to measure by other techniques, such as zero crossing detectors, due to noise, non-linearities in loads, non-linearities in the transformer 57, "ringing" introduced by inductance or otherwise, and other factors.

The frequency reference signal provided by the phase locked loop 65 is used by the CPU 50 to determine the period of the AC signal. Specifically, the CPU 50 sets section three of the triple timer 152 to zero at the start of one cycle of the frequency reference signal. Upon completion of a cycle, the phase locked loop 65 generates an interrupt to the CPU 50. When the CPU 50 receives this interrupt, it goes to the timer 152 and reads the value of section three of the triple timer 152. The elapsed time represents the period of the AC signal. Inasmuch as the period of an alternating signal is inversely related to its frequency, the frequency of the AC power signal can also be determined readily. The CPU 50 then sets section one of the triple timer 152 to generate interrupts at six times the AC line frequency. Each interrupt may be used as a reference for firing each of the six SCRs 100.

The phase locked loop 65 sacrifices phase information to obtain a frequency lock. The phase of the frequency reference signal provided by the phase locked loop 65 to the CPU 50 will typically be shifted in phase. It is desirable to obtain phase information regarding the AC power signal. In the illustrated embodiment, this is essentially accomplished by the polarity detector 64. At each interrupt, the polarity detector 64 is sampled and the timer interrupt rate is modified if necessary to cause the interrupts to occur in phase with the AC line signal.

The interrupts are used, under program control, as a reference for determining the proper control signals to be applied to the SCRs 58. Once the frequency and phase of the AC power signal are known, and interrupts are generated at six times the AC line frequency, the interrupt associated with each of the six SCRs 100 provides a reference so that each SCR 100 may be signaled after a predetermined delay from the interrupt to fire during only a portion of the AC phase (which can be accurately controlled by the CPU 50).

A significant feature of the illustrated circuit involves the ability to communicate directly with a host controller, a robot, or a remote control device using digital data. In the past, it has been common to generate an analog signal which is fed to a welding device from a robot device, which must then be converted to a digital signal. This, of course, introduces errors and has been a less than satisfactory arrangement. In the present invention, two serial I/O ports are provided. Each port is connected to a current loop interface 71 or 72 which provides a digital output 84 and 85, respectively. The output 85 or the output 84 may provide digital data to a host controller, a robot, or other digital device. Further, the present invention may be used advantageously in connection with a robot device. For example, the CPU 50 may signal a robot device to position a workpiece, such as an automobile chasis, in a manner convenient for welding. The CPU 50 may then generate a welding current between the common welding lead 81 and the common ground lead 96 in accordance with a desired welding procedure. The robot, responsive to signals from the CPU 50, may be used to move the workpiece in a manner necessary to accomplish the desired welding procedure. The robot may then signal the CPU 50 when the workpiece arrives at a position indicative of the completion of the welding procedure. The robot may then pass the workpiece to the next station in the assembly procedure, and these steps may be repeated.

Significantly, the link line 85 carries digital data in the illustrated embodiment which results in significant advantages in positive communication between the CPU 50 and the robot.

Additional current loop interfaces 71 may be provided if additional outputs 84 are desired for communicating digital data to remote serially controlled devices.

It is desirable to provide means for accomplishing data input into the CPU 50 from an operator or remote switches which are sensed. It is further desirable to provide for the output of information in a form which may be recognized by a human operator, or which may be used to activate remotely controlled relays. In the present instance, this is accomplished by a parallel port multiplexer 73 which is electrically coupled to the parallel I/O controller 55.

The parallel port multiplexer 73 may be used to route signals to output displays 75. The output displays 75 may be in the form of panel mounted LEDs which are visible to an operator and which display information indicative of the status of current welding conditions, program control information, mode of operation, etc.

In a preferred embodiment, an operator may input information to the CPU 50 using input switches 74. The RAM 52 could be programmed in this manner. The input switches 74 are electrically coupled to the parallel I/O controller 55 through the parallel port multiplexer 73. The desired operating mode, such as constant current or constant voltage, may be entered by the input switches 74. Control information such as the desired voltage level or current level could also be entered using the input switches 74. Additionally, operator interrupts could be entered in a similar manner.

It is oftentimes desirable to sense remote switches. For example, limit switches may be used to sense in a preferred embodiment, opto-isolators 77 are used to isolate the parallel port multiplexer 73 from the remote sense switch output 83. The opto-isolators 77 are used to provide electro-isolation of noise and switch bounce so that a clean signal may be provided to the parallel port multiplexer 73.

It is oftentimes desirable for the CPU 50 to control remote relays or other devices through a remote relay output 82. In the present instance, this is accomplished by relay drivers 76 which are electrically coupled to the parallel port multiplexer 73. Using the relay drivers 76, the CPU 50 may signal remote relays through the remote relay output 82 which may be used to feed wire which is to be used for welding, turn on the flow of an inert gas used for shielding, activate cooling fans used to direct cooling air flow over the SCRs, etc.

It is oftentimes desirable to output information from the CPU 50 to an operator in a manner in which it can be perceived visually. In the illustrated circuit, this is essentially accomplished by the provision of output displays 75. The output displays 75 may be LED type displays. The output displays 75 may be used to output the voltage and current at any given moment during a welding procedure. The output displays 75 may be used to indicate and verify data or commands which are entered through input switches 74, or from peripherals connected to the serial ports, such as paper tape, keyboard, computer, robot, disk drive, tape drive, etc.

The parallel port multiplexer 73 controls the flow of signals to or from the input switches 74, the output displays 75, the opto-isolators 77, and the relay drivers 76. The parallel port multiplexer 73 insures that a signal from the CPU 50 which is directed to the output displays 75 is correctly routed to the displays 75, for example.

It is oftentimes desirable to provide means for supplying a voltage of a predetermined level between the common welding lead 81 and the common ground lead 96. It is often desirable to present a certain open voltage between the leads 81 and 96. This is often used to assist in overcoming the resistance at the surface of the workpiece which is typically present during a cold start of a welding operation. Initially, a workpiece presents a higher resistance. After welding current begins to flow and an arc is developed, the ionization of the immediately surrounding area and the heating of the workpiece will present a lower resistance to the welding apparatus.

In a preferred embodiment, a background supply 60 is provided. The background supply 60 is electrically coupled to the common welding lead 81. The background supply 60 may be used to develop an open circuit voltage between the leads 81 and 96. In addition, the background supply 60 may be used to smooth ripples in the welding current provided by the SCR bank 58.

In the illustrated embodiment, the weld power transformer 57 draws a significant amount of power even when the SCR bank 58 is not conducting. Much of this power is dissipated in the form of undesirable heat. A contactor 56 is preferably provided to disengage the weld power transformer 57 from the main power source 80 during periods when welding operations are not being performed. The contactor 56 is electrically coupled to the parallel I/O controller 55 through conductor 91. The CPU 50 signals the contactor 56 on conductor 91 through the parallel I/O controller 55. The contactor 56 disengages power coupled on conductor 93 to the weld power transformer 57 responsive to the signals from the CPU 50. To prolong the life of the contactor, it should not be switched while the power source is under load.

After a predetermined delay, the CPU 50 may signal the contactor 56 to disconnect the weld power transformer 57. Alternatively, the CPU 50 may be instructed, using program control contained in memories 51 or 52, to signal the contactor 56 at a predetermined time. Once disconnected, the contactor 56 is responsive to signals from CPU 50 to reconnect the weld power transformer 57 when desired. The provision of the contactor 56 to disconnect the weld power transformer 57 significantly reduces the amount of power that the circuit draws when the circuit is on standby.

A computer power supply 63 is connected directly to the main power source 80, and is preferably not disconnected by the contactor 56. The computer power supply 63 provides power to the CPU 50, the ROM 51, the RAM 52, the time and function circuit 53, the serial I/O controller 54, the parallel I/O controller 55, etc. It will be appreciated that the CPU 50 remains activated even when the weld power transformer 57 is disconnected by the contactor 56. In other words, the invention retains its control ability even when the apparatus is in a standby mode.

An auto reset 68 is provided coupled to the CPU 50. The auto reset 68 may be used to boot the system when the circuit is initially powered up. A watch dog timer 68 is also provided to reset the CPU 50 if a malfunction occurs.

A battery backup 69 is preferably provided for the RAM 52 to prevent the loss of data during a temporary loss of power, and to retain the information in memory during periods when power to the apparatus is shut down.

Figure 2:
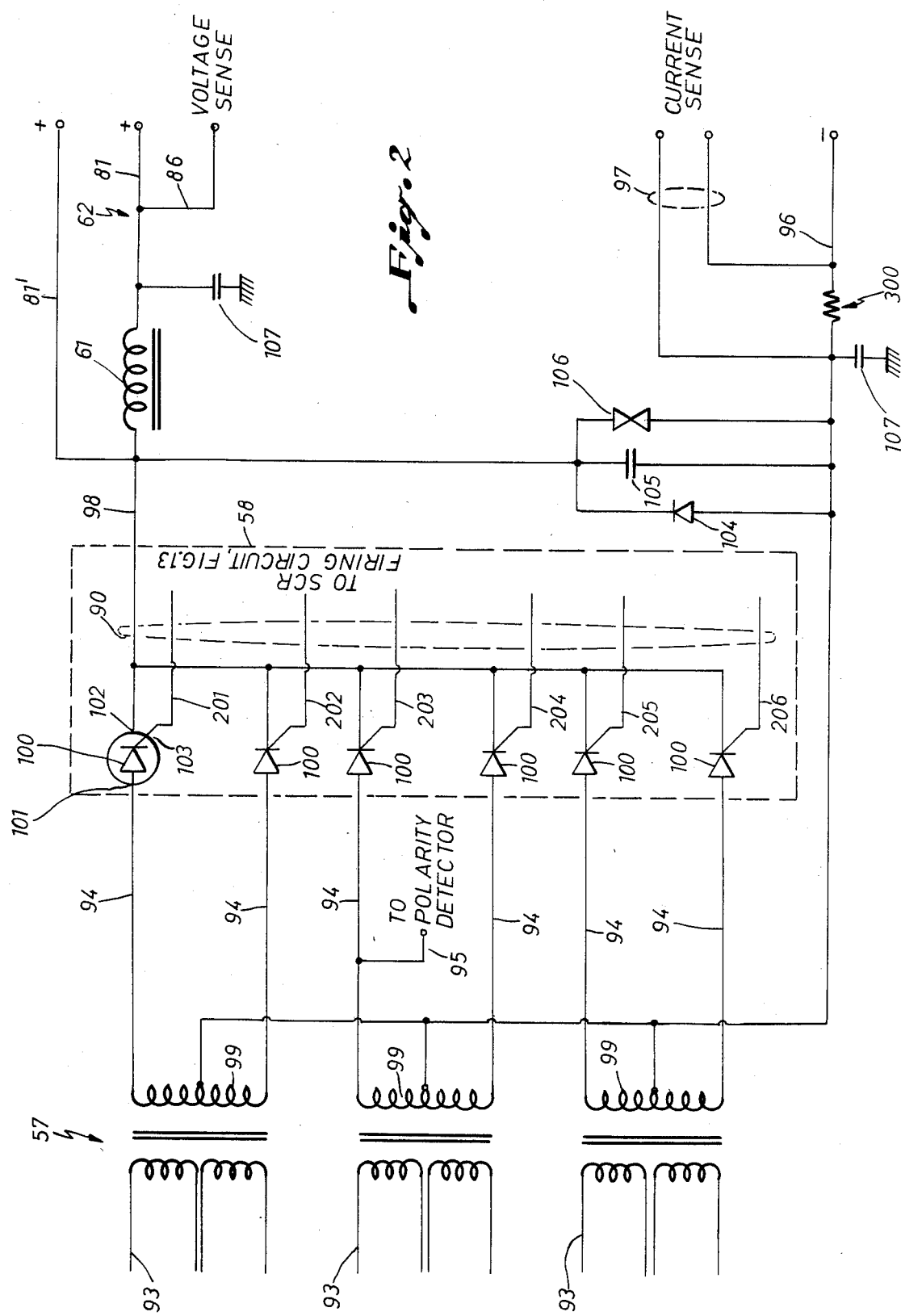
FIG. 2 is a schematic diagram of the weld power transformer, the SCR bank, the inductor, and the current and voltage sense circuits.

The operation of the SCR bank 58 may be better understood with reference to FIG. 2. In a preferred embodiment, the weld power transformer 57 is a three-phase power transformer. Conductors 93 connect primary windings of the three-phase transformer 57 to a main source of power 80. The three-phase transformer 57 has secondary windings coupled through conductors 94 to SCRs 100. In the illustrated embodiment, the conductors 94 are connected to the anodes of the SCRs 100.

The cathodes of the SCRs 100 are connected together to a conductor 98 and fed to the inductor 61.

The electrical signal on conductors 94 is an alternating current signal, preferably a sine wave. The SCRs 100 will be forward-biased during one-half of the AC cycle. When the SCR 100 becomes forward-biased, the SCR 100 will not conduct current through to the conductor 98 until a firing signal is applied to the gate 103 of the SCR 100. Using the gates 103 of the SCRs 100, it is possible to control the flow of welding current on the conductor 98.

If a firing signal is applied to the gate 103 at the SCR 100 during the initial portion of the forward-biased half of the AC wave form, the maximum amount of current will flow through the SCR 100 to the conductor 98. Conversely, if a gating signal is applied to the gate 103 late in the alternating current cycle, the average current flowing through the SCR 100 to the conductor 98 will be less.

In a preferred embodiment, six SCRs 100 are utilized. Under normal conditions, an individual SCR 100 will conduct only during a portion of the AC cycle. However, the output from all six SCRs 100 are summed together and fed to the conductor 98 to provide a smoother direct current signal to the common welding lead 81. The DC current flowing on conductor 98 will ordinarily have a ripple at six times the line frequency. In the case of a 60 Hz power line frequency, the ripple will be at 360 Hz.

An inductor 61 is provided to smooth the 360 Hz ripple on the signal appearing on conductor 98. This results in a smoother DC signal at the common welding lead 81.

In a preferred embodiment, a voltage sense element 62 is connected to the common weld lead 81 and coupled through conductor 86 to the analog-to-digital converter 67. In the illustrated embodiment shown in FIG. 2, the voltage sense element 62 is a direct connection 86 to the lead 81.

It may be desirable to provide a means for eliminating the inductor 61 when its filtering action is not desired. In the embodiment illustrated in FIG. 2, an alternative common welding lead 81' is provided which bypasses the inductor 61 and is connected directly to the conductor 98.

In the illustrated embodiment shown in FIG. 2, a current sense cable 97 is connected as shown to a shunt 300 inserted in the common ground lead 96. The voltage developed across the shunt 300 will be directly proportional to the value of the current.

In the illustrated embodiment, further filtration and voltage spike protection is provided by a diode 104, a capacitor 105, and an MOV device 106, which are connected in parallel between the conductor 98 and the common ground lead 96. Additional filtering and noise suppression may be provided by capacitors 107 connected as shown in FIG. 2.

Figure 13:
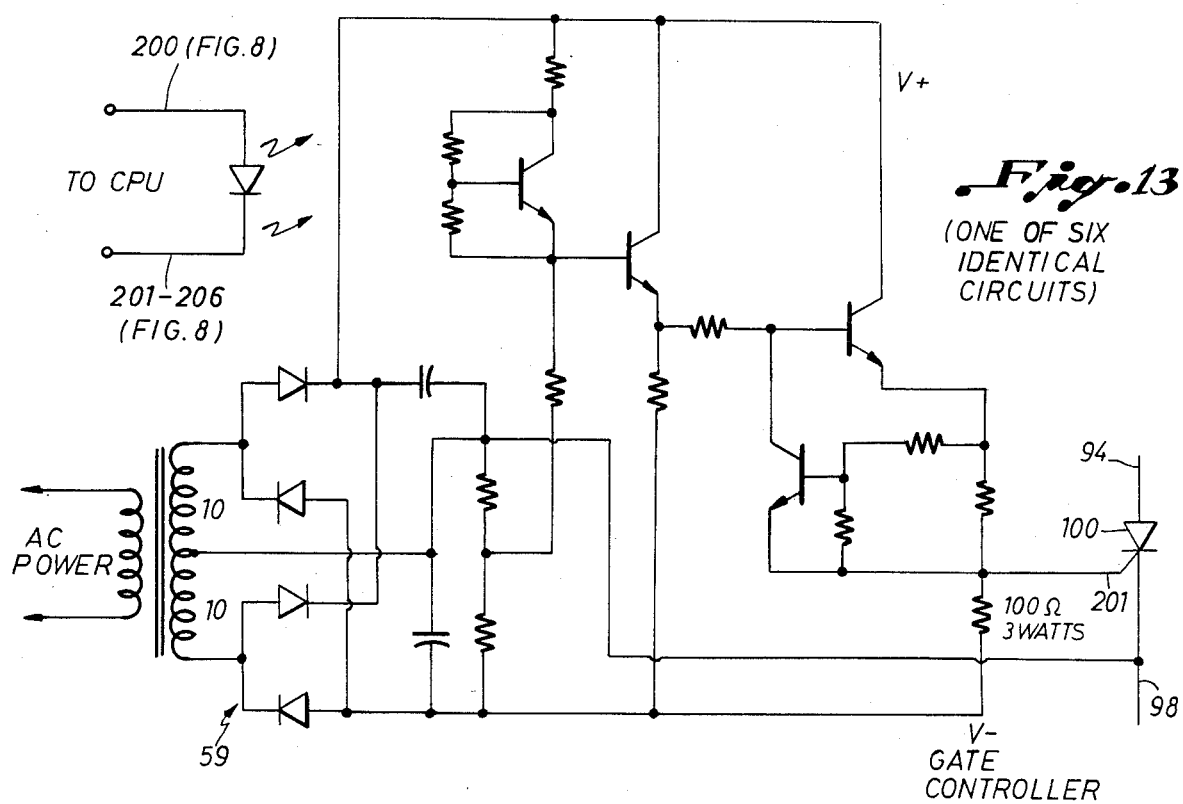
FIG. 13 is a schematic diagram showing one of the SCR firing circuits in more detail.

The gates 103 of the SCRs 100 are connected through conductors 90 to SCR firing circuits 59 (shown in more detail in FIG. 13). The SCR firing circuits 59 provide signals in response to signals received from the CPU 50 to fire the SCRs 100 during the appropriate portion of the AC cycle in order to obtain the desired welding current on conductor 98. The timing of the gating signals applied to the gates 103 of the SCRs 100 determines the average current or average voltage which appears on the conductor 98. The average current or average voltage on conductor 98 may be increased by shortening the delay between the time that the AC signal on conductor 94 crosses zero and forward biases the SCR 100, and the time that the firing signal is applied to the gate 103 of the SCR 100. Conversely, the average current or average voltage on conductor 98 may be decreased by lengthening the delay between the zero crossing of the AC signal on conductor 94 and the firing signal applied to the gate 103 of the SCRs 100. This timing is determined by the CPU 50 under program control.

In order to accurately calculate the delay in initiating the SCR firing circuit signal, it is desirable to have a reference to the phase and frequency of the AC signal from the secondary 99 of the transformer 57. In the illustrated embodiment, this is accomplished by conductor 95 which is connected to one side of a secondary winding 99 of the transformer 57. The conductor 95 is connected to the polarity detector circuit 64. The signal sensed through conductor 95 may be used as a reference which may be used by the CPU 50 to synchronize the interrupts generated by the timer chip 152 so that the interrupts are in phase with the AC line frequency. Then the CPU 50 may accurately determine the appropriate delay for the firing signals to be supplied to the gates 90.

The preferred embodiment includes the capability of individually controlling the delay for the gating signal supplied to each gate 103 of each SCR 100. This provides the capability of generating complex wave forms, if desired, or to compensate for variations in circuit components, or both.

A significant feature of the present invention involves the calculation of the desired timing for the SCR firing signals during each alternating current phase of the signal at conductor 95. As described more fully above, the phase locked loop 65 is synchronized with the frequency of the AC power signal, and provides a reliable measure of the period of the AC power signal. The elapsed time since the last zero crossing of the frequency reference signal is computed to determine the period of the AC wave form. Six interrupts are generated for each period (one interrupt for each SCR 100). During each cycle of the AC wave form, the zero crossing of the AC signal is sensed, and used to synchronize the interrupts with the phase of the AC wave form. The six interrupts divide the period of the AC wave form preferably into six equal subperiods, which are used as a reference for firing each individual SCR 100. (It may be desirable to make the subperiods unequal, as described more fully hereinafter).

The period of the AC wave form is recalculated for each cycle of the phase locked loop. Variations in the alternating current frequency will not affect circuit operation. Significantly, the apparatus will work on 60 Hz AC power, 50 Hz AC power (as is common in Europe), or even on a variable frequency source such as that generated by a diesel generator, or various alternating current frequencies which may be available. This feature of the present invention provides positive synchronization which is crucial in accurately controlling the welding signal which is developed on conductor 98. If the circuit is not appropriately synchronized to the AC wave form, then the delay in firing the gate 103 of the SCRs 100 cannot be accurately determined.

Figure 3:
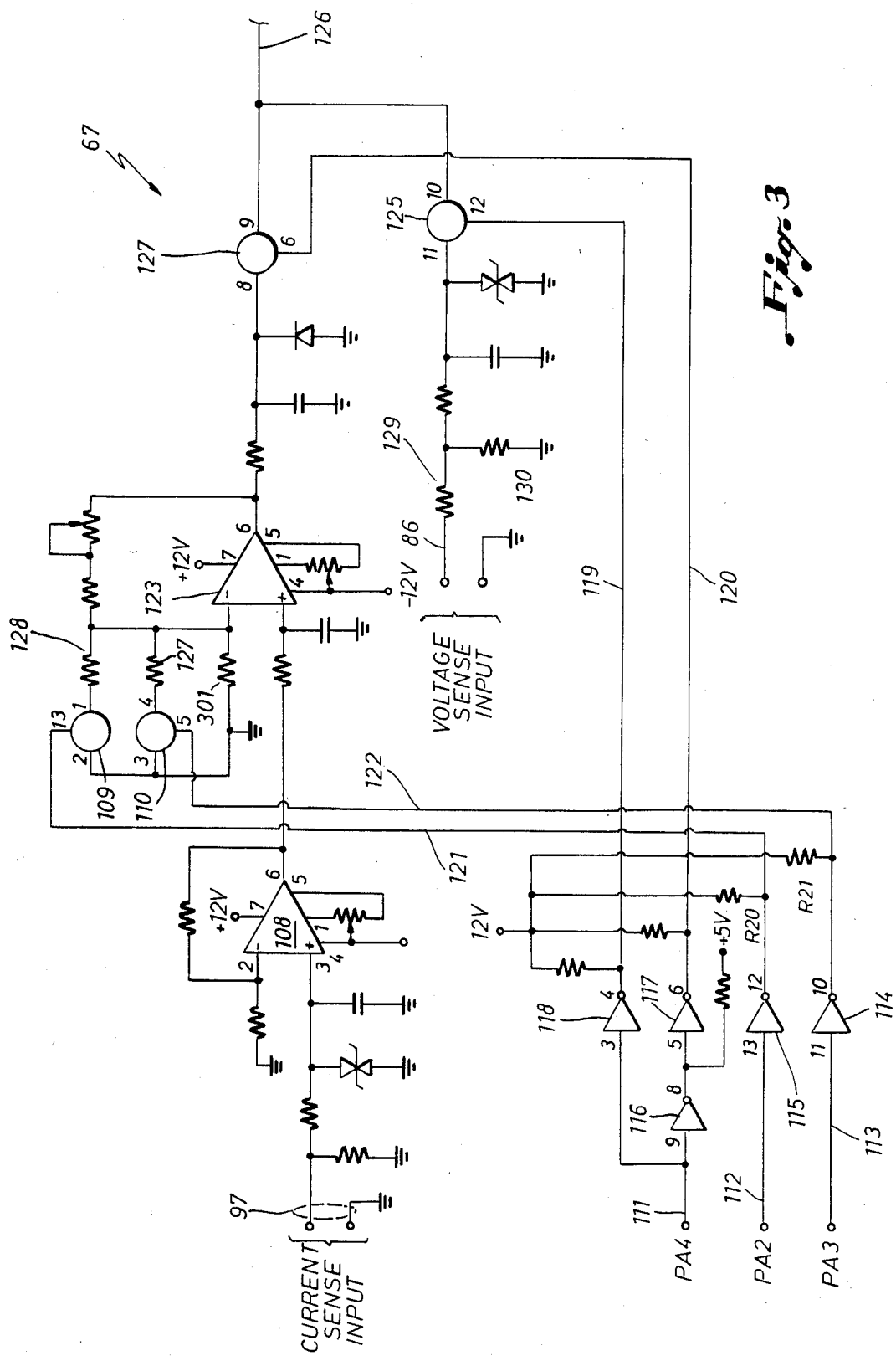
FIGS. 3 and 4 are schematic diagrams illustrating the analog-to-digital converter.
Figure 4:
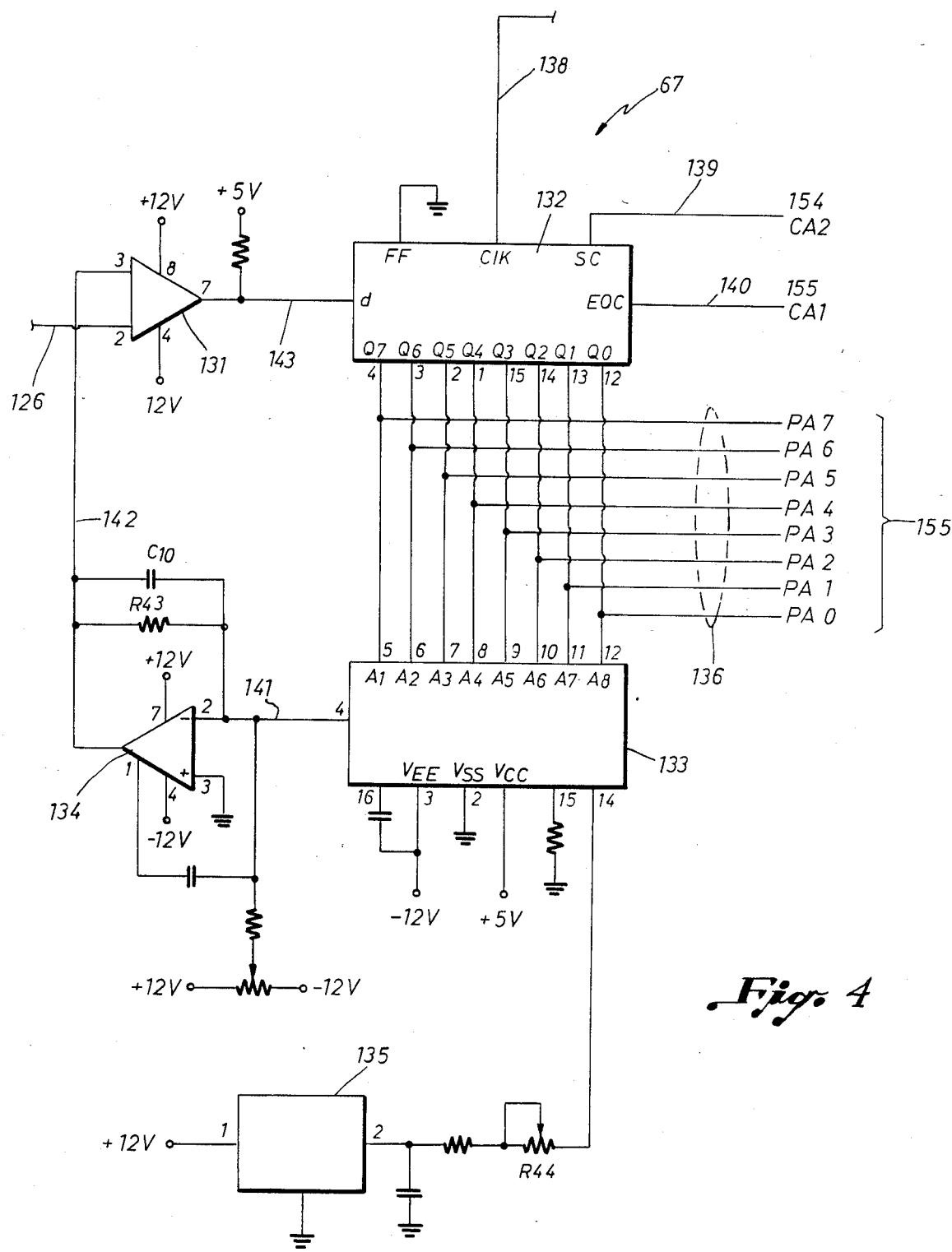

The operation of the analog-to-digital converter circuit 67 can best be understood with reference to FIG. 3 and FIG. 4.

It is desirable to sense the current and/or voltage representative of the welding conditions. A current sense input is provided through cable 97 to the analog-to-digital converter circuit 67, as shown in FIG. 3. It is desirable to amplify the signal on conductor 97 prior to converting the signal, in an analog form, to a digital signal which may be processed by the CPU 50. In the illustrated embodiment, this is accomplished initially by an operational amplifier 108. The current sense input is coupled through the conductor 97 to the op amp 108. In a preferred embodiment, the op amp 108 is designed to have a gain of 12.54.

The output from the op amp 108 is then electrically coupled to a second operational amplifier 123. It is desirable to vary the gain of the op amp 123 to provide a series of ranges for the current sense input 97. It is further desirable that this range selection be provided in response to signals from the CPU 50. In the illustrated embodiment, this is essentially accomplished through conductors 112 and 113, which are coupled to the CPU 50. In a preferred embodiment, the signal at conductors 112 and 113 will have a value which may be interpreted as either a logic one or logic zero.

The gain of op amp 123 is determined in part by feedback resistor 301. The gain of op amp 123 may be varied by reducing, or increasing, the effective feedback resistance. The effective feedback resistance may be reduced by connecting a second feedback resistor 127 in parallel with the first feedback resistor 301. In the illustrated embodiment, this is accomplished by an analog switch 110.

The analog switch 110, responsive to a signal on conductor 122, will effectively connect or disconnect the second feedback resistor 127 from the circuit. Signals from the CPU 50 are fed through conductor 113, through inverter 114 to conductor 122, which is in turn connected to the analog switch 110.

Thus, the CPU 50, by signaling the analog switch 110 through conductor 113, may change the gain of op amp 123 by coupling a second feedback resistor 127 in parallel with the first feedback resistor 301. The CPU 50 can therefore adjust the range of values which may be conveniently sensed through the current sense input 97.

Similarly, the CPU 50 may apply a logic signal to conductor 112 through inverter 115, through conductor 121 to a second analog switch 109. The second analog switch 109 is operative to connect a third feedback resistor 128 in parallel with the first feedback resistor 301 and the second feedback resistor 127, to adjust the effective feedback resistance to a desired value. As a result, the operational amplifier 123 is capable of providing three ranges of amplification to the input provided at conductor 97 in response to signals from the CPU 50.

In the illustrated example, the three ranges of the op amp 123 result in a scale such that a register 132 shown in FIG. 4 has one count per ampere for one range, one count per two amps for a second range, and one count per four amps for a third range.

In the embodiment illustrated in FIG. 3, the amplification provided by op amps 108 and 123 is required because the value of the shunt resistor 62 is preferably kept small to minimize the voltage drop which appears across the shunt 62.

When the analog switch 124 is enabled, the output from the current sense amplifiers 108 and 123 is coupled to conductor 126. A voltage sense input may also be applied to conductor 86. This is coupled through a voltage dividing network 129 to an analog switch 125.

When the analog switch 125 is enabled, the voltage sense input is coupled to conductor 126.

It is desirable to allow the processor to selectively determine whether the current will be sensed, or whether the voltage will be sensed by the CPU 50. In the illustrated embodiment, this is essentially accomplished by providing a sense select control line 111 which is coupled to the CPU 50. In a preferred embodiment, the signal at conductor 111 will be interpreted as either a logic one or a logic zero. The signal at the sense select control input 111 is coupled through an inverter 118 along conductor 119 to the analog switch 125. The signal on conductor 111 is also connected through inverters 116 and 117 along conductor 120 to the analog switch 124. It will be appreciated that the logic signal on conductor 119 will be the complement of the logic signal on 120. In other words, when the signal on conductor 119 is in a logic state of one, the signal on conductor 120 will be in a logic state of zero. This insures that the current sense input and the voltage sense input cannot both be simultaneously coupled to conductor 126. Thus, depending on whether conductor 119 or conductor 120 is enabled, the analog switches 125 and 124, respectively, will couple either the voltage sense input or the current sense input to conductor 126. Thus, the CPU 50 may select the desired input to be sensed.

It is desirable to convert the analog signal appearing on conductor 126 into a digital signal which may be processed by the CPU 50. In the illustrated embodiment, this is essentially accomplished by the circuit illustrated in FIG. 4. In the illustrated embodiment, the signal appearing on conductor 126 may have a range from 0.0 to 5.12 volts. This analog signal is converted into a digital signal having a value between hexadecimal zero and FF (which is between 0 and 255 in the decimal counting system).

Referring to FIG. 4, the analog signal on conductor 126 is representative of either the current or the voltage of the weld, which is selected by the CPU 50. This signal is fed to a two-input comparator 131. The analog signal on conductor 126 is compared with the signal on conductor 142.

The output of the comparator 131 is fed to a successive approximation register 132. The successive approximation register 132 is coupled as shown to an eight bit D to A converter 133. The D to A converter 133 has an output 141 connected to an operational amplifier 134, the output of which is fed through conductor 142 back to the two-input comparator 131. A voltage reference is provided by a precision voltage reference 135.

The circuit operation starts when the CPU 50 signals the successive approximation register 132 by enabling a start convert line 139. Responsive to the start convert signal from the CPU 50, the successive approximation register 132, in essence, guesses the value of the signal on conductor 126. This "guess" is converted by the eight bit D to A converter 133 to an analog signal at output 141. This signal is amplified by the op amp 134 and fed through conductor 142 into the two-input comparator 131. The comparator 131 compares the guess with the signal on conductor 126. The comparator 131 generates an output on comparator output line 143 which is fed back to the successive approximation register 132. The comparator output 143 will be a logic one or zero depending upon whether the "guess" is too great or too little. The successive approximation register 132 then selects a second guess responsive to the comparator error signal 143. The process is repeated and the output at conductor 142 is again compared with the current or voltage signal appearing on conductor 126. Generally speaking, each "guess" of the successive approximation register 132 will be closer and closer to the actual value of the voltage or current on conductor 126. In other words, the value in the successive approximation register 132 will converge upon a limit represented by the value of the signal on conductor 126.

The successive approximation register 132 continues to change the value in its register to a value closer and closer to the value of the current or voltage signal at conductor 126 until, for the illustrated example, eight successive guesses have been made. This results in a value that is within less than ½ of one percent of the actual voltage. The CPU 50 waits a sufficient period of time to allow the register 132 to complete its conversion, then reads out the value contained in the eight bit successive approximation register 132 through the input port, indicated generally in FIG. 4 by reference numeral 136.

The D to A converter 133 is preferably an MC 1408L8 chip. The successive approximation register 132 is preferably a 40549 chip.

In the illustrated embodiment, a clock signal is provided through conductor 138 to the register 132. This clock signal comes from the serial I/O port. In other words, the successive approximation register 132 uses a clock signal derived from the baud rate generator of the serial I/O port. In the illustrated example, the clock for the register 132 runs at a frequency of 147.8 KHz.

Resistor R44 shown in FIG. 4 may be used to trim or fine tune the range of the A/D converter 67. Resistor R43 should preferably be a 0.1% resistor. Resistor R43 must have a precise and stable value because its value determines the range of the A/D converter 67.

Figure 5:
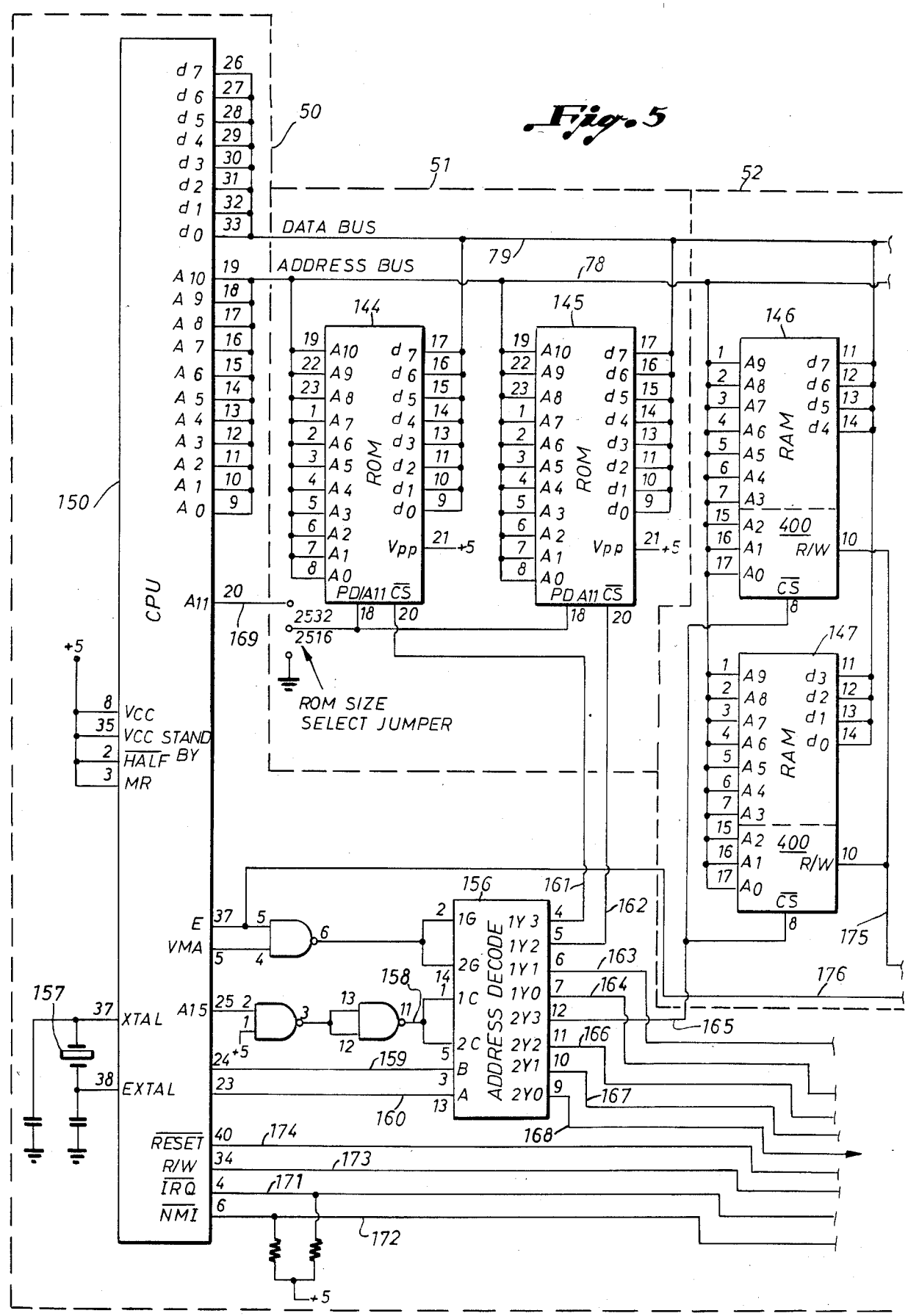
FIGS. 5 and 6 are schematic diagrams illustrating the CPU, the ROM, the RAM, and the bus interfaces for the timing function circuit, the serial I/O circuits, and the parallel I/O circuits.
Figure 6:
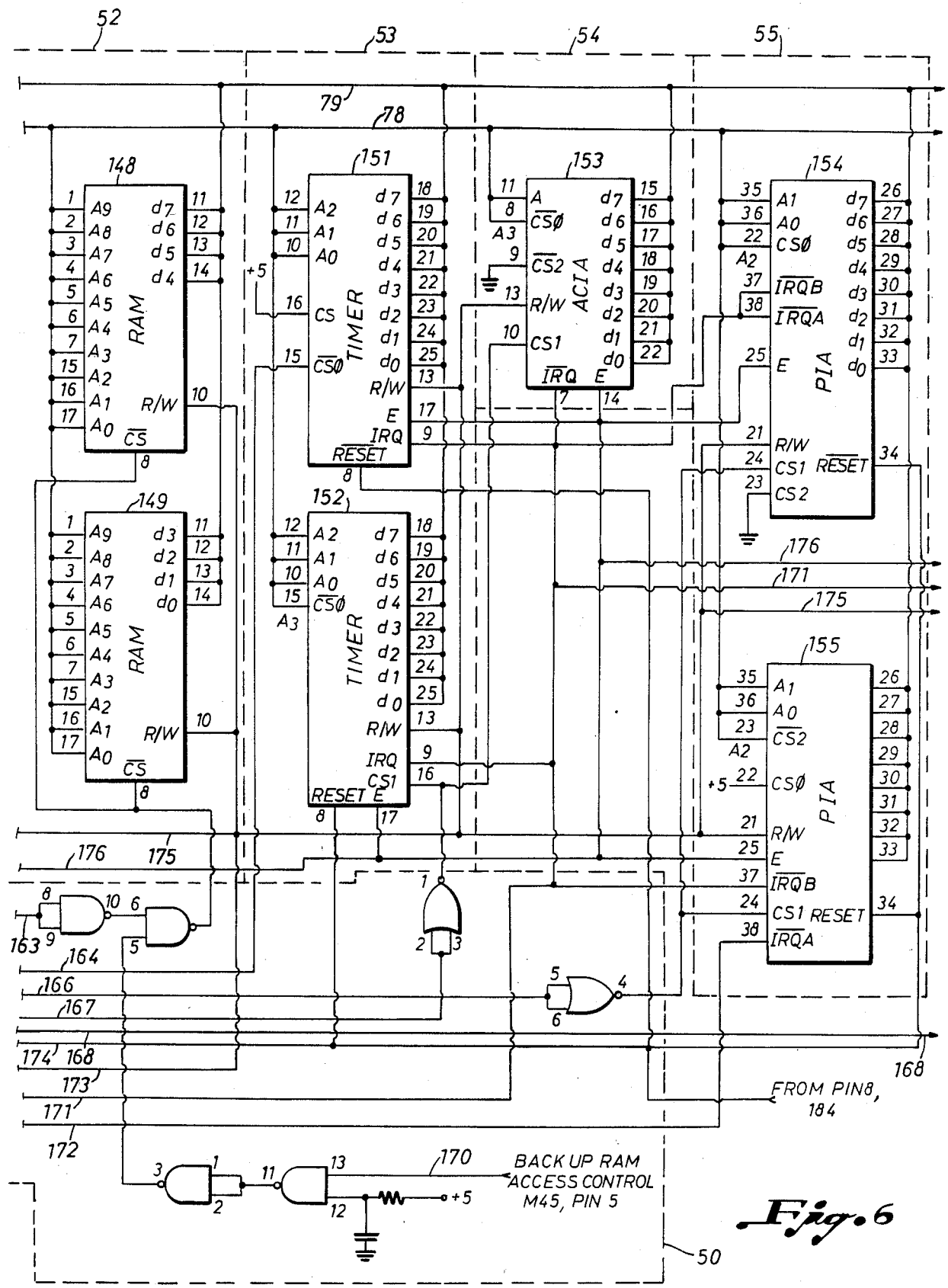
Figure 12:
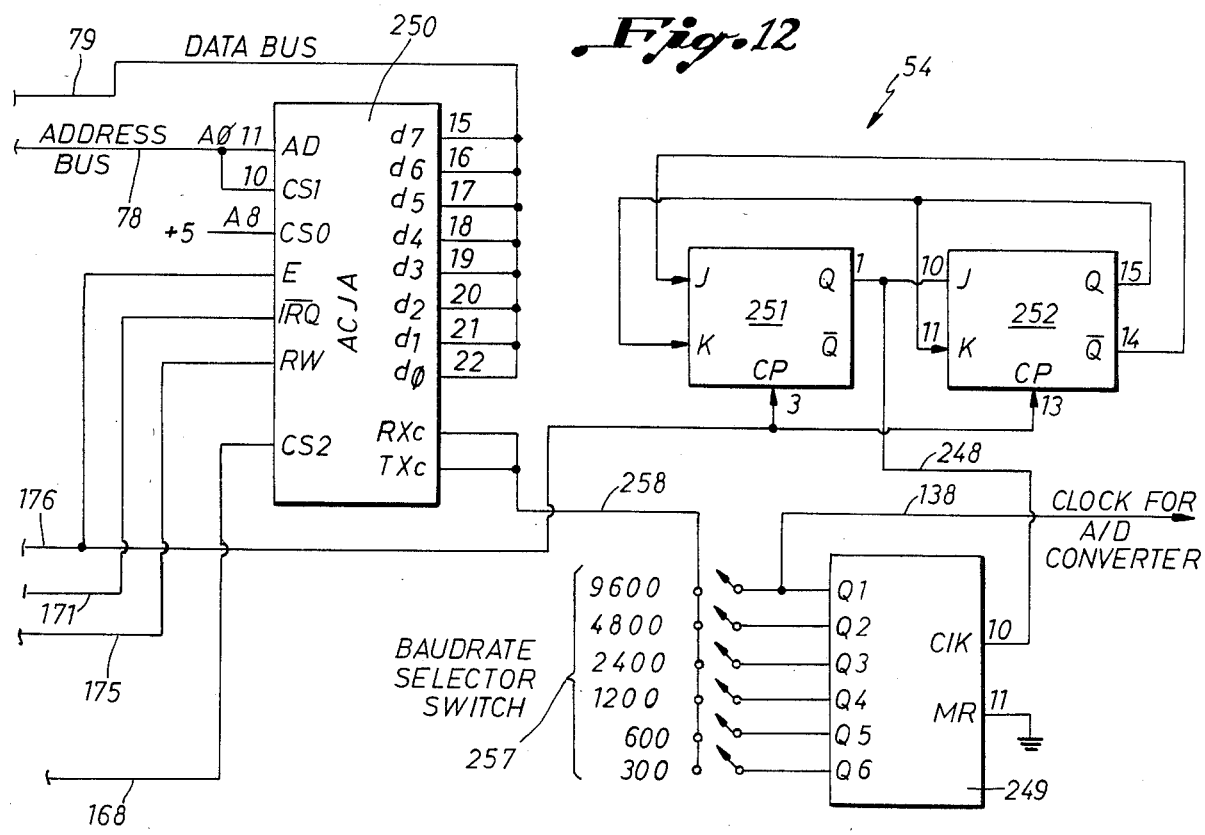
FIG. 12 is a schematic diagram illustrating the bus interface to one of the serial I/O circuits and its associated baud rate generator.

Operation of the CPU 50, ROM 51, RAM 52, timing function circuit 53, serial I/O controller 54 and parallel I/O controller 55 can best be understood with reference to FIGS. 5, 6, and 12.

In the illustrated embodiment shown in FIG. 5, the ROM 51 comprises two ROM chips 144 and 145.

In the illustrated embodiment, the RAM 52 includes RAM chips 146, 147, 148 and 149.

The CPU 50 includes a microprocessor 150. In a preferred embodiment, the microprocessor 150 may be a Motorola 6802 microprocessor. The microprocessor 150 may select a desired location of memory using the address bus 78 which is coupled to the ROM chips 144 and 145, and to the RAM chips 146, 147, 148 and 149. Information contained in memory is passed back and forth between the microprocessor 150 and memory 51 and 52 on the data bus 79.

The timer control circuit 53 includes a first triple timer chip 151 and a second triple timer chip 152.

The serial I/O controller 54 includes two asynchronous communication interface adaptors (ACIA), one of which is indicated in FIG. 6 by the reference numeral 153. The other ACIA is indicated with the reference numeral 250 in FIG. 12.

The parallel I/O controller 55 includes a first sixteen bit parallel port 154 and a second sixteen bit parallel port 155.

The second parallel port 155 includes output ports to output displays 75 and the SCR firing signal multiplexing circuit 66. Other outputs, which are illustrated in FIG. 1, are connected between the parallel port chips 154 and 155, but are not shown in FIG. 6.

Figure 11:
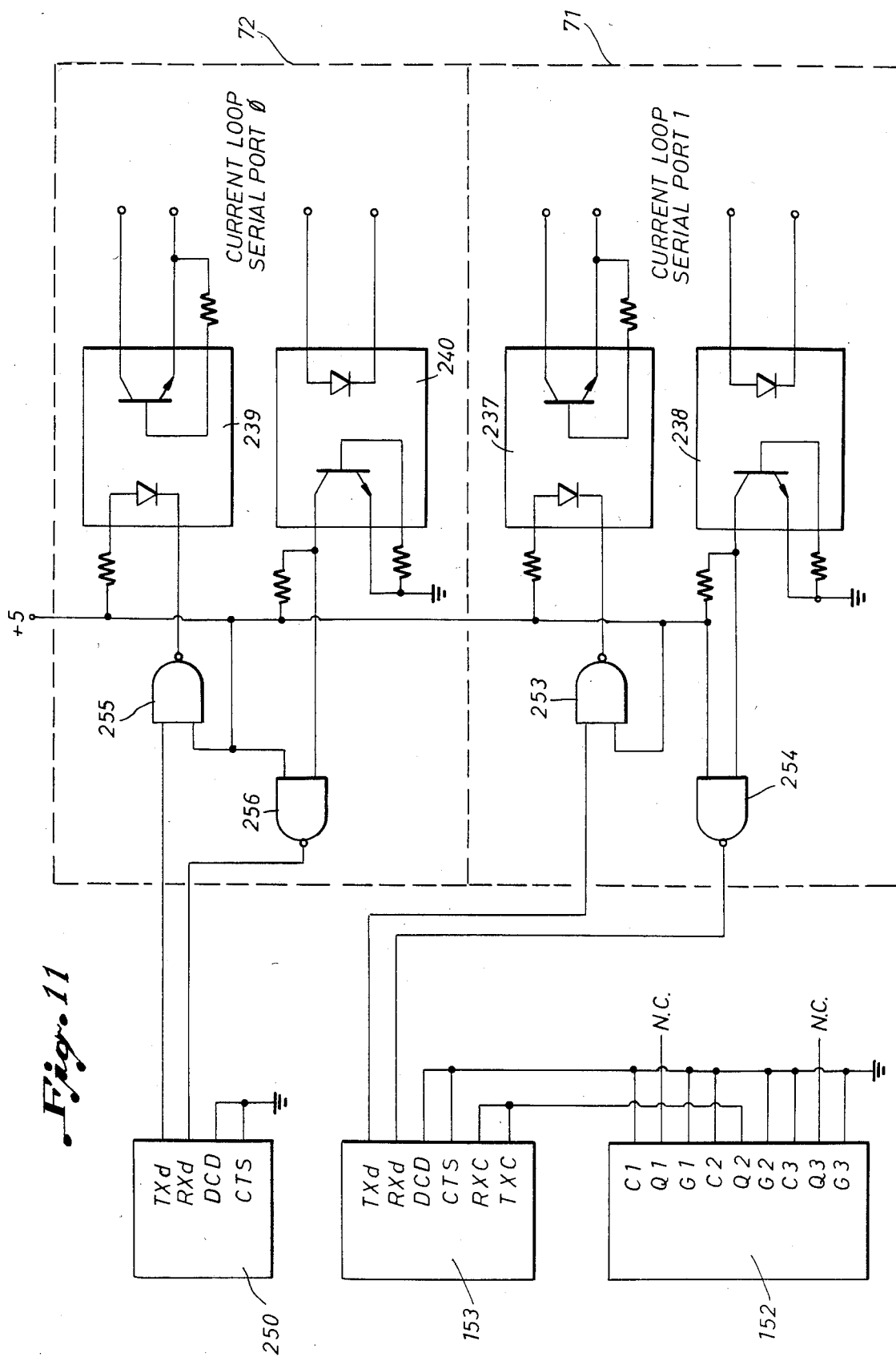
FIG. 11 is a schematic diagram illustrating the serial ports circuit, and current loop interface circuits associated therewith.

The interface adaptor (ACIA) 153 is connected to the current loop interface 71, as shown in FIG. 11 and FIG. 1, but which is omitted from FIG. 6.

A crystal 157 is provided for the microprocessor 150 to determine the clock frequency. In a preferred embodiment, the crystal 157 is a 3.579545 MHz crystal.

A ROM size select jumper 169 is provided to accommodate different sizes of the read only memory.

The microprocessor 150 uses a 74155 chip 156 as a means for signaling the ROM chips 144 and 145, the RAM chips 146, 147, 148 and 149, the triple timers 151 and 152, the interface adaptors 153 and 250, and the parallel ports 154 and 155. The chip 156 functions as a means for decoding a three bit signal on control bit input lines 158, 159 and 160. The chip 156 has outputs 161, 162, 163, 164, 165, 166, 167 and 168. One of the outputs will go to a logic zero depending upon the three bit input appearing on control bit input lines 158, 159 and 160. This provides the CPU 50 with a means for signaling the ROM 51, RAM 52, timing function circuit 53, serial I/O controller 54 and parallel I/O controller 55 selectively, depending upon which device the CPU 50 needs to address.

If the microprocessor 150 is operating correctly and power is turned on, a signal on conductor 170 will enable the RAM chips 148 and 149.

Low priority interrupts may be communicated between the microprocessor 150 and the parallel ports 154 and 155, the interface adaptors 153 and 250, or the timers 151 and 152 along an interrupt request line 171. The microprocessor can elect to ignore or postpone response to interrupts which appear on the interrupt request line 171. The microprocessor 150 reads to polarity detector 64 to determine the polarity of the AC signal.

A read/write line 173 is used by the microprocessor 150 to determine the direction of the data bus 79.

In the embodiment illustrated in FIG. 6, the RAM chips 148 and 149 are used as battery back-up RAM.

Figure 7:
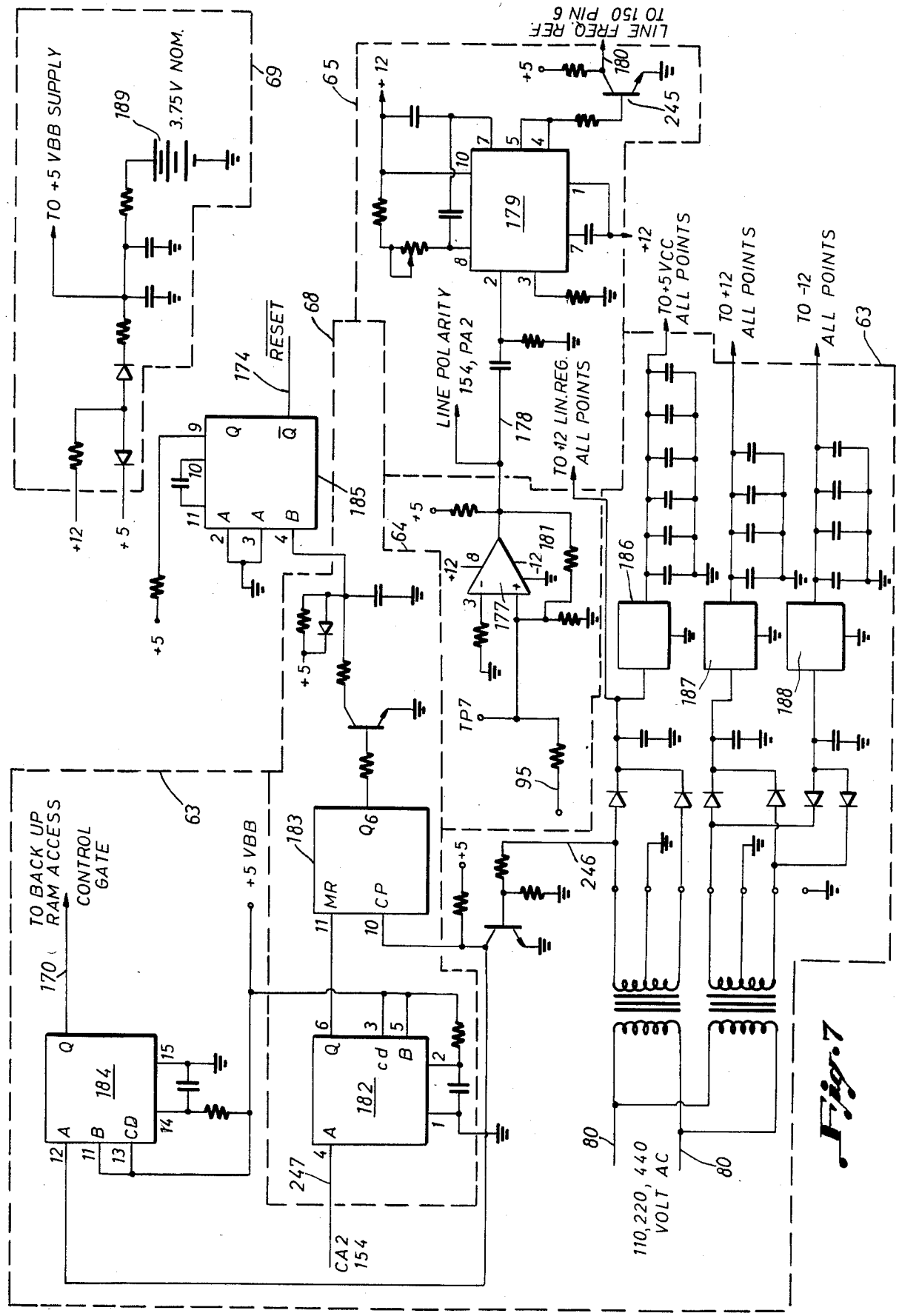
FIG. 7 is a schematic diagram illustrating the computer power supply, the phase locked loop and line polarity detector, the power on reset and watchdog reset circuit, and a portion of the battery backup circuit.

FIG. 7 illustrates in more detail the RAM battery back-up 69, the power supply 63, the phase locked loop 65, and the auto reset and watch dog timer circuit 68.

The phase locked loop 65 receives an input by conductor 95. The input signal is routed through a comparator 177. The output 178 of the comparator 177 can be used to detect the polarity of the alternating current signal on conductor 95. The output 178 of the comparator 177 is fed to an NE565 chip 179. The chip 179 will generate a sync output signal on conductor 180. The sync output signal may then be used to determine the period (and thus the frequency) of the alternating current signal. The sync output 180 provides non-maskable interrupts to the microprocessor 150. The transistor 245 is used as a level shifter. A resistor 181 is used to provide hysteresis to de-bounce the signal from the transformer 57.

The auto reset and watch dog circuit 68 includes a one shot 182, a twelve bit binary counter 183, and a one shot 185. In the illustrated example, a 60 Hz count pulse is provided on conductor 246. If left to continue counting, the counter 183 would count up its maximum value and generate a reset signal on conductor 174 through one shot 185. However, if the CPU 50 is functioning properly, every few moments it signals on line 247 through one shot 182 to reset the counter 183. This keeps output Q6 of the counter 183 from going "high", which would generate a reset signal on line 174. The software program control is written so that the counter 183 will be reset periodically so that it never reaches its maximum value. However, if noise interference, radio frequency interference, or other factors cause the CPU 50 to hang up or get "lost," the CPU 50 will in most cases fail then to reset the counter 183 and a reset signal will be generated on line 174 to reset the CPU 50.

The power supply 63 includes a one shot 184 to provide an enabling signal to back-up RAM. A five volt voltage regulator 186, and two twelve volt voltage regulators 187 and 188, are also provided.

The battery back-up circuit 69 includes a battery 189 which is connected to RAM chips 148 and 149.

Figure 8:
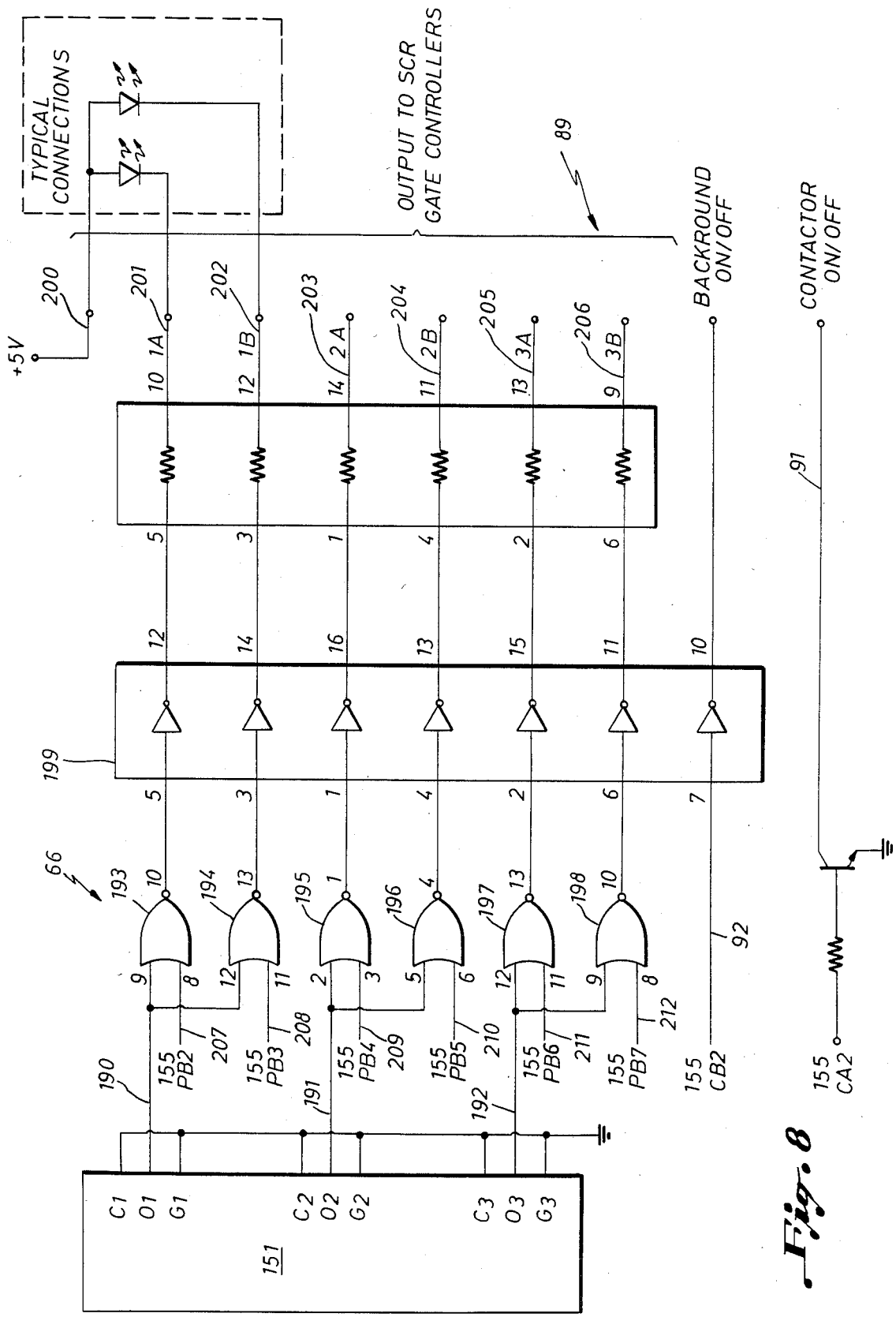
FIG. 8 is a schematic diagram illustrating the SCR timers and the SCR firing signal multiplexer.

FIG. 8 illustrates in more detail the SCR firing signal multiplexing network 66.

The microprocessor 150 selects a digital number to be loaded into each of the three timers contained in the triple timer 151. Each timer corresponds to one of the three phases. The multiplexing circuit selects one of two SCRs 100 which share the same phase.

When the microprocessor 150 loads a number into one of the counters 151, the counter begins to count down or decrement until it counts to zero. When the counter reaches zero, the timer output 190 (in the case of the first timer) changes logical state from a logical one to a logical zero.

In the case of the first timer, when the timer counts to zero, the first timer output line 190 will change from a logical one to a logical zero. This signal will be fed to a NOR gate 193 and NOR gate 194. One of the NOR gates 193 or 194 will be enabled by an enable signal on NOR gate enable line 207 or 208. The NOR gates 193 and 194 provide multiplexing means for selecting the appropriate SCR to be fired when the first counter decrements to zero and generates a logical transition at the first timer output 190.

The signal from either gate 193 or 194 is coupled through a bank of drivers 199 and a bank of resistors 200 to gate signal line 201 or 202 respectively. Gate signal line 201 is connected through an SCR gate controller to one of the SCRs 100. Similarly, gate signal line 202 is connected through an SCR gate controller to one of the SCRs 100.

The second timer output 191 and the third timer output 192 are similarly coupled to an appropriate SCR 100 through multiplexing means including NOR gates 195, 196, 197 and 198.

As will be explained more fully hereafter, the microprocessor 150 selects the appropriate value to be loaded to the three timers in the triple timer circuit 151 in order to generate timer output signals at the first, second and third timer outputs 190, 191 and 192 at an appropriate time to fire the SCRs 100 in a manner which will achieve the desired level of current or voltage.

Figure 9:
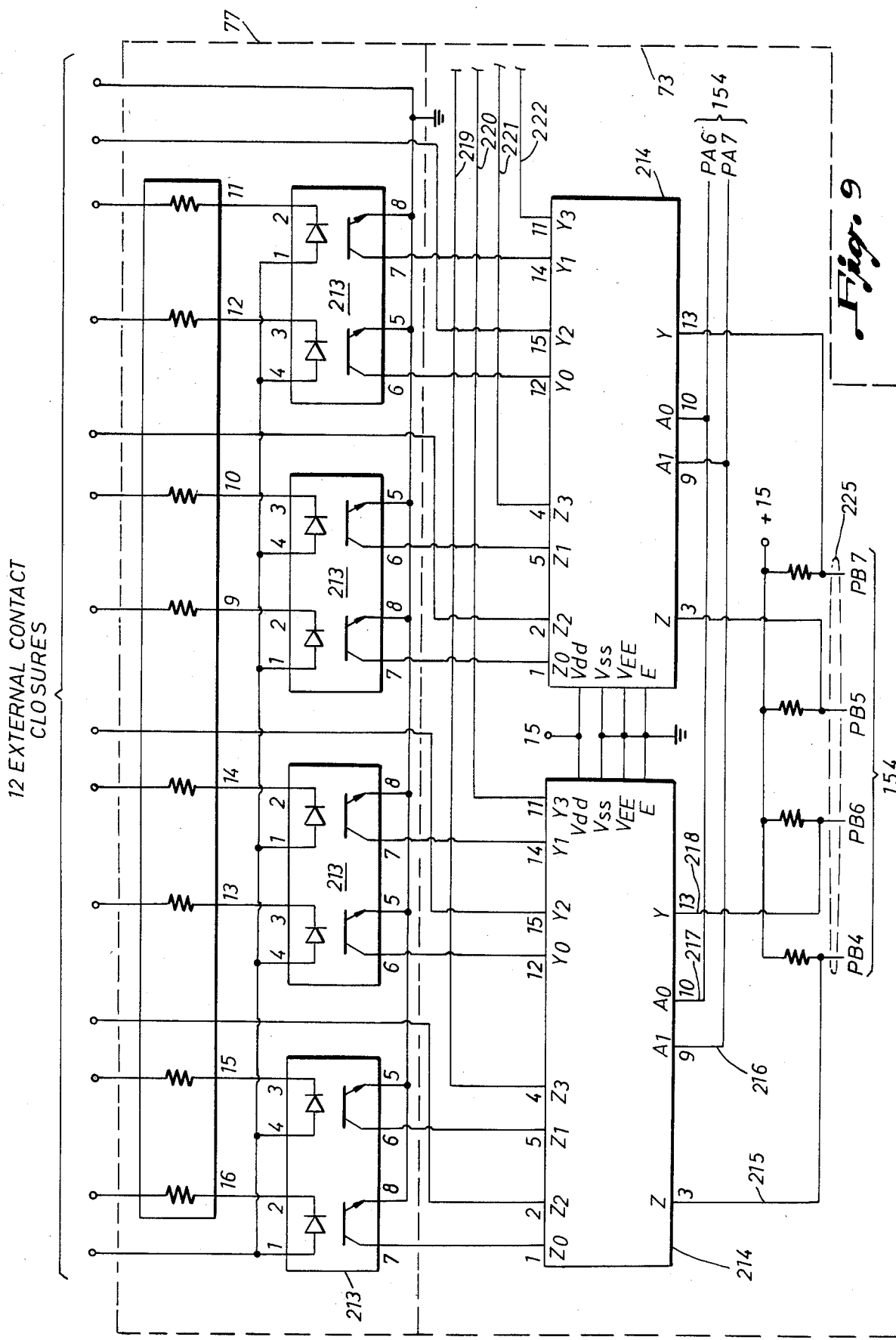
FIG. 9 is a schematic diagram illustrating the parallel port multiplexer and the opto-isolators circuit.

The parallel port multiplexer 73 and the opto-isolators 77 are illustrated in further detail in FIG. 9.

The opto-isolators 77 shown in the illustrated embodiment include four dual opto-isolator chips 213. The dual opto-isolator chips 213 are connected to external contact closures, such as panel switches, wire feed tripper switches, overheat trigger switches, and other external switches which provide input to the CPU 50. The dual opto-isolator chips 213 are fed into dual four input analog switches 214, which provide clean, bounceless signals which are more readily processed without error by the CPU 50.

The analog switches 214 function as the parallel port multiplexing circuit 73. The outputs 215 and 218 are selectively connected depending on the combination of bits appearing on select lines 216 and 217. The outputs 215 and 218 may then be selectively fed through the parallel I/O controller 55 to the CPU 50. Information is fed to the CPU 50 through a parallel port connected to cable 225.

Figure 10:
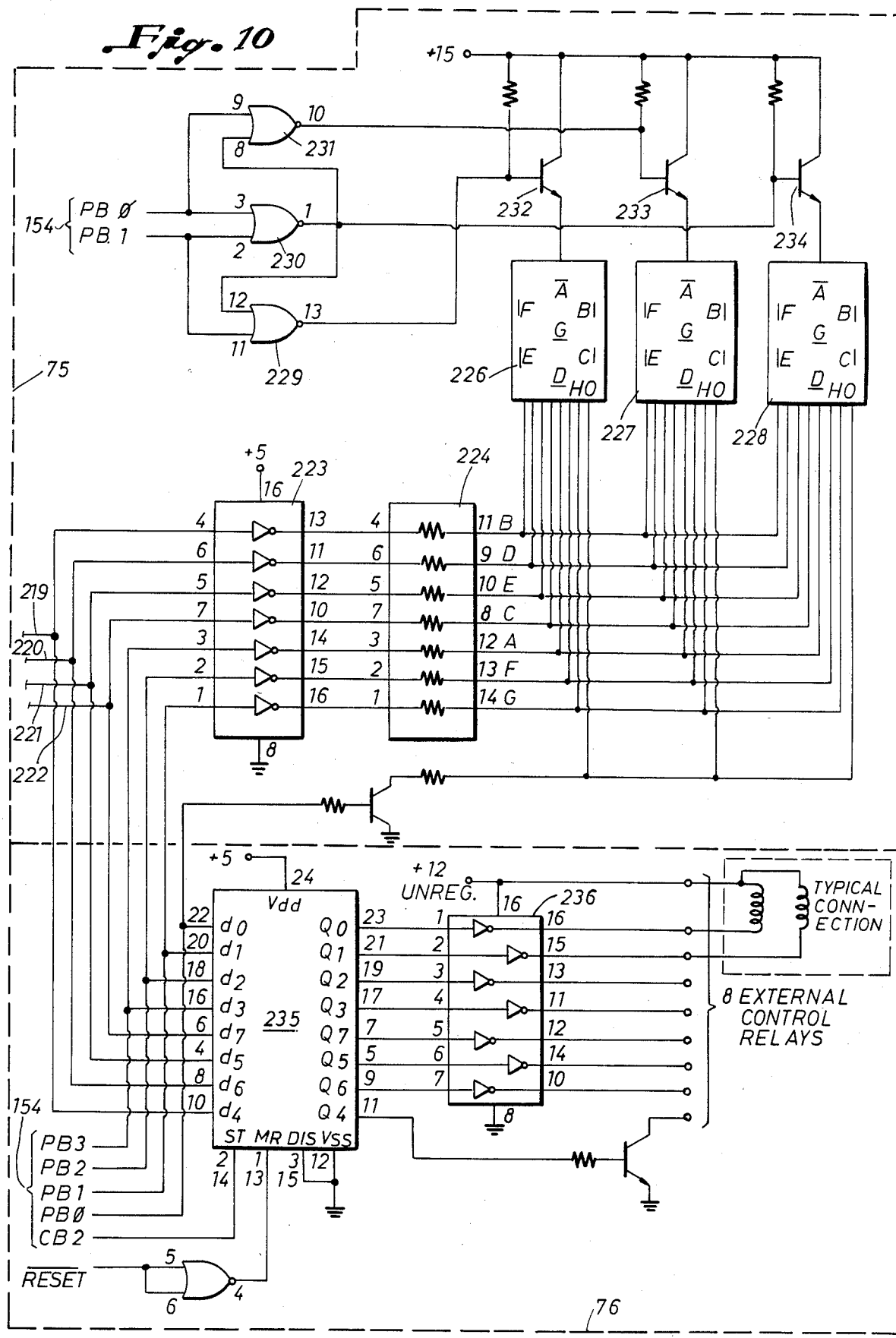
FIG. 10 is a schematic diagram illustrating the output displays and relay drivers circuits.

Driver bank 223 and resistor bank 224 illustrated in FIG. 10 are used to drive LEDs 226, 227 and 228 used for output displays 75. The LED displays 226, 227 and 228 are multiplexed using multiplexing means including gates 229, 230 and 231, and transistors 232, 233 and 234.

The relay driver circuit 76 is illustrated in further detail in FIG. 10, and includes an eight bit latch 235 and a driver bank 236. The output from the driver bank 236 may be fed to external contact relays to control the positioning of a workpiece, the feeding of wire during a welding operation, the actuation of the flow of inert gas to use as a shield during welding operations, etc.

FIG. 11 illustrates in further detail the current loop interfaces 71 and 72, and the interface side of serial I/O ports 153 and 250.

The asynchronous communication adaptor (ACIA chip) 153 is gated through NAND gate 253 and 254 to opto-isolators 237 and 238, which forms current loop 71. Section 2 of timer 152 generates the baud rate for ACIA chip 153. (Section 1 of timer 152 is used to generate interrupts at six times the line frequency.) Section 3 of timer 152 is used to measure the period of the phase locked loop 65, and thus the period of the AC line waveform.

The ACIA chip 250 is similarly gated through NAND gates 255 and 256 to opto-isolators 239 and 240, which forms current loop 72. The baud rate of serial I/O port 250 is determined by the circuit illustrated in FIG. 12. A square wave clock signal is coupled along clock line conductor 176 to JK flip flops 251 and 252. The flip flops 251 and 252 are configured to provide a divide by three function. This divided down signal is coupled along conductor 248 to a binary counter 249. The baud rate for serial I/O controller 250 is determined by the manual baud rate selector switch, indicated generally by the reference numeral 257. This is fed to the serial I/O controller 250 on line 258.

The clock for the A/D converter 67 is also conveniently provided by the baud rate circuit for the serial I/O controller 250.

It is desirable in a microprocessor controlled arc welding supply, to achieve an optimum trade off between hardware and software. If too much is left to the software, the program can become compute bound. Since this invention involves the real time control of welding operations, the apparatus is unlikely to function properly if it becomes compute bound. In the disclosed apparatus, interrupts are generated at six times the line frequency. The software must perform the task assigned to it fast enough so that it can adequately process the interrupts which are generated.

The disclosed apparatus senses the voltage and current. This is accomplished by the current and voltage sense elements 62. The CPU 50 processes this information by comparing it with the desired current or voltage level. The CPU 50 determines the amount of correction which must be signaled to the timing function circuit 53 so that the correct adjustment may be made in the firing signals fed along conductors 90 to the SCR bank 58 to adjust the welding signal appearing on conductor 98. The CPU 50 determines an appropriate adjustment to the amount of delay which is allowed to elapse between the moment in time that an SCR becomes forward biased, and the moment in time that a firing signal is sent to the gate 103 of the SCR 100 to cause it to conduct or "fire".

A significant feature of the present invention involves the use of look-up tables to determine the amount of adjustment which should be made to the SCR firing angles in order to correct the output of the common welding lead 81. Look-up tables are preferably precalculated and placed in RAM 52 prior to welding in order to save computer time.

The implementation of these and other features is accomplished in the illustrated embodiment. A review of the software program will assist in understanding the implementation of these features, a listing of which is appended hereto and labeled "Listing No. 1". The attached listings are incorporated herein by reference.

Consider, for example, that the arc welding supply is running in a constant voltage mode. The circuit would sample and store the value of the voltage at a particular moment in time, which value we may refer to as $V_t$. The next voltage sample may be referred to as $V_{t+1}$. At any particular moment during a welding procedure, the apparatus will have in memory a most recent voltage sample value $V_{t+1}$ and a previous sample value $V_t$. In a preferred embodiment, the apparatus will average $V_{t+1}$ and $V_t$, which we may refer to as $V_{avg}$. The apparatus will then compare $V_{avg}$ with a reference voltage, which we may refer to as $V_{ref}$.

The reference voltage $V_{ref}$ represents the value that the voltage should have at that particular moment in time. In a constant voltage mode, of course, the value of $V_{ref}$ will be constant. However, it should be appreciated that $V_{ref}$ may change over time. For example, the voltage may be programmed to ramp from one value to another at a specified rate. In such an example, $V_{ref}$ will change over time, and the circuit will operate to adjust the welding voltage output to ramp in accordance with the changes in $V_{ref}$.

In a preferred embodiment it is also desirable to determine the first derivative of the voltage or current, as the case may be. More specifically, the first difference is determined for successive voltage samples. The first difference is computed as $V_{t+1} - V_t$.

It is undesirable to compute according to an algorithm the amount of adjustment which should be applied to the angle at which the SCRs 58 are fired. To do so would involve too much compute time and would not represent an optimum trade off between the hardware and software, which is critical in this invention. Significantly, in this invention look up tables 400 are utilized for determining the correction which should be applied to the SCR firing angles. An error is computed based upon the formula:

$$V_e = V_{avg} - V_{ref}$$

and a first difference is computed based upon the formula:

$$V_d = V_{t+1} - V_t$$

The CPU 50 uses the value of $V_e$ to point to a location in a look up table 400 which contains the value by which the SCR angle should be changed. The CPU 50 then takes the value obtained from the table 400 and transfers it to the timing function circuit 53 so that the value may be used to change the amount of delay used to determine the SCR firing angles.

The appropriate value in the look up table 400 for a given $V_e$ will vary based upon the value of the first difference $V_d$. Thus, the value of $V_d$ is used to determine which table 400 should be used by the CPU 50. That is, one table 400 is provided where $V_d$ is negative. A second table 400 of look up values is provided where $V_d$ is positive. The CPU 50 first selects the appropriate table by examining the value of $V_d$, then selects the appropriate element of the look up tables 400 by examining the value of $V_e$.

Alternatively, this process may be conceptualized as a two dimensional table 400 in which $V_d$ is used to determine the column and $V_e$ is used to determine the row of the appropriate element whose value is used by the CPU 50 to signal the timing circuits 53 to adjust the firing angles of the SCR bank 58.

The look up tables 400 utilized in the preferred embodiment of the invention provide the speed which is necessary for an effective implementation of real time control of arc welding functions utilizing the features of the present invention. Although the above description is with reference to a constant voltage mode, the same principle applies for a constant current mode. The value of the elements in the look up tables 400 may be determined empirically.

In other words, it is desirable to provide a strong correction table and a weak correction table. The strong correction table provides a table of correction factors which provide relatively strong corrections to the variable, such as voltage or current, which is being controlled. Conversely, a weak correction table provides a table of weak correction factors which are applied to yield relatively weak changes in the factor, such as voltage or current, which is being controlled. The appropriate table may be selected by comparing the current voltage sample $V_{t+1}$ (or $V_{avg}$) with the reference voltage $V_{ref}$ to determine whether the voltage is above or below the desired setting. Then the first difference $V_d$ is examined to determine whether the voltage is rising or dropping. These two factors are used to determine whether the voltage is moving toward or away from the desired setting $V_{ref}$. If the voltage is moving toward the desired voltage setting, a weak correction table is used to adjust the voltage. If the voltage is moving away from the desired setting, the strong correction table is selected.

For example, if $V_{avg}$ is greater than $V_{ref}$ and $V_d$ is positive (indicating that the voltage is rising), the CPU 50 selects the strong correction table as the appropriate table to use as a look up table because the voltage sample is above the desired setting and rising, and is thus moving away from the desired setting.

The sign of the error $V_e$ is used to determine whether to add or subtract the adjustment which is provided by the look up table. The number which is obtained from the look up table is used as an adjustment which is applied to the current firing angle of the SCR bank 58.

Circuit operation may be best understood by referring to the software listing which is appended hereto and incorporated herein by reference. Skipping over the initialization procedures and service routines, the most recent voltage sample is picked up and processed by the steps near the label "DISOUT". The value of $V_{avg}$ is first computed. The value of the previous sample $V_t$ is stored in memory location labeled "DVSAM+3". This value is loaded in accumulator B. The current sample $V_{t+1}$ is then loaded from accumulator A into memory location "DVSAM+3". This saves the value of $V_{t+1}$, which will become the previous sample value for the next time $= t+2$.

The first difference is computed and stored in memory location "DVSAM+1". The sign of the first difference is stored in memory location "DVSAM+2". $V_{avg}$ is stored in memory location "DVSAM".

In a preferred embodiment, the values of memory locations which are used to output information to output display 75 are also updated.

It is desirable to be able to select a constant current or constant voltage mode without requiring hardware reconfiguration of the apparatus. In the present invention, this is significantly accomplished by software control. Specifically, the routine labeled "RAMP6" selects constant voltage or constant current operation of the apparatus. Importantly, this invention also allows for operation in other modes. For example, the apparatus is capable of operating in a constant power mode where the power (which is the product of the current times the voltage) is held constant.

In the example of a constant voltage mode, control branches to the routine labeled "FIXCV". It will be recalled that the value of $V_{avg}$ was previously loaded in memory location "DVSAM". The contents of DVSAM are loaded into accumulator B. The contents of accumulator B are then compared with the value of $V_{ref}$, which is stored in memory location "SETING". Program control then branches to routines "DECRV" or "INCRV" based upon the results of the comparison. If $V_{avg}$ is higher than $V_{ref}$, program control branches to routine "DECRV". Conversely, if $V_{avg}$ is less than $V_{ref}$, program control branches to routine "INCRV".

In the case where program control branches to routine "INCRV", the value of $V_{ref}$ is loaded into accumulator A. The apparatus then computes the value of $V_{avg} - V_{ref}$, which is the value of $V_e$. The circuit then loads register X with the contents of memory location "#TERRNM". Accumulator B is loaded with the contents of memory location "DVSAM+2", which contains the sign of the difference $V_d$.

The contents of accumulator B are shifted right one bit. Program control then branches on a carry clear (which is one means for branching depending on the sign of the first difference $V_d$). If the carried bit is not clear, then the next statement will be executed which causes the contents of memory location "#TERRM" to be loaded into register X, and consequently overwritten over the previous contents of register X. Then, in any event, program execution branches to routine "TVLOOK" which looks up the appropriate value of the table.

These steps are intended to load into register X the address of the first value in the appropriate look up table. The memory location "#TERRNM" contains the address of the first value in the strong correction table. The memory location "#TERRM" contains the address of the first value in the weak correction table. Thus, if the program logic determines that the strong correction table is not needed, the address of the first value of the weak correction table is overwritten over the previous contents of register X.

The routine "TVLOOK" takes the value of the error in the voltage $V_e$ which is at that time contained in accumulator A and adds it to the value of the address of the first element of the look up table (which at this time is in register X). This operation then gives the address of the table location which contains the correct adjustment value to be used to adjust the firing angles of the SCRs 58.

After returning from routine "TVLOOK", control then branches to subroutine "INCR". Routine "INCR" is used to modify the firing angle of the SCRs 58 and applies the correction to the firing angle of the SCRs which is obtained from the look up table. The routine substracts the adjustment to the firing angle and then returns.

Similarly, if $V_{avg}$ were higher than $V_{ref}$, control would have branched to routine "DECRV". In order to obtain a positive result, the order of subtraction of $V_{avg}$ from $V_{ref}$ is reversed in subroutine "DECRV". After branching to subroutine "TVLOOK" to look up the appropriate value for the look up tables, control branches to subroutine "DECR" which modifies the firing angle of the SCRs 58 by adding an adjustment to the firing angles.

Although the above example is described with reference to voltage, program control is similar in the example of a constant current control mode. In such a case, the routines "FIXCA", "INCRA", and "DECRA" are utilized along with subroutines "TVLOOK", "INCR" and "DECR" to determine the appropriate correction to the firing angles of the SCRs 58.

The look up tables, or error correction tables, may be calculated and set up in the case of voltage corrections, by the routine labeled "CALCVT", and subsequent routines. A separate voltage look up table is computed for converging voltage values, and for diverging voltage values, which are preferably calculated prior to welding to save computer time. In the case of current control, such as a constant current mode, look up tables or error correction tables may be calculated and set up using the routine "CALCAT" and subsequent routines. The tables are preferably precalculated to save computer time. A separate error look up table is provided for a converging current circumstances, and for a diverging current.

The look up tables may be modified during welding in order to empirically adjust the calculated values based upon results experienced while welding. This could be done during welding by the CPU 50. This would take the form of an artificial intelligence routine, where the CPU 50 evaluated the results of a correction applied to the firing angles of the SCRs 100, and used the results of that evaluation to "learn" a better adjustment parameter which would more closely approximate the adjustment parameter that was necessary to bring the welding output into correspondence with the reference value that was desired. A simple form of such a routine would be to add or subtract, as appropriate, a small amount from an adjustment parameter anytime that use of the adjustment parameter failed to bring the welding output into correspondence with the reference value (within predetermined tolerances, if desired). In other words, the CPU 50 could "tweak" the values in the look up tables and, in effect, make itself "smarter" as it modifies the tables on the fly during welding.

The routines beginning with the label "LINEIN" are used to read in and interpret user commands which are used to establish mode of operation and configuration, and, for example, to set values such as $V_{ref}$ which will be used for program control. In the case of a constant current mode, the user commands may be used to set the value of $I_{ref}$.

User commands may take the form of eight different types of commands. The different types of commands are "A" commands, "C" commands, "F" commands, "H" commands, "P" commands, "L" commands, "U" commands, and "Y" commands. These various commands form what may be referred to as the "user code".

Some examples of user commands are given in "Listing No. 2", which is incorporated herein by reference. "Listing No. 2" contains a listing of user codes to initiate a MIG welding procedure using the present invention. The left column contains line numbers. The center column contains the user code. The right column contains explanatory comments which describe the action taken by the welding apparatus in response to each user command.

Each user command has a two digit suffix, and a three digit operand field.

"A" commands are commands to set amps in the welding apparatus. "A" commands take the form:

Ann XXX where the letter "A" identifies the command as an "A" command, "nn" is a two digit suffix which identifies the particular "A" command that is used, and "XXX" is a three digit operand field. For example, "A00 XXX" sets the amps to zero (the operand is not used in this command).

The command "A01 XXX" sets amps equal to the value "XXX" (which must be in the range 0–255 amps). That is, the command "A01 050" would set up a constant current mode where the current was set equal to 50 amps. The command "A11 XXX" achieves the same function, except that "XXX" may be 0–510 amps. "A21 XXX" is similar, but "XXX" may be 0–996 amps.

The command "A02 XXX" will ramp to a current setting of "XXX" amps (0–255 amps). The ramp time must have been previously set with an appropriate ramp command. The command "A03 XXX" is similar, but program execution will not continue until the amp setting is reached. The range of amps that may be ramped to is increased to 0–510 amps for the "A12" and "A13" commands. The range is 0–996 amps for the "A22" and "A23" commands.

The command "A04 XXX" is used to compare the value of amps (where "XXX" is 0 to 255 amps), and is executed prior to a branch command which tests the results of such comparison and branches accordingly. Similarly, the commands "A14 XXX" and "A24 XXX" extend the range of comparison to 0–510 amps and 0–996 amps, respectively.

The commands "A05", "A15", and "A25" are used to set the bio-feedback off limit. These commands set the amps at which welding power will down slope or shut down when output current falls or passes through this limit. Of course, the commands take the form "A05 XXX". The bio-feedback mode must have been previously turned on.

The commands "A06", "A16" and "A17" set the bio-feedback high limit. These commands set amps to an upper limit, when in the bio-feedback mode, which the output current cannot exceed while welding.

The "C" commands are also referred to as "GO TO" commands. The command "C01 XXX" branches unconditionally to an even line number given by the operand "XXX". It can be in the range 0–998.

The command "C02 XXX" is a branch if true command. It must be preceded by a test or compare command. If the test or compare returned a true condition (or "1"), then execution will branch to the even line number set in the operand "XXX". The test flag is used by this command. If the test flag is a "0", i.e., the test was false, execution passes to the user command on the next even line. The command "C03 XXX" is just the opposite, and will branch if false.

The command "C04 XXX" will branch if equal. It branches based on a test of a previous test or compare statement. The compare statement and branch statement must be in the same format, i.e., amps, volts, counter, etc. The command "C05 XXX" will branch if greater than. For example, if the voltage output of the apparatus is greater than the compare value, the program execution can be made to branch with this command. The "C06" command is similar, but the effect is branch if less than.

The commands "C07" and "C08" branch if the counter is 0, or not equal to zero, respectively. "C09" will cause a branch if the arc circuit is open, i.e., the arc failed.

Other "C" commands include "C10" (branch if ramping), "C11" (branch if clock elapsed), "C12" (branch if clock not elapsed), "C13" (branch subroutine), and "C14" (set start point for beginning execution of program).

The "F" commands are peripheral commands. The "F" commands may be used to generate the communication of digital data to the serial output ports 84 or 85. This data can be interpreted by a peripheral device to perform some function, such as turn on a motor to position the part to be welded, rotate a turntable at a predetermined speed, feed wire at a predetermined rate, etc. In the form "Fnn XXX" the command may be used to send device "nn" the message "XXX", which may be coded as desired for the particular device used. The command "Fnn XXX" may be used to signal motor "nn" to rotate at speed "XXX".

The "H" commands are miscellaneous commands. "H00" is a no operation command, or null command. "H01" is a halt command, and waits for a manual stop or hand reset. "H02" stops execution of a program. "H03" causes the program to single step.

"H04 XXX" increases the counter by "XXX" (0–255). "H05 XXX" decreases the counter by the value of the operand "XXX". "H06 XXX" may be used to set the counter to the value "XXX" (0–255). "H07 XXX" compares the counter to the value "XXX". This command is used immediately prior to a branch command.

The command "H08 000" turns the background supply 60 off. The command "H08 001" turns the background supply 60 on. Similarly, "H09 000" turns the main contactor 56 off, and "H09 001" turns the main contactor 56 on.

The commands "H10" and "H11" increase or decrease, respectively, the volts or current, setting a taper condition.

The command "H13" is a subroutine return.

The command "H18 000" turns off the bio-feedback loop. The command "H18 XXX" turns on the bio-feedback loop, where XXX is not equal to 000. The operand "XXX" sets a slow response time or slow steps if low, and a fast response time, large steps and very sensitive response if "XXX" is high. The operand "XXX" may be in the range of 0–255.

The "L" commands are time commands. For example, the command "L01 XXX" sets a delay for "XXX" seconds. For the L01 command, "XXX" may not exceed 25.5 seconds. The command "L11" allows a delay in the range of 0–255 seconds. "L" commands may be stacked for longer delays. "L02" sets the clock and proceeds. "L12" sets the clock in the range 0–255 seconds and proceeds.

The command "L03 XXX" sets the ramp time. The operand "XXX" may be 0–25.5 seconds. Usually used immediately preceding a ramp command, such as "A02 XXX". "L13 XXX" is a similar ramp function, where "XXX" is 0–255 seconds.

The "P" commands are test commands, and usually precede a branch command. "P02" tests a local switch "x" to determine if it is closed. In "Listing No. 2", this command is used to determine whether a turntable has been rotated to the proper position to open a microswitch, used to signal when the turntable is positioned properly for the weld. The operand "x" may be 1–8. The commands "P03" to "P31" similarly test banks of eight switches selected individually by an operand "x".

"U" commands are voltage commands. The command "U01 XXX" sets the voltage to a value "XXX" in the range 0 to 45.0 volts DC. The command "U02 XXX" ramps the voltage to the value "XXX" (0–45.0 v). An "L03" or "L13" command should immediately precede this command, to set the time of the ramp. Similarly, "U03 XXX" ramps the voltage and waits. "U04 XXX" is used to compare the voltage output of the apparatus with the operand "XXX". The "U04" command is usually used immediately preceding a branch command.

The "Y" commands are relay commands. "Y01" opens all relays. "Y02 XXX" will close local relays 1–8 for "XXX"=1–8, will close all 8 local relays for "XXX"=9, will open local relays 1–8 for "XXX"=11–18, and will open all local relays for "XXX"=19. Similarly, commands "Y03" to "Y31" will open or close banks of eight individually selectable relays for each instruction.

The user code is used to control the resilient operating program, referred to as the "executive code", which is listed in "Listing No. 1". Welding procedures are programmed using the user code, which is placed in the RAM 52. In the illustrated embodiment, the RAM 52 has a capacity of 1000 lines of user code, with each line consisting of three characters or digits. User program lines are numbered 000 to 999. In the illustrated example, even numbered lines are executable commands, for example, of the form "Ann". Odd numbered lines contain a three digit operand for the preceding even numbered line.

Programs may be manually loaded into RAM 52 by switches 74, preferentially four switches 74. Line numbers and program contents may be displayed on the LEDs. Each switch 74 may have a specific function.

The input switches 74 may be used to increase or decrease voltage or current, start execution, stop execution, modify the user code and program, load a new program, dump an existing program, etc. The user code in RAM 52 may be sent to a remote printer, tape punch, cassette tape, disk drive, magnetic tape drive, terminal, or computer for storage or recording for future use. Similarly, user code programs may be loaded into RAM 52 from similar such devices (including a card reader, paper tape reader, keyboard, as well as many of the above listed devices).

The present invention includes the significant feature of having the capability of switching from a constant current mode to a constant voltage mode, or vice versa, during a weld, without extinguishing or disturbing the arc. An example of this is shown in the user code of "Listing No. 3", which is incorporated herein by reference.

The MIG torch is switched down and local switch 1 tested until the torch locks in place. The command "Y02 005" closes relay 5 of switch bank 2 to switch the MIG gas on (i.e., the inert shield gas). The command "L01 02.0" delays for 2 seconds to allow the gas to purge air from the MIG torch. The command "Y02 006" closes relay 6 to switch the wire on. The command "U01 05.0" changes the voltage to 5 volts. The oscillator is switched on. The command "C09 352" retries if the arc fails. The commands "L03 00.2" and "U03 19.0" then ramp to a constant 19 volts in 0.2 seconds (once the arc has started). After a delay of 1 second, motor 1 moves forward at 26 percent of its maximum speed (see command "F01 026"). Command "L11 060" at line 36 causes a delay of 60 seconds, while the welding apparatus continues to weld in a constant voltage mode.

The apparatus then switches to a constant current mode at line 362, with the command "A01 125" (which sets amps to 125 amps), without extinguishing the arc. The command at line 364 ("L11 060") then delays for 60 seconds while the welding apparatus continues to weld in a constant current mode.

The command "F01 000" stops the motor, the apparatus delays 1.5 seconds (to finish the weld), the wire is switched off ("Y02 016"), and the apparatus ramps down to 0 amps in 0.3 seconds, with commands "L03 00.3" and "A02 00.0", at lines 372–375. After a delay of 4 seconds, the MIG gas is switched off with the command "Y02 015". Finally, the MIG torch is switched up with the command at lines 382–383, and the apparatus halts ("H02 000").

Thus, the apparatus can reconfigure itself from a constant voltage mode to a constant current mode, or vice versa, even during a weld, without requiring hardware reconfiguration or even extinguishing the arc.

A TIG touch start procedure is shown in "Listing No. 4", which is incorporated herein by reference. The procedure is explained by the comments to the right of each user command.

The present invention includes a method of controlling a welding apparatus, which includes one or more steps. First, the step of sensing a first welding sample may be performed. This welding sample may be a sample of a voltage reading, or a current reading. In the case of voltage, the value would be $V_t$. The second step of sensing a second welding sample would be performed. The second welding sample would similarly be indicative of either a voltage or a current. The second value sensed would be, in the case of voltage, $V_{t+1}$.

The step of computing a first derivative parameter would be performed by setting $V_d = V_{t+1} - V_t$. That is, the first and second welding samples would be subtracted.

The step of computing a difference parameter would then be performed. The error parameter $V_e$ would be computed by subtracting the second welding sample from a predetermined control parameter $V_{ref}$.

The step of looking up an adjustment parameter from a table of predetermined correction factors would be performed. The location of the table which would be used to yield the correction factor would be determined by using the computed values $V_d$ and $V_e$.

The value returned from the look-up table would then be used to adjust elements which control the welding current or voltage. The timing circuits controlling the firing angle of the SCR bank 58 would be updated by the CPU 50 using the adjustment parameter.

The present invention also includes a method for touch starting the arc welding supply, for example, in a TIG welding mode. The steps of such a method may include the steps of setting a small voltage, for example ½ volt or 1 volt, between the work piece and the welding lead. (Note that, in contrast with the present invention, a conventional welding power supply would be at maximum voltage on the order of 80 volts at this point.)

The step of touching the tip to the work piece would then be peformed. The current would be sensed to determine when the current started to flow, or the voltage could be sensed to determine when the voltage dropped to zero (indicating that the top was shorted to the work piece). When current starts to flow, the welding power supply should be set up to provide 1 amp constant current, or some other predetermined value which is preferably low. If desired, background voltage supply could be turned on, when setting the 1 amp constant current mode. The tip could be withdrawn slightly from the work piece in order to draw a thin weak arc. Note that in a conventional welding power supply, the current jumps to the set current value, which can result in a spot weld and the electrode can stick to the work piece.

The method includes the step of sensing the current or voltage to determine whether a thin arc has been successfully drawn between the work piece and the welding tip. If the flow of current is sensed (which will be held at a low value) then a thin arc has been successfully drawn. If the flow of current is not sensed, then the background voltage should be turned off, and the procedure should return to the initial step of no current and a low voltage on the order of 1 volt.

If a thin arc is successfully sensed, the step of ramping up the current to a predetermined desired value for welding may be accomplished. A typical current level desired may be on the order of 100 amps at 15 volts.

Conventional methods which have been attempted to start a TIG welding procedure include the use of high frequency pulses on the order of 15,000 to 20,000 volts. These high frequency currents can emit significant electromagnetic interference which can cause the malfunction of a robot welding device, as well as other equipment sensitive to EMI or RFI. Conventional attempts to scratch start can damage the tungsten tip of the welding electrode, as well as contaminate the work piece metal with tungsten.

It is desirable in a MIG touch start procedure to first heat the wire white hot momentarily to soften it before ramping up to full current. This lessens the tendency of the wire to "explode", and results in a smoother transition into the weld.

The present invention includes a preferred MIG start procedure. Such a procedure may include the steps of lowering the MIG torch, setting a constant voltage of a low predetermined value (such as 5 volts), switching the wire on, and testing for current. If the current equals 0, then the wire has not touched the part. The current is detected, and when it is not zero, the apparatus may, if desired, delay for a short predetermined period of time until the wire is, preferably, white hot. The voltage is ramped to a predetermined welding voltage over a predetermined period of time (for example, 19 volts). This will turn the wire to plasma and start the arc more smoothly than a conventional welding device, which is typically set at maximum voltage initially. The apparatus may communicate information through interfaces 71 or 72 which may be used to speed up the MIG wire feed rate to accomplish a smoother weld start.

The present invention also includes the method of arc tracking or seam tracking during a weld. Sometimes registering a part with a robot is a problem. It may oftentimes be desirable to detect the location of a seam in a part which is to be welded, and to constantly monitor tracking of the seam during welding. Using a feature sometimes referred to as arc length sensing, a robot can monitor welding conditions and interpret when the welding electrode is over the center of a seam which is being welded. The apparatus may monitor the voltage or current to determine whether the seam is being correctly tracked during welding. During a constant voltage welding mode, the current will be proportional to the length of the arc. During a constant current welding mode, the voltage will be proportional to the length of the arc. Thus, current or voltage can be monitored or sampled to provide information concerning whether welding is taking place correctly in the center of a seam, or whether the seam is not being properly tracked. Digital samples of parameters being monitored may be transmitted during welding to a robot or host computer so that corrections may be made for tracking purposes, as required.

The present invention also includes the method of bio-feedback. In this method, the voltage or current or both are sensed and a dip in the voltage or the current is interpreted by the CPU 50 as a command to increase or decrease the current or voltage a predetermined step value. Upper limits, as well as lower limits, may be set on the amount by which the voltage or current will be stepped up or down using bio-feedback. Bio-feedback may be used to eliminate the foot switches typically used with conventional TIG welding devices.

In an arc tracking mode, a change in the voltage or current may be interpreted as an indication that a command should be given by the CPU 50 to a robot device to correct movement of the work piece in a manner which will reestablish the correct value of voltage or current.

In a preferred embodiment, the welding transformer 57 is a constant voltage transformer. Tight coupling is provided between the primary and secondary windings. The transformer 57 is preferably designed to deliver high current, for example 1200 amps, at voltages on the order of 35 volts. The transformer 57 is preferably of a type which provides a very precise constant voltage. Constant current can be achieved using the disclosed structure through software control.

The present invention provides the capability of being able to wander over a part, sensing a background voltage and evaluating the voltage sensed in order to detect the topography of a part, which may be interpreted to reveal a proper position in which to activate welding current, based upon an evaluation of the sensed voltage or current. The voltage would be proportional to the arc length, assuming a constant arc current. If the electrode is maintained at a fixed height as the robot wanders over the part, the arc length information will depict the shape of the surface of the part. A robot could use this feature to measure an unknown part, remember where a seam is detected to be located, and then weld a path recorded in memory based upon such measurements. Using the feature of arc length sense, a seam which is to be welded could be automatically tracked by a robot device, or otherwise.

As described above, six interrupts are generated for each period of the AC cycle (one interrupt for each SCR 100 that is to be fired). The six interrupts divide the period of the AC wave form into six subperiods, which under typical conditions are preferably equal. Each interrupt is used as a reference for firing each individual SCR 100. In some circumstances, it is desirable to make the subperiods unequal.

The present invention provides the capability of individual settings for the firing angle of each SCR. Thus, imperfections in individual SCRs may be matched, complex wave forms may be generated, and greater flexibility is possible. More significantly, this capability may be used to compensate for phase mismatches in a power source, where the three phase power, for example, is not at exactly 120 degree phase shifts.

One additional example of an application when this invention's capability of individually adjusting the firing angle for each SCR 100 has significant advantages, is a welding mode which may be referred to as a "low spatter MIG mode". This mode may be similar to a mode commonly referred to in the art as "pulsed spray welding".

The significant features of the low spatter MIG mode may be best understood by reference to two conventional MIG modes commonly referred to in the art as (1) the "short arc" mode, and (2) the "spray transfer" mode. In the short arc mode, the wire used for welding typically touches the part being welded as it melts into the molten pool of metal at the weld site. In the spray transfer mode, the wire melts into the molten pool without touching the part.

The low spatter MIG mode may be thought of as a hybrid mode. In the low spatter MIG mode, the apparatus effectively switches back and forth between a relatively high and relatively low voltage. In practice, this results in a low voltage in between the instants when the wire is burned away or melted at high voltage. For example, where in a conventional welding procedure a welding device might run at 19 volts, the present invention might operate in the low spatter MIG mode rapidly switching back and forth between, for example, 15 volts and 28 volts (which might result in a nominal or average voltage of 19 volts).

The low spatter MIG mode may be accomplished in accordance with the present invention by staggering the firing angles of the SCRs 100. By doing so, the output waveform on the common welding lead 81 will typically have a sawtooth-like waveform superimposed upon the DC voltage output. The average firing angle of the SCRs, and the average voltage, may remain the same.

The low spatter MIG mode reduces spatter (i.e., the number of sparks flying from the weld). The low spatter MIG mode has the advantage of minimizing the amount of metal wasted due to spatter during welding. In some applications, this can be significant.

The low spatter MIG mode offers additional advantages which are believed to be even more significant. This mode is believed to result in less overall heat input to the metal part to be welded. The heat input per inch (of weld) should be significantly lower. High temperatures eat costly energy and can easily distort parts being treated, sometimes even requiring post-finishing machining to restore dimensional tolerances.

The low spatter MIG mode provides operation over a wide range of wire feed rates. In the disclosed apparatus, an operator may easily adjust the rate of welding by conveniently adjustng the wire feed rate (because the amps will be automatically adjusted by the apparatus). The operator will be able to conveniently adjust the amount of metal deposited during a weld, as desired. A relatively low deposition rate may be achieved with the present invention, as compared with conventional devices.

In the illustrated embodiment, the low spatter MIG mode may be accomplished by staggering the SCR firing angles. The SCR firing angles may be staggered using the user code commands "H14 XXX" and "H15 XXX". The command "H14" is used to set the value of the variable "DIG" used in "Listing No. 1" to adjust the amount of time that the SCR firing angles may be delayed or advanced. The command "H15" is used to adjust the staggering of the SCR firing angles by adjusting the value of the variable "RASP" is "Listing No. 1".

Referring to the sawtooth-like wave form that is superimposed upon the DC voltage output at the common welding lead 81, the variable "DIG" affects how high the sawtooth-like "teeth" are, while the variable "RASP" affects the spacing of the "teeth", and can be used to make the "teeth" further apart.

For example, the command "H14 001" sets "DIG"=1. This causes each SCR 100 to fire at a time spaced one unit from the mean firing time (determined by the six equal subperiods of the AC cycle). The command "H15 001" sets "RASP"=1 and results, in this example, in the first SCR 100 firing one unit of time-early, the second SCR 100 firing one unit of time late, the third SCR 100 firing one unit of time early, the fourth SCR 100 firing one unit of time late, the fifth SCR 100 firing one unit of time early, and the sixth SCR 100 firing one unit of time late.

The command "H14 002" ("DIG"=2) causes the SCRs 100 to fire two units of time spaced from the mean, in the order determined by the variable "RASP". The command "H14 003" sets "DIG"=3, etc.

The command "H15 002" sets "RASP"=2. In such a case, the first SCR 100 would fire early, the second SCR 100 would fire early, the third SCR 100 would fire late, the fourth SCR 100 would fire late, the fifth SCR 100 would fire early, and the sixth SCR 100 would fire early, etc.

The combination of commands "H14 002" and "H15 001" have yielded satisfactory results in practice.

The disclosed invention offers significant features and can accomplish significant results unavailable with most conventional welding devices.

For example, in a tungsten insert gas (TIG) mode, the disclosed apparatus may be used to affect agitation of the pool of molten metal at the weld site. This can have significant advantages, for example, where alloys of different metals which tend to separate when molten are being used. Agitation of the molten metal can be used to keep such alloys generally evenly distributed in the molten pool.

The present invention may be advantageously used to help penetrate oxide films. The low spatter MIG mode, for example, may be used.

The present invention may be used, for example, to run a TIG mode in reverse polarity (electrode positive), or a MIG mode in straight polarity (electrode negative). These features may be used to affect the structure of a weld and to allow additional performance features of a weld. In a MIG weld of straight polarity, the metal tends to lay on top of the weld. This is typically not a stable process in conventional welding machines, but is stable in the present invention. The present invention may be used to put down weld deposits of low dilution, and maintain stability.

A feature of the present invention that is potentially of great significance, involves the ability to control the dilution rate of a weld. This feature may be used to affect, and control, the metallurgy of a weld. The invention may be used to empirically achieve a desired metallurgy of a weld, and once achieved, the invention is capable of faithfully reproducing the same weld due to its ability to remember a detailed welding procedure and repeatedly follow such procedure exactly. Human operated conventional welding devices are not capable of such repeatability. The present invention may be used to achieve minimal dilution rates significantly better than prior art devices. The article entitled "Surface Magic: Making Metals Tougher", published in *High Technology* (March 1983) (which is incorporated herein by reference), states that the following dilution percentages are achievable with conventional welding:

Gas tungsten-arc and plasma-arc welding: 5–15%
Stick welding (bare electrode): 20–25%
Stick welding (coated electrode): 30–40%
Submerged arc welding: 40–50%

The present invention can achieve significant minimal dilution rates, believed to be on the order of 5% or less.

The present invention may be used to precisely control the temperature of a weld, a feature not available in conventional welding devices.

The present invention provides a significant advantage in its ability to achieve unusually long "stick out lengths" of the wire used in MIG welding. "Stick out length" is sometimes defined in the art as the length of the welding wire or wire electrode, between the contact tip and the arc. In *Welding Handbook* (7th ed., Vol. 2 1978), published by the American Welding Society, stick out length is defined at page 139 as "electrode extension". This *Welding Handbook*, Volumes 1 through 5, are all incorporated herein by reference. The stick out length is the distance between the last point of electrical contact, usually the contact tip, and the end of the electrode, which usually ends at the arc.

Conventional welding devices are believed to be able to achieve typical stick out lengths of a MIG wire electrode of ½ inch. The present invention is capable of achieving stick out lengths as great as 3 inches (for 0.035 wire). These long stick out lengths have significant advantages. Such unusually long stick out lengths enable the apparatus to conveniently preheat the electrode wire and to utilize whole new concepts in nozzle design.

The wire electrode acts as a resistor over its length between the last point of electrical contact and the arc. The current flowing through the wire electrode tends to preheat the electrode, and this action is significantly improved by achieving long stick out lengths. This feature is believed to assist greatly in achieving extreme deposition rates.

Although the operation of the invention is not completely understood, the present invention is capable of controlling welding parameters so tightly, that long stick out lengths are believed to be achievable as a result.

Typical nozzle designs must use complicated water cooled arrangements due to the close proximity of the nozzle to the hot arc. Long stick out lengths permit new concepts in nozzle design, by allowing location of the nozzle at a point spaced from the arc a sufficient distance to permit lower temperature designs. New materials like ceramic materials may be used in the nozzle design.

ALTERNATIVE EMBODIMENTS

The present disclosure illustrates a presently preferred embodiment of the invention. Other embodiments of the invention may be advantageous in some applications.

For example, the disclosed arc welding circuit outputs a DC signal on the common welding lead 81. In some applications, it may be desirable to utilize an AC current. For example, it may be advantageous to weld a metal such as aluminum using AC current in a constant current mode. Alternating current is sometimes used in the case of aluminum to remove or inhibit the formation of an oxide film which would otherwise interfere with the maintenance of a good arc.

The illustrated example utilizes three phase power. Single phase power could be used. That is, the welding transformers 57 could be single phase. Also, for example, six phase power could be used. Three SCRs could be used instead of six.

The transformer 57 could be eliminated. The secondary windings 99 could be eliminated and replaced with windings on a three phase alternator, such as a portable diesel alternator. Such a configuration would provide an excellent portable welding apparatus. The disclosed invention is especially powerful in its ability to synchronize with a power source that varies in frequency.

Greater resolution of voltage or current samples could be achieved by using a ten bit or greater A/D convertor 132. This could result in 0.025 volt resolution, or greater. For example, a fourteen bit A/D converter 132 could be utilized.

A sample and hold technique could also be used. However, such techniques are not necessary in a preferred embodiment. The voltage reading is taken so fast in comparison to the rate of change of the voltage, that the voltage may be considered to remain costant as a practical matter during the short time involved in taking the reading.

The illustrated embodiment uses an averaging type voltage or current reading. The circuit employs capacitors and resistors to, in effect, integrate voltage sample inputs. Alternatively, op amp circuits could be placed in the invention and configured to result in a time RMS A/D reading circuit so that the digital value returned by A/D convertor 132 represented the value of the time RMS voltage being read.

A cathode ray tube (CRT) could be used in lieu of, or in addition to, the output displays 75. A printer may be coupled to, e.g., current loop interface 71. The printer may be used to print voltage or current, or both, for time intervals (say each second) during a welding procedure. This information may be used for quality control. If an abnormal reading occurred in the print out, it could be indicative of a flaw in the weld. Quality control can be critical in some applications, such as welds on a pipeline or aircraft.

A smart interface chip could be provided to time the output displays 75. Thus, the responsibility for strobing the LED displays 75 and keeping them lit could be transferred to a smart interface chip which could then maintain the same display until changed or updated by the CPU 50.

In some dedicated applications, the flexibility and programability offered by the illustrated preferred embodiment may not be needed. In such event, the CPU 50 may be replaced by a programmed logic array (PLA), for example. Predetermined welding procedures could be stored in either ROM 51 or RAM 52, and could be selected by a menu driven routine, for example. The look up tables could be predetermined and stored in ROM 51 or RAM 52. In any embodiment the look up tables may be stored in ROM 51 if it is not desired to modify the look up tables.

LISTING NO. 1

```
PAGE    1         03-FEB-83       WSAVE.S68

1                              NAM     SAVE OFFTIMES
  2                              OPT     S,O,NOG 3
  4        0100     SP1CP        EQU     $100        PRIMARY SERIAL I/O PORT
  5        0101     SP1DP        EQU     SP1CP+1
  6        2008     SP2CP        EQU     $2008       SECONDARY SERIAL I/O PORT
  7        2009     SP2DP        EQU     SP2CP+1
  8        4000     PIA          EQU     $4000       SEE NEXT PAGE
  9        4004     PIA2         EQU     PIA+4       SEE NEXT PAGE
 10        2000     TIMCRX       EQU     $2000
 11        2001     TIMCR2       EQU     TIMCRX+1
 12        2002     TIMBF1       EQU     TIMCRX+2    6X LINE FREQ IRQ
 13        2004     TIMBF2       EQU     TIMCRX+4    SERIAL PORT BAUD RATE
 14        2006     TIMBF3       EQU     TIMCRX+6    NMI FREQ MEASURE
 15        8000     SCRCPX       EQU     $8000
 16        8001     SCRCR2       EQU     SCRCPX+1
 17        8002     SCRBF1       EQU     SCRCRX+2    SCR FIRING ANGLE
 18        8004     SCRBF2       EQU     SCRCRX+4    "
 19        8006     SCRBF3       EQU     SCRCRX+6    "
 20        003C     LINEF        EQU     60          HZ
 21        0006     LINEF1       EQU     6           LINEF/10

22
 23              *
 24              * I/O PORT SIGNAL DIFINITIONS
 25              *
 26              *
 27              * PIA #1 U13 (CLOSEST TO THE CPU)
 28              * ADDRESS = $4000-$4003
 29              * PIN # NAME SENSE FUNCTION
 30              *
 31              * 2  PA0  IN  ADC BIT 0
 32              * 3  PA1  IN  ADC BIT 1
 33              * 4  PA2  IN  ADC BIT 2
 34              * 5  PA3  IN  ADC BIT 3
 35              * 6  PA4  IN  ADC BIT 4
 36              * 7  PA5  IN  ADC BIT 5
 37              * 8  PA6  IN  ADC BIT 6
 38              * 9  PA7  IN  ADC BIT 7
 39              * 40 CA1  IRQ NOT USED
 40              * 39 CA2  OUT MAIN XFORMR CONTACTOR
 41              *
 42              * 10 PB0  OUT LED MPX ADDR
```

```
43                    *  11 PB1 OUT LED MPX ADDR
44                    *  12 PB2 OUT SCR1A FIRE ENABLE
45                    *  13 PB3 OUT SCR1B FIRE ENABLE
46                    *  14 PB4 OUT SCR2A FIRE ENABLE
47                    *  15 PB5 OUT SCR2B FIRE ENABLE
48                    *  16 PB6 OUT SCR3A FIRE ENABLE
49                    *  17 PB7 OUT SCR3B FIRE ENABLE
50                    *  18 CB1 IRQ NOT USED TIED HI
51                    *  19 CB2 OUT BACKGROUND CONTROL
52                    *
53                    *
54                    * PIA #2 U14 (CLOSEST TO OUTSIDE EDGE OF BOARD)
55                    * ADDRESS = $4024-$4027
56                    *  2 PA0 IN NOT USED, RESERVED
57                    *  3 PA1 IN NOT USED, RESERVED
58                    *  4 PA2 IN LINE POLARITY SENSE
59                    *  5 PA3 OUT CURRENT GAIN SELECT
60                    *  6 PA4 OUT CURRENT GAIN SELECT
61                    *  7 PA5 OUT ADC SOURCE SELECT
62                    *  8 PA6 OUT SWITCH MPX LO ADDR
63                    *  9 PA7 OUT SWITCH MPX HI ADDR
64                    *  40 CA1 IRQ NOT USED
65                    *  39 CA2 OUT GO CONVERT,SANITY ACK
66                    *
67                    *
68                    *  10 PB0 OUT LED, RELAY DATA
69                    *  11 PB1 OUT LED, RELAY DATA
70                    *  12 PB2 OUT LED, RELAY DATA
71                    *  13 PB3 OUT LED, RELAY DATA
72                    *  14 PB4 I/O LED, RELAY, SENSE DATA
73                    *  15 PB5 I/O LED, RELAY, SENSE DATA
74                    *  16 PB6 I/O LED, RELAY, SENSE DATA
75                    *  17 PB7 I/O LED, RELAY, SENSE DATA
76                    *  18 CB1 IRQ NOT USED TIED HI
77                    *  19 CB2 OUT RELAY LATCH STROBE
78                    *
79
80                    *
81                    *
82                    *
83                    *
84        0001                 ORG    1
85        0001        IRQCR    RMB    2
86        0003        STEP     RMB    1
87        0004        ERROPT   RMB    2
88        0006        TEMP     RMB    2
89        0008        ANGLHI   RMB    2
90        000A        ANGAIL   RMB    2
91        000C        ANGLIO   RMB    2
92        000E        FIRING   RMB    2
93        0010        LFOSC    RMB    5
94        0015        FSHIFT   RMB    4
95                    *
96                    *
97                    *
98                    *
99                    *
100                   *
101                   *
102                   *
103                   *
104                   *
105       0019        USRCNT   RMB    1
106       001A        SWFLG1   RMB    1
```

```
107    001B         SWFLG2    RMB    1
108    001C         SUBSAV    RMB    2
109    001E         RASP      RMB    3
110                 *
111                 *
112                 *
113    0021         DIG       RMB    1
114    0022         SETING    RMB    1
115    0023         ARANGE    RMB    1
116    0024         CLK2      RMB    2
117    0026         CLK1      RMB    2
118    0028         RELAYS    RMB    1
119    0029         LESTOP    RMB    1
120    002A         HESTOP    RMB    1
121    002B         RUNWAI    RMB    1
122    002C         SSTEP     RMB    1
123    002D         ARCONF    RMB    1
124                 *
125    002E         PWRSWT    RMB    1
126                 *
127                 *
128                 *
129                 *
130                 *
131    002F         KEYPAD    RMB    1
132    0030         HISNSW    RMB    1
133    0031         LOSNSW    RMB    1
134    0032         SUBCNT    RMB    1
135    0033         OPMASK    RMB    1
136    0034         RHLED     RMB    1
137    0035         MIDLED    RMB    1
138    0036         LHLED     RMB    1
139    0037         LEDCLK    RMB    1
140    0038         XFORMR    RMB    1
141    0039         DVSAM     RMB    8
142    0041         DISAM     RMB    8
143                 *
144                 *
145                 *
146                 *
147                 *
148                 *
149                 *
150                 *
151    0049         NEWRDY    RMB    1
152    004A         AUXACT    RMB    1
153    004B         RETRY     RMB    1
154    004C         LRCBYT    RMB    1
155    004D         OPCODE    RMB    1
156    004E         OPERND    RMB    1
157    004F         HUNS      RMB    1
158    0050         TENS      RMB    1
159    0051         ONES      RMB    1
160    0052         KEYSPD    RMB    1
161    0053         PARMPX    RMB    2
162    0055         CRCRFG    RMB    3
163    0058         ERRORN    RMB    1
164    0059         XMPNT1    RMB    2
165    005B         XMPNT2    RMB    2
166    005D         IOXSAV    RMB    2
167    005F         CRCCNT    RMB    1
168    0060         RDPNT1    RMB    2
169    0062         RDPNT2    RMB    2
170    0064         RUNPC     RMB    2
171    0066         ITYPE     RMB    1
```

```
172   0067            TLNUM     RMB     1
173   0068            ICMD      RMB     1
174   0069            IOPR      RMB     1
175   006A            MFACT     RMB     1
176   006B            MRATE     RMB     1
177   006C            MOFF      RMB     2
178   006E            NMFACT    RMB     1
179   006F            NMRATE    RMB     1
180   0070            NMOFF     RMB     2
181
182                   *
183                   *
184                   *
185                   *
186   6000                      ORG     $6000
187                   *
188                   *
189   004B            ETMAX     EQU     75
190   0096            ETSIZE    EQU     ETMAX+ETMAX
191   6000            TERRM     RMB     ETSIZE
192   6096            TERRNM    RMB     ETSIZE
193                   *
194                   *
195                   *
196   00C8            XMBFLN    EQU     200
197   01C2            RDBFLN    EQU     450
198   6120            XMBUF     RMB     XMBFLN
199   61F4            RDBUF     RMB     RDBFLN
200                   *
201   63B6            RAMPM     RMB     17
202                   *
203                   *
204                   *
205                   *
206                   *
207                   *
208                   *
209                   *
210                   *
211                   *
212                   *
213                   *
214   63C7            LOGDAT    RMB     6
215   63CD            LOGGER    RMB     3
216                   *
217                   *
218                                             --
219
220                   *
221                   *
222                   *
223                   *
224   03E8            BRAML     EQU     1000
225   A010                      ORG     $A400-BRAML-8
226   A010            STALF     RMB     1
227   A011            CRCWRD    RMB     2
228   A013                      RMB     1
229   A014            STRTPC    RMB     2
230   A016            LNUM      RMB     2
231   A018            PGMRAM    RMB     BRAML
232                             END
0  ERROR(S) DETECTED IN PASS 2
```

```
PAGE   1          29-FEB-83       MAIN.S68

1                                    NAM     WELDER MAIN PROGRAM SECTION
  2           F000                     ORG     $F000
  3    F000 8E 63FF   START            LDS     #$63FF
  4    F003 BD 0000                    JSR     STARTO
  5    F006 BD 073B                    JSR     KEYLED
  6    F009 BD 0C07   TOP              JSR     LINEIN
  7    F00C 96 66                      LDA A   TTYPE
  8    F00E 81 58                      CMP A   #'X
  9    F010 26 07                      BNE     NOTMM
 10    F012 8D 1E                      BSR     IMMINS
 11    F014 7F 0066                    CLR     TTYPE
 12    F017 20 ED                      BRA     TOP-3
 13    F019 7D 002B   NOTMM            TST     RUNWAI
 14    F01C 27 E8                      BEQ     TOP-3
 15    F01E 8D 34                      BSR     RUNINS
 16    F020 20 E7                      BRA     TOP 17
 18    F022           PROCAD           FDB     DOCI
 19    F024                            FDB     DOCMD
 20    F026                            FDB     DOFEED
 21    F028                            FDB     DOMISC
 22    F02A                            FDB     DOTIME
 23    F02C                            FDB     DOTEST
 24    F02E                            FDB     DOCV
 25    F030                            FDB     DOCOIL
 26                        *
 27                        *
 28                        *
 29    F032 A6 07    IMMINS            LDA A   #7
 30    F034 BD 0294                    JSR     OUTCH
 31    F037 96 68                      LDA A   TCMD
 32    F039 16                         TAB
 33    F03A C4 1F                      AND B   #$1F
 34    F03C D7 4D                      STA B   OPCODE
 35    F03E D6 69                      LDA B   TOPR
 36    F040 D7 4E                      STA B   OPERND
 37    F042 44                         LSR A
 38    F043 44                         LSR A
 39    F044 44                         LSR A
 40    F045 44                         LSR A
 41    F046 44                         LSR A
 42    F047 48                         ASL A
 43    F048 CE F022                    LDX     #PROCAD
 44    F04B BD 01C3                    JSR     ADDAX
 45    F04E FE 00                      LDX     0,X
 46    F050 96 4D                      LDA A   OPCODE
 47    F052 6E 00                      JMP     0,X
 48
 49                        *
 50                        *
 51                        *
 52    F054 DE 64    RUNINS            LDX     RUNPC
 53    F056 A6 00                      LDA A   0,X
 54    F058 16                         TAB
 55    F059 C4 1F                      AND B   #$1F
 56    F05B 27 1A                      BEQ     NXTINS
 57    F05D 36                         PSH A
 58    F05E E6 01                      LDA B   1,X
 59    F060 44                         LSR A
```

```
60    F061 44                LSR  A
61    F062 44                LSR  A
62    F063 44                LSR  A
63    F064 44                LSR  A
64    F065 48                ASL  A
65    F066 CE F022           LDX  #PROCAD
66    F069 BD D1C3           JSR  ADDAX
67    F06C 32                PUL  A
68    F06D 84 1F             AND A #$1F
69    F06F 97 4D             STA A OPCODE
70    F071 D7 4E             STA B OPERND
71    F073 EE 00             LDX  0,X
72    F075 AD 00             JSR  0,X
73                      *
74                      *
75                      *
76                      *
77                      *
78    F077 DE 64    NXTINS   LDX  RUNPC
79    F079 08                INX
80    F07A 08                INX
81    F07B 8C A400           CPX  #PGMRAM+BRAML
82    F07E 26 05             BNE  *+7
83    F080 86 04             LDA A #4
84    F082 BD D0E9           JSR  ERROR
85    F085 DF 64             STX  RUNPC
86    F087 BD D73B           JSR  KEYLED
87    F08A 7D 002C           TST  SSTEP
88    F08D 2B F8             BMI  *-6
89    F08F 27 03             BEQ  *+5
90    F091 07                TPA
91    F092 97 2C             STA A SSTEP
92    F094 39                RTS
93
94                      *
95                      *
96                      *
97    F095 81 03    DOCI     CMP A #3
98    F097 22 60             BHI  DOCI4
99    F099 36                PSH A
100   F09A 37                PSH B
101   F09B 7F 63C6           CLR  RAMPM+16
102   F09E 96 2E             LDA A PWRSWT
103   F0A0 7F 002E           CLR  PWRSWT
104   F0A3 81 22             CMP A #2
105   F0A5 27 15             BEQ  DOCIP
106   F0A7 36                PSH A
107   F0A8 BD DBB8           JSR  CALCAT
108   F0AB 96 41             LDA A DISAM
109   F0AD 97 22             STA A SETING
110   F0AF 32                PUL A
111   F0B0 81 03             CMP A #3
112   F0B2 23 08             BLS  DOCI0
113   F0B4 CE 1FFF           LDX  #$1FFF
114   F0B7 DF 04             STX  ANGALL
115   F0B9 BD D2E2           JSR  COPYAL
116   F0BC 33       DOCI0    PUL B
117   F0BD 32                PUL A
118   F0BE 81 01             CMP A #1
119   F0C0 26 15             BNE  DOCI2
120   F0C2 5D                TST B
121   F0C3 26 09             BNE  DOCI1
122   F0C5 7A 002E           DEC  PWRSWT
123   F0C8 7F 0020           CLR  ARCONF
124   F0CB 7E D0CD           JMP  DASH
```

```
125  F0CE  D7 22      DOCI1    STA  B  SETING
126  F0D0  86 02               LDA  A  #2
127  F0D2  97 20               STA  A  ARCONF
128  F0D4  97 2E               STA  A  PWRSWT
129  F0D6  39                  RTS
130  F0D7  F7 63C5    DOCI2    STA  B  RAMPM+15
131  F0DA  96 22               LDA  A  SETING
132  F0DC  10                  SBA
133  F0DD  27 EF               BEQ     DOCI1
134  F0DF  24 05               BCC     *+7
135  F0E1  40                  NEG  A
136  F0E2  C6 01               LDA  B  #1
137  F0E4  20 02               BRA     *+4
138  F0E6  C6 FF               LDA  B  #$FF
139  F0E8  F7 63C4             STA  B  RAMPM+14
140  F0EB  BD 0000             JSR     RAMP
141  F0EE  96 40               LDA  A  OPCODE
142  F0F0  B7 63C6             STA  A  RAMPM+16
143  F0F3  81 02               CMP  A  #2
144  F0F5  27 09               BEQ     DOCI1+2
145  F0F7  86 02               LDA  A  #2
146  F0F9  97 20               STA  A  ARCONF
147  F0FB  97 2E               STA  A  PWRSWT
148  F0FD  BD 073B             JSR     KEYLED
149  F100  7D 63C6             TST     RAMPM+16
150  F103  26 F8               BNE     *-6
151  F105  39                  RTS
152  F106  D0 41      DOCI4    SUB  B  DISAM
153  F108  07                  TPA
154  F109  97 1B               STA  A  SWFLG2
155  F10B  39                  RTS
156
157  F10C  CE A016    DOCMD    LDX     #PGMRAM-2
158  F10F  81 0F               CMP  A  #15
159  F111  23 03               BLS     *+5
160  F113  CE A1FF             LDX     #PGMRAM-2+488
161  F116  DF 55               STX     CRCREG
162  F118  17                  TBA
163  F119  DB 56               ADD  B  CRCREG+1
164  F11B  D7 56               STA  B  CRCREG+1
165  F11D  24 03               BCC     *+5
166  F11F  7C 0055             INC     CRCREG
167  F122  9B 56               ADD  A  CRCREG+1
168  F124  97 56               STA  A  CRCREG+1
169  F126  24 03               BCC     *+5
170  F128  7C 0055             INC     CRCREG
171  F12B  96 40               LDA  A  OPCODE
172  F12D  4A                  DEC  A  *
173  F12E  26 05               BNE     *+7
174  F130  DF 55      BRANCH   LDX     CRCREG
175  F132  DF 64               STX     RUNPC
176  F134  39                  RTS
177  F135  4A                  DEC  A  *
178  F136  26 06               BNE     *+8
179  F138  7D 001A             TST     SWFLG1
180  F13B  26 F3               BNE     BRANCH
181  F13D  39                  RTS
182  F13E  4A                  DEC  A  *
183  F13F  26 06               BNE     *+8
184  F141  7D 001A             TST     SWFLG1
185  F144  27 EA               BEQ     BRANCH
186  F146  39                  RTS
187  F147  4A                  DEC  A  *
188  F148  26 06               BNE     *+8
189  F14A  96 1B               LDA  A  SWFLG2
```

| | | | | | |
|---|---|---|---|---|---|
| 190 | F14C | 06 | | TAP | |
| 191 | F14D | 27 E1 | | BEQ | BRANCH |
| 192 | F14F | 39 | | RTS | |
| 193 | F150 | 4A | | DEC A | * |
| 194 | F151 | 26 06 | | BNE | *+8 |
| 195 | F153 | 96 1B | | LDA A | SWFLG2 |
| 196 | F155 | 06 | | TAP | |
| 197 | F156 | 25 D8 | | BCS | BRANCH |
| 198 | F158 | 39 | | RTS | |
| 199 | F159 | 4A | | DEC A | * |
| 200 | F15A | 26 08 | | BNE | *+10 |
| 201 | F15C | 96 1B | | LDA A | SWFLG2 |
| 202 | F15E | 06 | | TAP | |
| 203 | F15F | 27 02 | | BEQ | *+4 |
| 204 | F161 | 24 CD | | BCC | BRANCH |
| 205 | F163 | 39 | | RTS | |
| 206 | F164 | 4A | | DEC A | * |
| 207 | F165 | 26 06 | | BNE | *+8 |
| 208 | F167 | 7D 0019 | | TST | USRCNT |
| 209 | F16A | 27 C4 | | BEQ | BRANCH |
| 210 | F16C | 39 | | RTS | |
| 211 | F16D | 4A | | DEC A | * |
| 212 | F16E | 26 06 | | BNE | *+8 |
| 213 | F170 | 7D 0019 | | TST | USRCNT |
| 214 | F173 | 26 BB | | BNE | BRANCH |
| 215 | F175 | 39 | | RTS | |
| 216 | F176 | 4A | | DEC A | * |
| 217 | F177 | 26 06 | | BNE | *+8 |
| 218 | F179 | 7D 0041 | | TST | DISAM |
| 219 | F17C | 27 B2 | | BEQ | BRANCH |
| 220 | F17E | 39 | | RTS | |
| 221 | F17F | 4A | | DEC A | * |
| 222 | F180 | 26 06 | | BNE | *+8 |
| 223 | F182 | 7D 63C6 | | TST | RAMPM+16 |
| 224 | F185 | 26 A9 | | BNE | BRANCH |
| 225 | F187 | 39 | | RTS | |
| 226 | F188 | 4A | | DEC A | * |
| 227 | F189 | 26 0B | | BNE | *+13 |
| 228 | F18B | 7D 0026 | | TST | CLK1 |
| 229 | F18E | 26 05 | | BNE | *+7 |
| 230 | F190 | 7D 0024 | | TST | CLK2 |
| 231 | F193 | 27 9B | | BEQ | BRANCH |
| 232 | F195 | 39 | | RTS | |
| 233 | F196 | 4A | | DEC A | * |
| 234 | F197 | 26 0B | | BNE | *+13 |
| 235 | F199 | 7D 0026 | | TST | CLK1 |
| 236 | F19C | 26 92 | | BNE | BRANCH |
| 237 | F19E | 7D 0024 | | TST | CLK2 |
| 238 | F1A1 | 26 8D | | BNE | BRANCH |
| 239 | F1A3 | 39 | | RTS | |
| 240 | F1A4 | 4A | | DEC A | * |
| 241 | F1A5 | 26 10 | | BNE | *+18 |
| 242 | F1A7 | DE 1C | | LDX | SUBSAV |
| 243 | F1A9 | 27 05 | | BEQ | *+7 |
| 244 | F1AB | 86 02 | | LDA A | #2 |
| 245 | F1AD | 7E 00E9 | | JMP | ERROR |
| 246 | F1B0 | DE 64 | | LDX | RUNPC |
| 247 | F1B2 | DF 1C | | STX | SUBSAV |
| 248 | F1B4 | 7E F130 | | JMP | BRANCH |
| 249 | F1B7 | 4A | | DEC A | * |
| 250 | F1B8 | 26 0A | | BNE | *+12 |
| 251 | F1BA | DE 55 | | LDX | CRCREG |
| 252 | F1BC | 08 | | INX | |
| 253 | F1BD | 08 | | INX | |

```
254   F1BF FF A014         STX    STRTPC
255   F1C1 7E DA41         JMP    PUTCPC
256   F1C4 4A              DEC A  *
257   F1C5 26 0A           BNE    *+12
258   F1C7 DE 55           LDX    CRCREG
259   F1C9 08              INX
260   F1CA 08              INX
261   F1CB FF A016         STX    LNUM
262   F1CE 7E DA41         JMP    PUTCPC
263   F1D1 39              RTS
264
265                 *
266                 *
267                 *
268   F1D2 86 08    DOFEED LDA A  #8
269   F1D4 97 4B           STA A  RETRY
270   F1D6 96 4D    FEED1  LDA A  OPCODE
271   F1D8 8B 20           ADD A  #$20
272   F1DA BD D14D         JSR    AUXSND-3
273   F1DD 96 4E           LDA A  OPERND
274   F1DF 44              LSR A
275   F1E0 44              LSR A
276   F1E1 44              LSR A
277   F1E2 44              LSR A
278   F1E3 BD D150         JSR    AUXSND
279   F1E6 96 4E           LDA A  OPERND
280   F1E8 84 0F           AND A  #$F
281   F1EA BD D150         JSR    AUXSND
282   F1ED BD D161         JSR    AUXFIN
283   F1F0 BD D173         JSR    REPLY
284   F1F3 81 06           CMP A  #6
285   F1F5 27 0F           BEQ    FEED2
286   F1F7 7A 004B         DEC    RETRY
287   F1FA 27 05           BEQ    FEED3
288   F1FC BD D167         JSR    PURGE
289   F1FF 20 D5           BRA    FEED1
290   F201 86 05    FEED3  LDA A  #5
291   F203 7E D0E9         JMP    ERROR
292   F206 39       FEED2  RTS
293
294   F207 4A       DOMISC DEC A  *
295   F208 26 07           BNE    *+9
296   F20A DE 64           LDX    RUNPC
297   F20C 09              DEX
298   F20D 09              DEX
299   F20E DF 64           STX    RUNPC
300   F210 39              RTS
301   F211 4A              DEC A  *
302   F212 26 0A           BNE    *+12
303   F214 D7 2B           STA B  RUNWAI
304   F216 26 03           BNE    *+5
305   F218 7E D124         JMP    HLTALL
306   F21B 7E D0CD         JMP    DASH
307   F21E 4A              DEC A  *
308   F21F 26 07           BNE    *+9
309   F221 5D              TST B
310   F222 27 01           BEQ    *+3
311   F224 07              TPA
312   F225 97 2C           STA A  SSTEP
313   F227 39              RTS
314   F228 4A              DEC A  *
315   F229 26 09           BNE    *+11
316   F22B DB 19           ADD B  USRCNT
317   F22D 24 02           BCC    *+4
```

```
318  F22F C6 FF           LDA B  #$FF
319  F231 D7 19           STA B  USRCNT
320  F233 39              RTS
321  F234 4A              DEC A  *
322  F235 26 09           BNE    *+11
323  F237 96 19           LDA A  USRCNT
324  F239 10              SBA
325  F23A 24 01           BCC    *+3
326  F23C 4F              CLR A
327  F23D 97 19           STA A  USRCNT
328  F23F 39              RTS
329  F240 4A              DEC A  *
330  F241 26 03           BNE    *+5
331  F243 D7 19           STA B  USRCNT
332  F245 39              RTS
333  F246 4A              DEC A  *
334  F247 26 06           BNE    *+8
335  F249 D0 19           SUB B  USRCNT
336  F24B 07              TPA
337  F24C 97 1B           STA A  SWFLG2
338  F24E 39              RTS
339  F24F 4A              DEC A  *
340  F250 26 0B           BNE    *+13
341  F252 86 34           LDA A  #$34
342  F254 5D              TST B
343  F255 27 02           BEQ    *+4
344  F257 86 3C           LDA A  #$3C
345  F259 B7 4003         STA A  PIA+3
346  F25C 39              RTS
347
348  F25D 4A              DEC A  *
349  F25E 26 0B           BNE    *+13
350  F260 86 34           LDA A  #$34
351  F262 5D              TST B
352  F263 27 02           BEQ    *+4
353  F265 86 3C           LDA A  #$3C
354  F267 B7 4001         STA A  PIA+1
355  F26A 39              RTS
356  F26B 4A              DEC A  *
357  F26C 26 09           BNE    *+11
358  F26E DB 22           ADD B  SETING
359  F270 24 02           BCC    *+4
360  F272 C6 FF           LDA B  #$FF
361  F274 D7 22           STA B  SETING
362  F276 39              RTS
363  F277 4A              DEC A  *
364  F278 26 09           BNE    *+11
365  F27A 96 22           LDA A  SETING
366  F27C 10              SBA
367  F27D 24 01           BCC    *+3
368  F27F 4F              CLR A
369  F280 97 22           STA A  SETING
370  F282 39              RTS
371  F283 4A              DEC A  *
372  F284 26 44           BNE    H13
373  F286 D7 58           STA B  ERRORN
374  F288 4F       FLASH  CLR A
375  F289 BD D0CF         JSR    DASH+2
376  F28C 86 02           LDA A  #2
377  F28E 97 37           STA A  LEDCLK
378  F290 8D 22           BSR    FLASHS
379  F292 25 19           BCS    FLASH2
380  F294 7D 0037         TST    LEDCLK
381  F297 26 F7           BNE    *-7
```

```
382  F299 96 58              LDA A   ERRORN
383  F29B BD D1D1            JSR     DSPDN
384  F29E 86 03              LDA A   #3
385  F2A0 97 37              STA A   LEDCLK
386  F2A2 8D 10              BSR     FLASHS
387  F2A4 25 07              BCS     FLASH2
388  F2A6 7D 0037            TST     LEDCLK
389  F2A9 26 F7              BNE     *-7
390  F2AB 20 0B              BRA     FLASH
391  F2AD 96 2F      FLASH2  LDA A   KEYPAD
392  F2AF 84 40              AND A   #$40
393  F2B1 26 FA              BNE     FLASH2
394  F2B3 39                 RTS
395
396  F2B4 96 2A      FLASHS  LDA A   HESTOP
397  F2B6 94 30              AND A   HISNSW
398  F2B8 26 0E              BNE     FLASH1
399  F2BA 96 29              LDA A   LESTOP
400  F2BC 94 31              AND A   LOSNSW
401  F2BE 26 0A              BNE     FLASH1
402  F2C0 96 2F              LDA A   KEYPAD
403  F2C2 84 C0              AND A   #$C0
404  F2C4 26 02              BNE     FLASH1
405  F2C6 0C                 CLC
406  F2C7 39                 RTS
407  F2C8 0D         FLASH1  SEC
408  F2C9 39                 RTS 409
410  F2CA 4A         H13     DEC A   *
411  F2CB 26 11              BNE     *+19
412  F2CD DE 1C              LDX     SUBSAV
413  F2CF 26 05              BNE     *+7
414  F2D1 86 03              LDA A   #3
415  F2D3 7E D0E9            JMP     ERROR
416  F2D6 DF 64              STX     RUNPC
417  F2D8 CE 0000            LDX     #0
418  F2DB DF 1C              STX     SUBSAV
419  F2DD 39                 RTS
420  F2DE 4A                 DEC A   *
421  F2DF 26 03              BNE     *+5
422  F2E1 D7 21              STA B   DIG
423  F2E3 39                 RTS
424  F2E4 4A                 DEC A   *
425  F2E5 26 03              BNE     *+5
426  F2E7 D7 1E              STA B   RASP
427  F2E9 39                 RTS
428  F2EA 39                 RTS
429
430                  *
431                  *
432                  *
433                  *
434  F2EB 4A         DOTIME  DEC A   *
435  F2EC 26 0D              BNE     *+15
436  F2EE 17                 TBA
437  F2EF BD DAC1            JSR     STCLK2
438  F2F2 BD D73B            JSR     KEYLED
439  F2F5 7D 0024            TST     CLK2
440  F2F8 26 F8              BNE     *-6
441  F2FA 39                 RTS
442  F2FB 4A                 DEC A   *
443  F2FC 26 04              BNE     *+6
444  F2FE 17                 TBA
445  F2FF 7E DAC1            JMP     STCLK2
```

```
446   F302  4A                    DEC  A    *
447   F303  26 07                 BNE       *+9
448   F305  B7 63C2    L3         STA  A    RAMPM+12
449   F308  F7 63C3               STA  B    RAMPM+13
450   F30B  39                    RTS
451   F30C  80 08                 SUB  A    #8
452   F30E  26 0D                 BNE       *+15
453   F310  17                    TBA
454   F311  BD DAB5               JSR       STCLK1
455   F314  BD D73B               JSR       KEYLED
456   F317  7D 0026               TST       CLK1
457   F31A  26 F8                 BNE       *-6
458   F31C  39                    RTS
459   F31D  4A                    DEC  A    *
460   F31E  26 04                 BNE       *+6
461   F320  17                    TBA
462   F321  7E DAB5               JMP       STCLK1
463   F324  4A                    DEC  A    *
464   F325  26 03                 BNE       *+5
465   F327  07                    TPA
466   F328  20 DB                 BRA       L3
467   F32A  4A                    DEC  A    *
468   F32B  26 07                 BNE       *+9
469   F32D  F7 63CF               STA  B    LOGGER+2
470   F330  F7 63CE               STA  B    LOGGER+1
471   F333  39                    RTS
472   F334  39                    RTS
473
474                          *
475                          *
476                          *
477                          *
478   F335  5A         DOTEST     DEC  B
479   F336  37                    PSH  B
480   F337  36                    PSH  A
481   F338  86 11                 LDA  A    #$11
482   F33A  5D                    TST  B
483   F33B  27 04                 BEQ       *+6
484   F33D  48                    ASL  A
485   F33E  5A                    DEC  B
486   F33F  26 FC                 BNE       *-2
487   F341  84 F0                 AND  A    #$F0
488   F343  33                    PUL  B
489   F344  C1 01                 CMP  B    #1
490   F346  26 11                 BNE       TESTSW
491   F348  33                    PUL  B
492   F349  C1 03                 CMP  B    #3
493   F34B  22 06                 BHI       *+8
494   F34D  97 29                 STA  A    LESTOP
495   F34F  7F 002A               CLR       HESTOP
496   F352  39                    RTS
497   F353  97 2A                 STA  A    HESTOP
498   F355  7F 0029               CLR       LESTOP
499   F358  39                    RTS
500   F359  33         TESTSW     PUL  B
501   F35A  C1 03                 CMP  B    #3
502   F35C  22 05                 BHI       *+7
503   F35E  94 31                 AND  A    LOSNSW
504   F360  97 1A                 STA  A    SWFLG1
505   F362  39                    RTS
506   F363  94 30                 AND  A    HISNSW
507   F365  97 1A                 STA  A    SWFLG1
508   F367  39                    RTS
```

```
509
510                    *
511                    *
512                    *
513   F368 81 03    DOCV    CMP A   #3
514   F36A 22 60            BHI     DOCV4
515   F36C 36               PSH A
516   F36D 37               PSH B
517   F36E 7F 63C6          CLR     RAMPM+16
518   F371 96 2E            LDA A   PWRSWT
519   F373 7F 002E          CLR     PWRSWT
520   F376 81 01            CMP A   #1
521   F378 27 15            BEQ     DOCV2
522   F37A 36               PSH A
523   F37B BD D855          JSR     CALCVT
524   F37E 96 39            LDA A   DVSAM
525   F380 97 22            STA A   SETING

526   F382 32               PUL A
527   F383 81 03            CMP A   #3
528   F385 23 08            BLS     DOCV0
529   F387 CE 1FFF          LDX     #$1FFF
530   F38A DF 0A            STX     ANGALL
531   F38C BD D2E2          JSR     COPYAL
532   F38F 33    DOCV0      PUL B
533   F390 32               PUL A
534   F391 81 01            CMP A   #1
535   F393 26 15            BNE     DOCV2
536   F395 5D               TST B
537   F396 26 09            BNE     DOCV1
538   F398 7A 002E          DEC     PWRSWT
539   F39B 7F 002D          CLR     ARCONF
540   F39E 7E D0CD          JMP     DASH
541   F3A1 D7 22  DOCV1     STA B   SETING
542   F3A3 86 01            LDA A   #1
543   F3A5 97 2D            STA A   ARCONF
544   F3A7 97 2E            STA A   PWRSWT
545   F3A9 39               RTS
546   F3AA F7 63C5 DOCV2    STA B   RAMPM+15
547   F3AD 96 22            LDA A   SETING
548   F3AF 10               SBA
549   F3B0 27 EF            BEQ     DOCV1
550   F3B2 24 05            BCC     *+7
551   F3B4 40               NEG A
552   F3B5 C6 01            LDA B   #1
553   F3B7 20 02            BRA     *+4
554   F3B9 C6 FF            LDA B   #$FF
555   F3BB F7 63C4          STA B   RAMPM+14
556   F3BE BD D000          JSR     RAMP
557   F3C1 96 40            LDA A   OPCODE
558   F3C3 B7 63C6          STA A   RAMPM+16
559   F3C6 81 02            CMP A   #2
560   F3C8 27 09            BEQ     DOCV1+2
561   F3CA 86 01            LDA A   #1
562   F3CC 97 2D            STA A   ARCONF
563   F3CF 97 2E            STA A   PWRSWT
564   F3D0 BD D73B          JSR     KEYLED
565   F3D3 7D 63C6          TST     RAMPM+16
566   F3D6 26 F8            BNE     *-6
567   F3D8 39               RTS
568   F3D9 D0 39  DOCV4     SUB B   DVSAM
569   F3DB 07               TPA
570   F3DC 97 1B            STA A   SWFLG2
571   F3DE 39               RTS
```

```
572
573                     *
574                     *
575                     *
576                     *
577    F3DF 81 01   DOCOTL   CMP A   #1
578    F3E1 26 04            BNE     *+6
579    F3E3 7F 0028          CLR     RELAYS
580    F3E6 39               RTS
581    F3E7 CE F407          LDX     #RLYMAP
582    F3EA 5A               DEC  B
583    F3EB 17               TBA
584    F3EC 81 07            CMP A   #7
585    F3EE 23 02            BLS     *+4
586    F3F0 80 0A            SUB A   #10
587    F3F2 BD 01C3          JSR     ADDAX
588    F3F5 A6 00            LDA A   0,X
589    F3F7 C1 07            CMP B   #7
590    F3F9 22 05            BHI     *+7
591    F3FB 9A 28            ORA A   RELAYS
592    F3FD 97 28            STA A   RELAYS
593    F3FF 39               RTS
594    F400 94 28            AND A   RELAYS
595    F402 98 28            EOR A   RELAYS
596    F404 97 28            STA A   RELAYS
597    F406 39               RTS
598    F407        RLYMAP    FCB     1,2,4,8,$10,$20,$40,$80
599
600         FFF8             ORG     $FFF8
601    FFF8                  FDB     IRQSR
602    FFFA                  FDB     START
603    FFFC                  FDB     NMISR
604    FFFE                  FDB     START
605                          END
0  ERROR(S) DETECTED IN PASS 2

NAM    WELDER UTILITY ROUTINES
1
2           D000                ORG    $D000

3
4     D000 CE 0656 START0      LDX    #IRQOUT
5     D003 DF 01                STX    IRQCB
6     D005 CE D2F5              LDX    #NMISR
7     D008 FF 63C5              STX    $63C5
8     D00B CE D3D6              LDX    #IRQSR
9     D00E FF 63C1              STX    $63C1
10    D011 CE 0004              LDX    #ERRORT
11    D014 6F 00                CLR    0,X
12    D016 08                   INX
13    D017 8C 0080              CPX    #$80
14    D01A 26 F8                BNE    *-6
15    D01C CE 4000              LDX    #PIA
16    D01F 6F 01                CLR    1,X
17    D021 6F 03                CLR    3,X
18    D023 6F 05                CLR    5,X
19    D025 6F 07                CLR    7,X
20    D027 4F                   CLR A
21    D028 A7 00                STA A  0,X
22    D02A 4A                   DEC A
```

```
23    D02B A7 02              STA  A   2,X
24    D02D A7 06              STA  A   6,X
25    D02F 86 F8              LDA  A   #$F8
26    D031 A7 04              STA  A   4,X
27    D033 86 34              LDA  A   #$34
28    D035 A7 03              STA  A   3,X
29    D037 A7 05              STA  A   5,X
30    D039 C6 03              LDA  B   #3
31    D03B E7 02              STA  B   2,X
32    D03D C6 C0              LDA  B   #$C0
33    D03F F7 04              STA  B   4,X
34    D041 C6 3C              LDA  B   #$3C
35    D043 E7 07              STA  B   7,X
36    D045 6F 06              CLR      6,X
37    D047 A7 07              STA  A   7,X
38    D049 E7 01              STA  B   1,X
39                    *
40                    *
41                    *
42    D04B 86 82              LDA  A   #$82
43    D04D B7 2001            STA  A   TIMCR2
44    D050 B7 2000            STA  A   TIMCRX
45    D053 4C                 INC  A
46    D054 B7 2001            STA  A   TIMCR2
47    D057 86 02              LDA  A   #$02
48    D059 B7 2000            STA  A   TIMCRX
49    D05C CE 09B6            LDX      #2486
50    D05F DF 10              STX      IFOSC
51    D061 FF 2002            STX      TIMBF1
52    D064 CE FFFF            LDX      #$FFFF
53    D067 FF 2006            STX      TIMBF3
54                    *
55    D06A 86 A2              LDA  A   #$A2
56    D06C B7 8001            STA  A   SCRCR2
57    D06F B7 8000            STA  A   SCRCRX
58    D072 4C                 INC  A
59    D073 B7 8001            STA  A   SCRCR2
60    D076 4A                 DEC  A
61    D077 B7 8000            STA  A   SCRCRX
62    D07A CE 206C            LDX      #8300
63    D07D DF 0A              STX      ANGALL
64    D07F BD D2E2            JSR      COPYAL
65    D082 8D 14              BSR      SETSP
66    D084 BD D124            JSR      HLTALL
67    D087 01                 NOP
68    D088 0E                 CLI
69    D089 3E                 WAI
70    D08A BD DA29            JSR      TSTCRC
71    D08D 24 08              BCC      *+10
72    D08F 86 01              LDA  A   #1
73    D091 BD 00E9            JSR      ERROR
74    D094 7E DA41            JMP      PUTCRC
75    D097 39                 RTS
76
77                    *
78    D098 86 03      SETSP   LDA  A   #3
79    D09A B7 0100            STA  A   SP1CR
80    D09D B7 2008            STA  A   SP2CR
81    D0A0 CE 0005            LDX      #5
82    D0A3 FF 2004            STX      TIMBF2
83    D0A6 CE 612C            LDX      #XMBUF
84    D0A9 6F 00              CLR      0,X
85    D0AB 08                 INX
86    D0AC 8C 63B7            CPX      #RDBUF+RDBFLN+1
```

```
 87    D0AF 26 FA            BNE          *-6
 88    D0B1 CE 612C           LDX         #XMBUF
 89    D0B4 DF 59             STX         XMPNT1
 90    D0B6 DF 5B             STX         XMPNT2
 91    D0B8 CE 61F4           LDX         #RDBUF
 92    D0BB DF 60             STX         RDPNT1
 93    D0BD DF 62             STX         RDPNT2
 94    D0BF 7F 005F           CLR         CRRCNT
 95    D0C2 86 91             LDA A       #$91
 96    D0C4 B7 0100           STA A       SP1CR
 97    D0C7 86 19             LDA A       #$19
 98    D0C9 B7 2008           STA A       SP2CR
 99    D0CC 39                RTS
100
101    D0CD 86 02    DASH     LDA A       #2
102    D0CF 16                TAB
103    D0D0 20 1D             BRA         SLEEP+4
104    D0D2 86 1E    SMILE    LDA A       #$1E
105    D0D4 C6 E0             LDA B       #$E0
106    D0D6 20 0A             BRA         SLEEP+4
107    D0D8 86 1E    FROWN    LDA A       #$1E
108    D0DA C6 A2             LDA B       #$A2
109    D0DC 20 04             BRA         SLEEP+4
110    D0DE 86 08    SLEEP    LDA A       #8
111    D0E0 C6 E2             LDA B       #$E2
112    D0E2 97 36             STA A       LHLED
113    D0E4 D7 35             STA B       MIDLED
114    D0E6 97 34             STA A       RHLED
115    D0E8 39                RTS
116
117                      *
118                      *
119    D0E9 97 58    ERROR    STA A       ERRORN
120    D0EB BD 37             BSR         HLTALL
121    D0ED 20 1E             BRA         ERROR1
122    D0EF 96 2F             LDA A       KEYPAD
123    D0F1 84 80             AND A       #$80
124    D0F3 27 0C             BEQ         ERROR0
125    D0F5 DE 64             LDX         RUNPC
126    D0F7 BD D84F           JSR         DLNUM
127    D0FA 96 2F             LDA A       KEYPAD
128    D0FC 84 80             AND A       #$80
129    D0FE 26 FA             BNE         *-4
130    D100 39                RTS
131    D101 96 37    ERROR0   LDA A       LEDCLK
132    D103 2B EA             BMI         ERROR+6
133    D105 27 06             BEQ         ERROR1
134    D107 81 28             CMP A       #40
135    D109 22 0A             BHI         ERROR2
136    D10B 20 E2             BRA         ERROR+6
137    D10D 8D C9    ERROR1   BSR         FROWN
138    D10F 86 84             LDA A       #127+5
139    D111 97 37             STA A       LEDCLK
140    D113 20 DA             BRA         ERROR+6
141    D115 96 58    ERROR2   LDA A       ERRORN
142    D117 BD D1D1           JSR         DSPDN
143    D11A 86 6E             LDA A       #$6E
144    D11C 97 36             STA A       LHLED
145    D11E 86 05             LDA A       #5
146    D120 97 37             STA A       LEDCLK
147    D122 20 CB             BRA         ERROR+6
148
149                      *
150    D124 86 FA    HLTALL   LDA A       #250
```

```
151   D126 97 38              STA A   XFORMR
152   D128 86 FF              LDA A   #$FF
153   D12A 97 2E              STA A   PWRSWT
154   D12C 86 20              LDA A   #$20
155   D12E BD 20              BSR     AUXSND
156   D130 CE 0656            LDX     #IRQOUT
157   D133 DF 01              STX     IRQCR
158   D135 7F 63CF            CLR     LOGGER+1
159   D138 7F 63C6            CLR     RAMPM+16
160   D13B CE 0019            LDX     #USRCNT
161   D13E 6F 00              CLR     0,X
162   D140 08                 INX
163   D141 8C 002F            CPY     #PWRSWT
164   D144 26 F8              BNE     *-6
165   D146 86 34              LDA A   #$34
166   D148 B7 4023            STA A   PIA+3
167   D14B 20 85              BRA     SMILE
168
169                   *
170                   *
171                   *
172                   *
173                   *
174   D14D 7F 004C            CLR     LRCBYT
175   D150 36       AUXSND    PSH A
176   D151 98 4C              EOR A   LRCBYT
177   D153 97 4C              STA A   LRCBYT
178   D155 B6 200B            LDA A   SP2CR
179   D158 47                 ASR A
180   D159 47                 ASR A
181   D15A 24 F9              BCC     *-5
182   D15C 32                 PUL A
183   D15D B7 2009            STA A   SP2DR
184   D160 39                 RTS
185   D161 96 4C   AUXFTN     LDA A   LRCBYT
186   D163 8A 80              ORA A   #$80
187   D165 20 E9              BRA     AUXSND
188                   *
189   D167 4F       PURGE     CLR A
190   D168 C6 14              LDA B   #20
191   D16A 8D E4              BSR     AUXSND
192   D16C 7D 2009            TST     SP2DR
193   D16F 5A                 DEC B
194   D170 26 F8              BNE     *-6
195   D172 39                 RTS
196                   *
197   D173 CE 0000  REPLY     LDX     #0
198   D176 09                 DEX
199   D177 27 0B              BEQ     TIMOUT
200   D179 B6 200B            LDA A   SP2CR
201   D17C 47                 ASR A
202   D17D 24 F7              BCC     REPLY+3
203   D17F B6 2009            LDA A   SP2DR
204   D182 0C                 CLC
205   D183 39                 RTS
206   D184 4F       TIMOUT    CLR A
207   D185 0D                 SEC
208   D186 39                 RTS
209
210                   *
211                   *
212   D187 5F                 CLR B
213   D188 D7 33   WRTLED     STA B   OPMASK
214   D18A 96 4F              LDA A   HUNS
```

```
215  D1AC BD 2A              BSR    GDIGIT
216  D1AF 81 FC              CMP A  #$FC
217  D190 26 01              BNE    *+3
218  D192 4F                 CLR A
219  D193 81 FD              CMP A  #$FD
220  D195 26 02              BNE    *+4
221  D197 86 01              LDA A  #1
222  D199 97 36              STA A  LHLED
223  D19B 96 50              LDA A  TENS
224  D19D BD 19              BSR    GDIGIT
225  D19F 7D 0036            TST    LHLED
226  D1A2 26 0B              BNE    *+13
227  D1A4 81 FC              CMP A  #$FC
228  D1A6 26 01              BNE    *+3
229  D1A8 4F                 CLR A
230  D1A9 81 FD              CMP A  #$FD
231  D1AB 26 02              BNE    *+4
232  D1AD 86 01              LDA A  #1
233  D1AF 97 35              STA A  MIDLED
234  D1B1 96 51              LDA A  ONES
235  D1B3 BD 03              BSR    GDIGIT
236  D1B5 97 34              STA A  RHLED
237  D1B7 39                 RTS
238  D1B8 CE DA88  GDIGIT    LDX    #NUM0
239  D1BB BD 06              BSR    ADDAY
240  D1BD A6 00              LDA A  0,X
241  D1BF 44                 LSR A
242  D1C0 58                 ASL B
243  D1C1 49                 ROL A
244  D1C2 39                 RTS 245
246  D1C3 DF 06    ADDAY     STX    TEMP
247  D1C5 9B 07              ADD A  TEMP+1
248  D1C7 97 07              STA A  TEMP+1
249  D1C9 24 03              BCC    *+5
250  D1CB 7C 0006            INC    TEMP
251  D1CE DE 06              LDX    TEMP
252  D1D0 39                 RTS
253
254                 *
255  D1D1 BD 49    DSPDN     BSR    CODET
256  D1D3 20 B2              BRA    WRTLED-1

257
258                 *
259  D1D5 BD 07    WVOLTS    BSR    CODEV
260  D1D7 BD D253            JSR    LOGV
261  D1DA C6 40              LDA B  #$40
262  D1DC 20 AA              BRA    WRTLED
263                 *
264                 *
265  D1DE CE 0000  CODEV     LDX    #0
266  D1E1 DF 4F              STX    HUNS
267  D1E3 81 31              CMP A  #49
268  D1E5 23 07              BLS    *+9
269  D1E7 80 32              SUB A  #50
270  D1E9 7C 004F            INC    HUNS
271  D1EC 20 F5              BRA    *-9
272  D1EE 81 04    CODEV1    CMP A  #4
273  D1F0 23 07              BLS    *+9
274  D1F2 80 05              SUB A  #5
275  D1F4 7C 0050            INC    TENS
276  D1F7 20 F5              BRA    *-9
277  D1F9 48                 ASL A
```

```
278   D1FA 97 51             STA A   ONES
279   D1FC 39                RTS
280                  *
281                  *
282                  *
283   D1FD D6 23    WAMPS    LDA B   ARANGE
284   D1FF 27 0D             BEQ     LOAMP
285   D201 5A                DEC B
286   D202 27 06             BEQ     MIDAMP
287   D204 8D 34    HIAMP    BSR     CODETH
288   D206 8D 50             BSR     LOGA
289   D208 20 C9             BRA     DSPDN+2
290   D20A 8D D2    MIDAMP   BSR     CODEV
291   D20C 20 F8             BRA     HIAMP+2
292   D20E 8D 2C    LOAMP    BSR     CODET
293   D210 20 F4             BRA     HIAMP+2
294                  *
295                  *
296                  *
297                  *
298   D212 C1 0A    DAMPS    CMP B   #9
299   D214 23 F8             BLS     LOAMP
300   D216 C1 13             CMP B   #19
301   D218 23 F0             BLS     MIDAMP
302   D21A 20 E8             BRA     HIAMP
303
304                  *
305   D21C CE 0000  CODET    LDX     #0
306   D21F DF 4F             STX     HUNS
307   D221 81 63             CMP A   #99
308   D223 23 07             BLS     *+9
309   D225 80 64             SUB A   #100
310   D227 7C 004F            INC     HUNS
311   D22A 20 F5             BRA     *-9
312   D22C 81 09    CODE2D   CMP A   #9
313   D22E 23 07             BLS     *+9
314   D230 80 0A             SUB A   #10
315   D232 7C 0050           INC     TENS
316   D235 20 F5             BRA     *-9
317   D237 97 51             STA A   ONES
318   D239 39                RTS
319                  *
320   D23A CE 0000  CODETH   LDX     #0
321   D23D DF 4F             STX     HUNS
322   D23F 81 F9             CMP A   #249
323   D241 23 02             BLS     *+4
324   D243 86 F9             LDA A   #249
325   D245 81 18             CMP A   #24
326   D247 23 07             BLS     *+9
327   D249 80 19             SUB A   #25
328   D24B 7C 004F            INC     HUNS
329   D24E 20 F5             BRA     *-9
330   D250 48                ASL A
331   D251 20 9B             BRA     CODEV1
332                  *
333                  *
334                  *
335   D253 CE 63C7  LOGV     LDX     #LOGDAT
336   D256 20 03             BRA     *+5
337   D258 CE 63CA  LOGA     LDX     #LOGDAT+3
338   D25B 96 4F             LDA A   HUNS
339   D25D 8B 30             ADD A   #$30
340   D25F A7 00             STA A   0,X
341   D261 96 50             LDA A   TENS
342   D263 8B 30             ADD A   #$30
```

```
343   D265 A7 01              STA  A  1,X
344   D267 96 51              LDA  A  ONES
345   D269 8B 30              ADD  A  #$30
346   D26B A7 02              STA  A  2,X
347   D26D 39                 RTS
348
349                    *
350                    *
351                    *
352                    *
353                    *
354   D26F DF 5D    INCH       STX     IOXSAV
355   D270 DE 60               LDX     RDPNT1
356   D272 A6 00               LDA  A  0,X
357   D274 6F 00               CLR     0,X
358   D276 08                  INX
359   D277 8C 63B6             CPX     #RDBUF+RDBFLN
360   D27A 26 03               BNE     *+5
361   D27C CE 61F4             LDX     #RDBUF
362   D27F DF 60               STX     RDPNT1
363   D281 81 0D               CMP  A  #$D
364   D283 27 0B               BEQ     *+10
365   D285 81 8D               CMP  A  #$8D
366   D287 27 04               BEQ     *+6
367   D289 DE 5D               LDX     IOXSAV
368   D28B 0C                  CLC
369   D28C 39                  RTS
370   D28D 7A 005F             DEC     CRRCNT
371   D290 DE 5D               LDX     IOXSAV
372   D292 0D                  SEC
373   D293 39                  RTS
374                    *
375                    *
376                    *
377   D294 DF 5D    OUTCH      STX     IOXSAV
378   D296 DE 5B               LDX     XMPNT2
379   D298 A7 00               STA  A  0,X
380   D29A 08                  INX
381   D29B 8C 61F4             CPX     #XMBUF+XMBFLN
382   D29E 26 03               BNE     *+5
383   D2A0 CE 612C             LDX     #XMBUF
384   D2A3 DF 5B               STX     XMPNT2
385   D2A5 7D 004A             TST     AUXACT
386   D2A8 26 05               BNE     *+7
387   D2AA 86 B1               LDA  A  #$B1
388   D2AC B7 0100             STA  A  SP1CR
389   D2AF DE 5D               LDX     IOXSAV
390   D2B1 39                  RTS
391                    *
392                    *
393                    *
394   D2B2 DE 5B    WATXMB     LDX     XMPNT2
395   D2B4 9C 59               CPX     XMPNT1
396   D2B6 26 FA               BNE     WATXMB
397   D2B8 39                  RTS
398
399                    *
400                    *
401                    *
402                    *
403                    *
404
405                    *
406   D2B9 96 9B    DECR       LDA  A  ANGALL+1
407   D2BB 9B 25               ADD  A  ERRORT+1
```

```
408    D2BD 97 0B              STA A   ANGALL+1
409    D2BF 96 0A              LDA A   ANGALL
410    D2C1 99 04              ADC A   ERRORT
411    D2C3 81 23              CMP A   #$23
412    D2C5 23 02              BLS     *+4
413    D2C7 86 23              LDA A   #$23
414    D2C9 97 0A              STA A   ANGALL
415    D2CB 20 15              BRA     COPYAL
416                    *
417    D2CD 96 0B    INCR      LDA A   ANGALL+1
418    D2CF 90 05              SUB A   ERRORT+1
419    D2D1 97 0B              STA A   ANGALL+1
420    D2D3 96 0A              LDA A   ANGALL
421    D2D5 92 04              SBC A   ERRORT
422    D2D7 97 0A              STA A   ANGALL
423    D2D9 2A 07              BPL     COPYAL
424    D2DB 7F 000A            CLR     ANGALL
425    D2DE 86 02              LDA A   #2
426    D2E0 97 0B              STA A   ANGALL+1
427                    *
428    D2E2 96 0B    COPYAL    LDA A   ANGALL+1
429    D2E4 97 0D              STA A   ANGLLO+1
430    D2E6 97 09              STA A   ANGLHI+1
431    D2E8 D6 21              LDA B   DIG
432    D2EA 96 0A              LDA A   ANGALL
433    D2EC 1B                 ABA
434    D2ED 97 0C              STA A   ANGLLO
435    D2EF 96 0A              LDA A   ANGALL
436    D2F1 10                 SBA
437    D2F2 97 08              STA A   ANGLHI
438    D2F4 39                 RTS
439
440                    *
441                    *
442                    *
443                    *
444                    *
445                    *
446    D2F5 FE 2006  NMISR     LDX     TIMRF3
447    D2F8 DF 12              STX     LFOSC+2
448    D2FA CE FFE7            LDX     #$FFE7
449    D2FD FF 2006            STX     TIMRF3
450    D300 86 05              LDA A   #5
451    D302 97 14              STA A   LFOSC+4
452    D304 01                 NOP
453    D305 3B                 RTI
454                    *
455    D306 F6 0100  IRQSR     LDA B   SP1CR
456    D309 2A 43              BPL     IRQSR1
457    D30B 54                 LSR B
458    D30C 25 1F              BCS     RCVDAT
459                    *
460    D30E DE 59              LDX     XMPNT1
461    D310 9C 5B              CPX     XMPNT2
462    D312 26 07              BNE     XMDAT
463    D314 86 91              LDA A   #$91
464    D316 B7 0100            STA A   SP1CR
465    D319 01                 NOP
466    D31A 3B                 RTI
467    D31B A6 00    XMDAT     LDA A   0,X
468    D31D B7 0101            STA A   SP1DR
469    D320 08                 INX
470    D321 8C 61F4            CPX     #XMBUF+XMBFLN
471    D324 26 03              BNE     *+5
472    D326 CE 612C            LDX     #XMBUF
473    D329 DF 59              STX     XMPNT1
```

```
474    D32A 01                    NOP
475    D32C 3B                    RTI
476                      *
477    D32D B6 0101  RCVDAT   LDA A   SP1DR
478    D330 DE 62             LDX     RDPNT2
479    D332 A7 00             STA A   0,X
480    D334 08                INX
481    D335 8C 63B6           CPX     #RDBUF+RDBFLN
482    D338 26 03             BNE     *+5
483    D33A CE 61F4           LDX     #RDBUF
484    D33D DF 62             STX     RDPNT2
485    D33F 81 80             CMP A   #$80
486    D341 27 06             BEQ     *+8
487    D343 81 00             CMP A   #$0
488    D345 27 02             BEQ     *+4
489    D347 01                NOP
490    D348 3B                RTI
491    D349 7C 005F           INC     CRRCNT
492    D34C 01                NOP
493    D34D 3B                RTI
494
495    D34E C6 3C    IRQSP1   LDA B   #$3C
496    D350 F7 4005           STA B   PIA2+1
497    D353 96 03             LDA A   STEP
498    D355 4C                INC A
499    D356 81 05             CMP A   #5
500    D358 23 01             BLS     *+3
501    D35A 4F                CLR A
502    D35B 97 03             STA A   STEP
503    D35D C6 34             LDA B   #$34
504    D35F F7 4005           STA B   PIA2+1
505    D362 7D 001E           TST     RASP
506    D365 27 19             BEQ     NORASP
507                      *
508                      *
509    D367 7A 001F           DEC     RASP+1
510    D36A 26 07             BNE     *+9
511    D36C D6 1E             LDA B   RASP
512    D36E D7 1F             STA B   RASP+1
513    D370 73 0020           COM     RASP+2
514    D373 7D 0020           TST     RASP+2
515    D376 2B 04             BMI     *+6
516    D378 DE 08             LDX     ANGLHI
517    D37A 20 06             BRA     NORASP+2
518    D37C DE 0C             LDX     ANGLLO
519    D37E 20 02             BRA     NORASP+2
520    D380 DE 0A    NORASP   LDX     ANGALL
521    D382 DF 0E             STX     FIRING
522    D384 CE FFFF           LDX     #$FFFF
523    D387 F6 4002           LDA B   PIA+2
524    D38A 7D 003A           TST     XFORMR
525    D38D 26 03             BNE     *+5
526    D38F 7E 0460           JMP     SETFIN
527                      *
528    D392 81 02             CMP A   #2
529    D394 22 08             BHI     H3
530    D396 81 01             CMP A   #1
531    D398 27 25             BEQ     SET1A
532    D39A 23 0F             BLS     SET3B
533    D39C 20 39             BRA     SET2A
534    D39E 81 04    H3       CMP A   #4
535    D3A0 27 05             BEQ     *+7
536    D3A2 23 74             BLS     SET3A
537    D3A4 7E 0445           JMP     SET2B
538    D3A7 7E 042D           JMP     SET1B
```

```
539
540                          *
541                          *
542    D3AA FF 8002  SET3A    STX      SCRBF1
543    D3AD DE 0E             LDX      FIRING
544    D3AF FF 8006           STX      SCRBF3
545    D3B2 C4 F3             AND  B   #$F3
546    D3B4 CA 08             ORA  B   #$08
547    D3B6 B6 4004           LDA  A   PIA2
548    D3B9 85 04             BIT  A   #4
549    D3BB 26 35             BNE      TOSOON
550    D3BD 20 46             BRA      TOLATE
551    D3BF FF 8004  SET1A    STX      SCRBF2
552    D3C2 DE 0E             LDX      FIRING
553    D3C4 FF 8002           STX      SCRBF1
554    D3C7 C4 CF             AND  B   #$CF
555    D3C9 CA 20             ORA  B   #$20
556    D3CB B6 4004           LDA  A   PIA2
557    D3CE 85 04             BIT  A   #4
558    D3D0 27 31             BEQ      TOLATE-2
559    D3D2 7A 0003           DEC      STEP
560    D3D5 20 2C             BRA      TOLATE-2
561    D3D7 FF 8006  SET2A    STX      SCRBF3
562    D3DA DE 0E             LDX      FIRING
563    D3DC FF 8004           STX      SCRBF2
564    D3DF C4 3F             AND  B   #$3F
565    D3E1 CA 80             ORA  B   #$80
566    D3E3 B6 4004           LDA  A   PIA2
567    D3E6 85 04             BIT  A   #4
568    D3E8 27 19             BEQ      TOLATE-2
569    D3EA 7A 0003           DEC      STEP
570    D3ED 7A 0003           DEC      STEP
571    D3F0 20 11             BRA      TOLATE-2
572                          *
573                          *
574                          *
575                          *
576                          *
577    D3F2 7D 0015  TOSOON   TST      FSHIFT
578    D3F5 2A 07             BPL      *+9
579    D3F7 CE 0001           LDX      #1
580    D3FA DF 15             STX      FSHIFT
581    D3FC 20 62             BRA      SETFIN
582    D3FE DF 15             LDX      FSHIFT
583    D400 08                INX
584    D401 DF 15             STX      FSHIFT
585    D403 20 5B             BRA      SETFIN
586                          *
587    D405 7D 0015  TOLATE   TST      FSHIFT
588    D408 2B 07             BMI      *+9
589    D40A CE FFFF           LDX      #$FFFF
590    D40D DF 15             STX      FSHIFT
591    D40F 20 4F             BRA      SETFIN
592    D411 DE 15             LDX      FSHIFT
593    D413 09                DEX
594    D414 DF 15             STX      FSHIFT
595    D416 20 4B             BRA      SETFIN
596
597                          *
598                          *
599    D418 FF 8002  SET3A    STX      SCRBF1
600    D41B DE 0E             LDX      FIRING
601    D41D FF 8006           STX      SCRBF3
602    D420 C4 F3             AND  B   #$F3
603    D422 CA 04             ORA  B   #$04
604    D424 B6 4004           LDA  A   PIA2
```

```
605   D427 85 24            BIT A    #4
606   D429 27 C7            BEQ      TOSOON
607   D42B 20 D8            BRA      TOLATE
608   D42D FF 8004  SET1A   STX      SCRBF2
609   D430 DE 0E            LDX      FIRING
610   D432 FF 8002          STX      SCRBF1
611   D435 C4 CF            AND B    #$CF
612   D437 CA 10            ORA B    #$10
613   D439 B6 4004          LDA A    PIA2
614   D43C 85 04            BIT A    #4
615   D43F 26 20            BNE      SETFIN
616   D440 7A 0003          DEC      STEP
617   D443 20 1B            BRA      SETFIN
618   D445 FF 8006  SET2A   STX      SCRBF3
619   D448 DE 0E            LDX      FIRING
620   D44A FF 8004          STX      SCRBF2
621   D44D C4 3F            AND B    #$3F
622   D44F CA 40            ORA B    #$40
623   D451 B6 4004          LDA A    PIA2
624   D454 85 04            BIT A    #4
625   D456 26 08            BNE      SETFIN
626   D458 7A 0003          DEC      STEP
627   D45B 7A 0003          DEC      STEP
628   D45E 20 00            BRA      SETFIN
629
630                      *
631   D460 17       SETFIN  TBA
632   D461 DA 2E            ORA B    PWRSWT
633   D463 CA 03            ORA B    #3
634   D465 F7 4002          STA B    PIA+2
635   D468 4C               INC A
636   D469 84 03            AND A    #3
637   D46B 36               PSH A
638   D46C 27 0E            BEQ      DISRHD
639   D46E 81 03            CMP A    #3
640   D470 27 18            BEQ      SUBSTP
641   D472 4A               DEC A
642   D473 27 0E            BEQ      DISLHD
643   D475 96 35            LDA A    MIDLED
644   D477 B7 4006          STA A    PIA2+2
645   D47A 20 73            BRA      DISOUT
646   D47C 96 34    DISRHD  LDA A    RHLED
647   D47E B7 4006          STA A    PIA2+2
648   D481 20 6C            BRA      DISOUT
649   D483 96 36    DISLHD  LDA A    LHLED
650   D485 B7 4006          STA A    PIA2+2
651   D488 20 65            BRA      DISOUT 652
653                      *
654   D48A 96 32    SUBSTP  LDA A    SUBCNT
655   D48C 84 C0            AND A    #$C0
656   D48E 8B 40            ADD A    #$40
657   D490 97 32            STA A    SUBCNT
658   D492 81 C0            CMP A    #$C0
659   D494 27 35            BEQ      SRELAY
660                      *
661   D496 86 30            LDA A    #$30
662   D498 B7 4007          STA A    PIA2+3
663   D49B CE 0F34          LDX      #$0F34
664   D49E FF 4006          STX      PIA2+2
665                      *
666   D4A1 B6 4004          LDA A    PIA2
667   D4A4 84 3F            AND A    #$3F
668   D4A6 9A 32            ORA A    SUBCNT
```

```
669   D4AA B7 4004              STA A   PIA2
670                     *
671   D4AB 96 32                LDA A   SUBCNT
672   D4AD 27 0C                BEQ     RDLOSW
673   D4AF 81 40                CMP A   #$40
674   D4B1 27 10                BEQ     RDHISW
675
676                     *
677   D4B3 B6 4006              LDA A   PIA2+2
678   D4B6 43                   COM A
679   D4B7 97 2F                STA A   KEYPAD
680   D4B9 20 21                BRA     SUBFIN
681                     *
682   D4BB B6 4006   RDLOSW     LDA A   PIA2+2
683   D4BE 43                   COM A
684   D4BF 97 31                STA A   LOSNSW
685   D4C1 20 19                BRA     SUBFIN
686                     *
687   D4C3 B6 4006   RDHISW     LDA A   PIA2+2
688   D4C6 43                   COM A
689   D4C7 97 30                STA A   HISNSW
690   D4C9 20 11                BRA     SUBFIN
691                     *
692   D4CB 96 28     SRELAY     LDA A   RELAYS
693   D4CD B7 4006              STA A   PIA2+2
694   D4D0 86 3C                LDA A   #$3C
695   D4D2 B7 4007              STA A   PIA2+3
696   D4D5 86 34                LDA A   #$34
697   D4D7 B7 4007              STA A   PIA2+3
698   D4DA 20 13                BRA     DISOUT
699                     *
700   D4DC 86 C0     SUBFIN     LDA A   #$C0
701   D4DE BA 4004              ORA A   PIA2
702   D4E1 B7 4004              STA A   PIA2
703   D4E4 86 30                LDA A   #$30
704   D4E6 B7 4007              STA A   PIA2+3
705   D4E9 CE FF34              LDX     #$FF34
706   D4EC FF 4006              STX     PIA2+2

707
708   D4EF 32        DISOUT     PUL A
709   D4F0 C4 FC                AND B   #$FC
710   D4F2 1B                   ABA
711   D4F3 B7 4002              STA A   PIA+2
712
713                     *
714                     *
715                     *
716                     *
717   D4F6 B6 4004              LDA A   PIA2
718   D4F9 8A 20                ORA A   #$20
719   D4FB B7 4004              STA A   PIA2
720                     *
721   D4FE D6 3C                LDA B   DVSAM+3
722   D500 B6 4000              LDA A   PIA
723   D503 97 3C                STA A   DVSAM+3
724   D505 10                   SBA
725   D506 97 3A                STA A   DVSAM+1
726   D508 07                   TPA
727   D509 97 3B                STA A   DVSAM+2
728   D50B B6 4000              LDA A   PIA
729   D50E 1B                   ABA
730   D50F 46                   ROR A
731   D510 24 01                BCC     *+3
732   D512 4C                   INC A
733   D513 97 39                STA A   DVSAM
```

```
734    D515 9B 3E           ADD A   DVSAM+5
735    D517 97 3F           STA A   DVSAM+5
736    D519 24 03           BCC     *+5
737    D51B 7C 003F         INC     DVSAM+6
738    D51E 7A 003D         DEC     DVSAM+4
739    D521 26 0F           BNE     *+17
740    D523 96 3F           LDA A   DVSAM+6
741    D525 7D 003E         TST     DVSAM+5
742    D528 2A 01           BPL     *+3
743    D52A 4C              INC A
744    D52B 97 40           STA A   DVSAM+7
745    D52D CE 0000         LDX     #0
746    D530 DF 3E           STX     DVSAM+5

747
748    D532 86 3C           LDA A   #$3C
749    D534 B7 4005         STA A   PIA2+1
750    D537 01              NOP
751    D538 01              NOP
752    D539 86 34           LDA A   #$34
753    D53B B7 4005         STA A   PIA2+1
754    D53E 86 0B           LDA A   #11
755    D540 4A              DEC A
756    D541 26 FD           BNE     *-1
757
758                *
759    D543 D6 44           LDA B   DISAM+3
760    D545 B6 4000         LDA A   PIA
761    D548 97 44           STA A   DISAM+3
762    D54A 10              SBA
763    D54B 97 42           STA A   DISAM+1
764    D54D 07              TPA
765    D54E 97 43           STA A   DISAM+2
766    D550 B6 4000         LDA A   PIA
767    D553 1B              ABA
768    D554 46              ROR A
769    D555 24 01           BCC     *+3
770    D557 4C              INC A
771    D558 97 41           STA A   DISAM
772    D55A 9B 46           ADD A   DISAM+5
773    D55C 97 46           STA A   DISAM+5
774    D55E 24 03           BCC     *+5
775    D560 7C 0047         INC     DISAM+6
776    D563 7A 0045         DEC     DISAM+4
777    D566 26 0F           BNE     *+17
778    D568 96 47           LDA A   DISAM+6
779    D56A 7D 0046         TST     DISAM+5
780    D56D 2A 01           BPL     *+3
781    D56F 4C              INC A
782    D570 97 48           STA A   DISAM+7
783    D572 CE 0000         LDX     #0
784    D575 DF 46           STX     DISAM+5
785                *
786    D577 B6 4004         LDA A   PIA2
787    D57A 84 DF           AND A   #$DF
788    D57C B7 4004         STA A   PIA2
789    D57F 7C 0049         INC     NEWRDY
790
791                *
792                *
793                *
794    D582 7D 63C6         TST     RAMPM+16
795    D585 27 37           BEQ     RAMP6
796    D587 FE 63BD         LDX     RAMPM+7
797    D58A 27 06           BEQ     RAMP2
798    D58C 09      RAMP1   DEX
```

```
799   D58D FF 63BD            STX       RAMPM+7
800   D590 20 2C               BRA       RAMP6
801   D592 B6 63BC  RAMP2     LDA A     RAMPM+6
802   D595 27 06               BEQ       RAMP3
803   D597 4A                  DEC A
804   D598 B7 63BC             STA A     RAMPM+6
805   D59B 20 EF               BRA       RAMP1
806   D59D 96 22   RAMP3      LDA A     SETING
807   D59F B1 63C5             CMP A     RAMPM+15
808   D5A2 27 0A               BEQ       RAMP5
809   D5A4 BB 63C4             ADD A     RAMPM+14
810   D5A7 97 22               STA A     SETING
811   D5A9 BD DE8A             JSR       RAMP4
812   D5AC 20 10               BRA       RAMP6
813   D5AE 7F 63C6  RAMP5     CLR       RAMPM+16
814   D5B1 40                  TST A
815   D5B2 26 0A               BNE       RAMP6
816   D5B4 7F 002D             CLR       ARCONF
817   D5B7 86 FF               LDA A     #$FF
818   D5B9 97 2E               STA A     PWRSWT
819   D5BB 7E 0656             JMP       IRQOUT
820                   *
821                   *
822                   *
823   D5BE 96 2E   RAMP6      LDA A     PWRSWT
824   D5C0 4A                  DEC A
825   D5C1 27 0A               BEQ       FIXCV
826   D5C3 4A                  DEC A
827   D5C4 27 3C               BEQ       FIXCA
828   D5C6 4A                  DEC A
829   D5C7 26 F2               BNE       RAMP6-3
830   D5C9 DE 01               LDX       IRQCR
831   D5CB 6E 00               JMP       0,X
832                   *
833                   *
834
835                   *
836   D5CD D6 39   FIXCV      LDA B     DVSAM
837   D5CF D1 22               CMP B     SETING
838   D5D1 22 1A               BHI       DECRV
839   D5D3 26 03               BNE       INCRV
840   D5D5 7E 0656             JMP       IRQOUT
841   D5D8 96 22   INCRV      LDA A     SETING
842   D5DA 10                  SBA
843   D5DB CE 6096             LDX       #TERRNM
844   D5DE D6 3B               LDA B     DVSAM+2
845   D5E0 54                  LSR B
846   D5E1 24 03               BCC       *+5
847   D5E3 CE 6000             LDX       #TERRM
848   D5E6 8D 4F               BSR       TBLOOK
849   D5E8 BD D2CD             JSR       INCR
850   D5EB 20 E8               BRA       INCRV-3
851   D5ED D0 22   DECRV      SUB B     SETING
852   D5EF 17                  TBA
853   D5F0 CE 6000             LDX       #TERRM
854   D5F3 D6 3B               LDA B     DVSAM+2
855   D5F5 54                  LSR B
856   D5F6 24 03               BCC       *+5
857   D5F8 CE 6096             LDX       #TERRNM
858   D5FB 8D 3A               BSR       TBLOOK
859   D5FD BD D289             JSR       DECR
860   D600 20 D3               BRA       INCRV-3
861                   *
862   D602 D6 41   FIXCA      LDA B     DISAM
863   D604 D1 22               CMP B     SETING
864   D606 22 1A               BHI       DECRA
```

```
865    D608 26 03                BNE         INCRA
866    D60A 7E D656              JMP         IRQOUT
867    D60D 96 22     INCRA      LDA  A      SETING
868    D60F 10                   SBA
869    D610 CE 6096              LDX         #TERRNM
870    D613 D6 43                LDA  B      DISAM+2
871    D615 54                   LSR  B
872    D616 24 03                BCC         *+5
873    D618 CE 6000              LDX         #TERRM
874    D61B 8D 1A                BSR         TBLOOK
875    D61D BD D2CD              JSR         INCR
876    D620 20 EB                BRA         INCRA-3
877    D622 D0 22     DECRA      SUB  B      SETING
878    D624 17                   TBA
879    D625 CE 6000              LDX         #TERRM
880    D628 D6 43                LDA  B      DISAM+2
881    D62A 54                   LSR  B
882    D62B 24 03                BCC         *+5
883    D62D CE 6096              LDX         #TERRNM
884    D630 8D 05                BSR         TBLOOK
885    D632 BD D2A9              JSR         DECR
886    D635 20 03                BRA         INCRA-3
887
888                       *
889    D637 81 4A     TBLOOK     CMP  A      #ETMAX-1
890    D639 23 02                BLS         *+4
891    D63B 86 4A                LDA  A      #ETMAX-1
892    D63D 16                   TAB
893    D63E DF 04                STX         ERRORT
894    D640 9B 05                ADD  A      ERRORT+1
895    D642 24 03                BCC         *+5
896    D644 7C 0004              INC         ERRORT
897    D647 1B                   ABA
898    D648 24 03                BCC         *+5
899    D64A 7C 0004              INC         ERRORT
900    D64D 97 05                STA  A      ERRORT+1
901    D64F DE 04                LDX         ERRORT
902    D651 EE 00                LDX         0,X
903    D653 DF 04                STX         ERRORT
904    D655 39                   RTS 905
906                       *
907    D656 96 11     IRQOUT     LDA  A      LFOSC+1
908    D658 D6 10                LDA  B      LFOSC
909    D65A 9B 16                ADD  A      FSHIFT+1
910    D65C D9 15                ADC  B      FSHIFT
911    D65E D7 17                STA  B      FSHIFT+2
912    D660 97 18                STA  A      FSHIFT+3
913    D662 DE 17                LDX         FSHIFT+2
914    D664 FF 2002              STX         TIMBF1
915    D667 7D 0014              TST         LFOSC+4
916    D66A 26 03                BNE         *+5
917    D66C 7E D739              JMP         NULRTI
918
919                       *
920                       *
921                       *
922    D66F 01                   NOP
923    D670 0E                   CLI
924    D671 96 13                LDA  A      LFOSC+3
925    D673 D6 12                LDA  B      LFOSC+2
926    D675 43                   COM  A
927    D676 53                   COM  B
928    D677 54                   LSR  B
```

```
929   067A 46                       ROR  A
930   0679 54                       LSR  B
931   067A 46                       ROR  A
932   067B 54                       LSR  B
933   067C 46                       ROR  A
934   067D 97 11                    STA  A   LFOSC+1
935   067F D7 10                    STA  B   LFOSC
936   0681 74 0010  DIVFRQ          LSR      LFOSC
937   0684 76 0011                  ROR      LFOSC+1
938   0687 74 0010                  LSR      LFOSC
939   068A 76 0011                  ROR      LFOSC+1
940   068D 9B 11                    ADD  A   LFOSC+1
941   068F D9 10                    ADC  B   LFOSC
942   0691 7A 0014                  DEC      LFOSC+4
943   0694 26 EB                    BNE      DIVFRQ
944   0696 97 11                    STA  A   LFOSC+1
945   0698 C1 03                    CMP  B   #3
946   069A 22 02                    BHI      *+4
947   069C C6 03                    LDA  B   #3
948   069E D7 10                    STA  B   LFOSC
949                    *
950                    *
951                    *
952                    *
953                    *
954
955                    *
956                    *
957                    *
958   06A0 7A 0025                  DEC      CLK2+1
959   06A3 26 14                    BNE      *+22
960   06A5 86 06                    LDA  A   #LINEF1
961   06A7 97 25                    STA  A   CLK2+1
962   06A9 7D 0024                  TST      CLK2
963   06AC 27 03                    BEQ      *+5
964   06AE 7A 0024                  DEC      CLK2
965   06B1 7D 0037                  TST      LEDCLK
966   06B4 27 03                    BEQ      *+5
967   06B6 7A 0037                  DEC      LEDCLK 968
969   06B9 7A 0027                  DEC      CLK1+1
970   06BC 26 32                    BNE      LOGSND-2
971   06BE 86 3C                    LDA  A   #LINEF
972   06C0 97 27                    STA  A   CLK1+1
973   06C2 7D 0026                  TST      CLK1
974   06C5 27 03                    BEQ      *+5
975   06C7 7A 0026                  DEC      CLK1
976   06CA 7D 0038                  TST      XFORMR
977   06CD 27 03                    BEQ      *+5
978   06CF 7A 0038                  DEC      XFORMR
979
980                    *
981                    *
982                    *
983   06D2 7D 63CE                  TST      LOGGER+1
984   06D5 27 62                    BEQ      NULRTI
985   06D7 7D 0020                  TST      ARCONF
986   06DA 27 42                    BEQ      LOGWAI
987   06DC 7D 63CF                  TST      LOGGER+2
988   06DF 27 11                    BEQ      LOGSND
989   06E1 CE 072F                  LDX      #LOGMSG
990   06E4 C6 0B                    LDA  B   #11
991   06E6 8D 3C                    BSR      LOGOUT
992   06E8 86 01                    LDA  A   #1
993   06EA B7 63CD                  STA  A   LOGGER
```

```
994     D6ED 7F 63CF              CLR     LOGGER+2
995     D6F0 20 47                BRA     NULRTI
996     D6F2 7A 63CD  LOGSND      DEC     LOGGER
997     D6F5 26 42                BNE     NULRTI
998     D6F7 B6 63CE              LDA A   LOGGER+1
999     D6FA B7 63CD              STA A   LOGGER
1000    D6FD CE 63C7              LDX     #LOGDAT
1001    D700 C6 02                LDA B   #2
1002    D702 8D 20                BSR     LOGOUT
1003    D704 86 2E                LDA A   #$2E
1004    D706 BD D294              JSR     OUTCH
1005    D709 5C                   INC B
1006    D70A 8D 18                BSR     LOGOUT
1007    D70C 86 20                LDA A   #$20
1008    D70E BD D294              JSR     OUTCH
1009    D711 C6 03                LDA B   #3
1010    D713 8D 0F                BSR     LOGOUT
1011    D715 C6 02                LDA B   #2
1012    D717 CE D72F              LDX     #LOGMSG
1013    D71A 8D 08                BSR     LOGOUT
1014    D71C 20 1B                BRA     NULRTI
1015    D71E 07       LOGWAI      TPA
1016    D71F B7 63CF              STA A   LOGGER+2
1017    D722 20 15                BRA     NULRTI
1018    D724 A6 00    LOGOUT      LDA A   0,X
1019    D726 08                   INX
1020    D727 BD D294              JSR     OUTCH
1021    D72A 5A                   DEC B
1022    D72B 26 F7                BNE     LOGOUT
1023    D72D 39                   RTS
1024    D72E          LOGMSG      FCB     $D,$A
1025    D730                      FCC     /NEW LOG/
1026    D737                      FCB     $D,$A
1027    D739 01       NULRTI      NOP
1028    D73A 3B                   RTI
1029                  *
1030                  *
1031                  *
1032                  *
1033                  *
1034
1035                  *
1036                  *
1037                  *
1038                  *
1039    D73B D6 2A    KEYLED      LDA B   HESTOP
1040    D73D D4 30                AND B   HISNSW
1041    D73F 26 1A                BNE     ESTOP
1042    D741 D6 29                LDA B   LESTOP
1043    D743 D4 31                AND B   LOSNSW
1044    D745 26 12                BNE     ESTOP
1045    D747 D6 2F                LDA B   KEYPAD
1046    D749 C4 F0                AND B   #$F0
1047    D74B 26 03                BNE     *+5
1048    D74D 7E 09D4              JMP     NOKEY
1049                  *
1050    D750 7D 002B              TST     RUNWAI
1051    D753 27 41                BEQ     NOTRUN
1052                  *
1053    D755 C5 80                BIT B   #$80
1054    D757 27 11                BEQ     NOSTOP
1055                  *
1056                  *
1057    D759 BD 0124  ESTOP       JSR     HLTALL
1058    D75C DE 64                LDX     RUNPC
```

```
1059  D75E BD D84F           JSR      DLNUM
1060  D761 D6 2F             LDA B    KEYPAD
1061  D763 C4 F0             AND B    #$F0
1062  D765 26 FA             BNE      *-4
1063  D767 7E D9D4           JMP      NOKEY
1064                   *
1065  D76A 7D 002C  NOSTOP   TST      SSTEP
1066  D76D 27 0A             BEQ      NOSTP0
1067  D76F C5 40             BIT B    #$40
1068  D771 27 06             BEQ      NOSTP0
1069  D773 86 3F             LDA A    #$3F
1070  D775 97 2C             STA A    SSTEP
1071  D777 20 E3             BRA      FSTOP+3
1072                   *
1073  D779 96 22  NOSTP0     LDA A    SETING
1074  D77B C5 10             BIT B    #$10
1075  D77D 27 06             BEQ      NOSTP1
1076  D77F 4D               TST A
1077  D780 27 11             BEQ      NOSTP3
1078  D782 4A               DEC A
1079  D783 20 09             BRA      NOSTP2
1080  D785 C5 20  NOSTP1     BIT B    #$20
1081  D787 27 0A             BEQ      NOSTP3
1082  D789 81 FF             CMP A    #$FF
1083  D78B 27 06             BEQ      NOSTP3
1084  D78D 4C               INC A
1085  D78E 97 22  NOSTP2     STA A    SETING
1086  D790 BD DA7A           JSR      DLYKEY
1087  D793 7E D9D8  NOSTP3   JMP      NOKEY+4
1088
1089                   *
1090                   *
1091  D796 C5 80  NOTRUN     BIT B    #$80
1092  D798 27 0D             BEQ      NOTSPS
1093                   *
1094  D79A BD D124           JSR      HLTALL
1095  D79D FE A014           LDX      STRTPC
1096  D7A0 8D 57             BSR      TD16B
1097  D7A2 FF A014           STX      STRTPC
1098  D7A5 20 10             BRA      KEYFTN
1099  D7A7 C5 40  NOTSPS     BIT B    #$40
1100  D7A9 27 0A             BEQ      NOTLN
1101                   *
1102  D7AB FE A016           LDX      LNUM
1103  D7AE 8D 49             BSR      TD16B
1104  D7B0 FF A016           STX      LNUM
1105  D7B3 20 02             BRA      KEYFTN
1106                   *
1107  D7B5 8D 10  NOTLN      BSR      TD8B
1108  D7B7 D6 2F  KEYFTN     LDA B    KEYPAD
1109  D7B9 C4 F0             AND B    #$F0
1110  D7BB 26 D9             BNE      NOTRUN
1111  D7BD BD DA41           JSR      PUTCRC
1112  D7C0 86 FF             LDA A    #$FF
1113  D7C2 97 38             STA A    XFORMR
1114  D7C4 7E D9D4           JMP      NOKEY
1115                   *
1116                   *
1117                   *
1118  D7C7 86 21  TD8B       LDA A    #$33
1119  D7C9 97 52             STA A    KEYSPD
1120  D7CB FE A016           LDX      LNUM
1121  D7CE A6 00             LDA A    0,X
1122  D7D0 D6 2F             LDA B    KEYPAD
1123  D7D2 C5 10             BIT B    #$10
```

```
1124  D7D4 27 06              BEQ    IDAB1
1125  D7D6 4D                 TST  A
1126  D7D7 27 0C              BEQ    IDAB2
1127  D7D9 4A                 DEC  A
1128  D7DA 20 09              BRA    IDAB2
1129  D7DC C5 20     IDAB1    BIT  B #$20
1130  D7DE 27 0F              BEQ    IDAB3
1131  D7E0 81 FF              CMP  A #$FF
1132  D7E2 27 01              BEQ    IDAB2
1133  D7E4 4C                 INC  A
1134  D7E5 A7 00     IDAB2    STA  A 0,X
1135  D7E7 8D 2D              BSR    IDAB4
1136  D7E9 BD D87A             JSR    DLYKEY
1137  D7EC 20 DD              BRA    IDAB+4
1138  D7EE C4 F0     IDAB3    AND  B #$F0
1139  D7F0 27 24              BEQ    IDAB4
1140  D7F2 8D 02              BSR    IDAB4
1141  D7F4 20 D1              BRA    IDAB
1142  D7F6 7E DADC   IDAB4    JMP    GEDSP
1143
1144                   *
1145                   *
1146                   *
1147  D7F9 86 21     ID16B    LDA  A #$33
1148  D7FB 97 52              STA  A KEYSPD
1149  D7FD D6 2F              LDA  B KEYPAD
1150  D7FF C5 10              BIT  B #$10
1151  D801 27 03              BEQ    ID16B1
1152  D803 09                 DEX
1153  D804 20 05              BRA    ID16B2
1154  D806 C5 20     ID16B1   BIT  B #$20
1155  D808 27 0B              BEQ    ID16B3
1156  D80A 08                 INX
1157  D80B 8D 19     ID16B2   BSR    ID16B4
1158  D80D 8D 40              BSR    DLNUM
1159  D80F 8D 67              BSR    DLYKEY
1160  D811 DE 53              LDX    PARMPX
1161  D813 20 EA              BRA    ID16B+4
1162  D815 8D 0F     ID16B3   BSR    ID16B4
1163  D817 C4 F0              AND  B #$F0
1164  D819 27 34              BEQ    DLNUM
1165  D81B C1 C0              CMP  B #$C0
1166  D81D 26 03              BNE    *+5
1167  D81F 7E D894             JMP    RUNPGM
1168  D822 8D 2B              BSR    DLNUM
1169  D824 20 D3              BRA    ID16B
1170                   *
1171                   *
1172                   *
1173  D826 DF 06     ID16B4   STX    TEMP
1174                   *
1175  D828 CE A01B             LDX    #PGMRAM
1176  D82B DF 53              STX    PARMPX
1177  D82D 96 07              LDA  A TEMP+1
1178  D82F 90 54              SUB  A PARMPX+1
1179  D831 96 06              LDA  A TEMP
1180  D833 92 53              SBC  A PARMPX
1181  D835 2A 03              BPL    *+5
1182  D837 DE 53              LDX    PARMPX
1183  D839 39                 RTS
1184                   *
1185  D83A CE A3FF             LDX    #$A3FF
1186  D83D DF 53              STX    PARMPX
1187  D83F 96 54              LDA  A PARMPX+1
1188  D841 90 07              SUB  A TEMP+1
```

```
1189   D843 96 53              LDA  A   PARMPX
1190   D845 92 06              SBC  A   TEMP
1191   D847 2A 03              BPL      *+5
1192   D849 DE 53              LDX      PARMPX
1193   D84B 39                 RTS
1194   D84C DE 06              LDX      TEMP
1195   D84E 39                 RTS
1196
1197                    *
1198                    *
1199                    *
1200   D84F DF 53     DLNUM    STX      PARMPX
1201   D851 CE A01A            LDX      #PGMRAM
1202   D854 DF 06              STX      TEMP
1203   D856 96 54              LDA  A   PARMPX+1
1204   D858 90 07              SUB  A   TEMP+1
1205   D85A D6 53              LDA  B   PARMPX
1206   D85C D2 06              SBC  B   TEMP
1207   D85E CE 0000   DLNUM1   LDX      #0
1208   D861 DF 4F              STX      HUNS
1209   D863 5D                 TST  B
1210   D864 27 09              BEQ      *+11
1211   D866 80 64              SUB  A   #100
1212   D868 C2 00              SBC  B   #0
1213   D86A 7C 004F            INC      HUNS
1214   D86D 20 F4              BRA      *-10
1215   D86F BD D221            JSR      CODET+5
1216   D872 BD D187            JSR      WRTLED-1
1217   D875 DE 53              LDX      PARMPX
1218   D877 39                 RTS
1219                    *
1220                    *
1221                    *
1222   D878 D6 52     DLYKEY   LDA  B   KEYSPD
1223   D87A 5A                 DEC  B
1224   D87B 27 0E              BEQ      WAIT00
1225   D87D D7 52              STA  B   KEYSPD
1226   D87F CE 52FF            LDX      #$52FF
1227   D882 C1 1A              CMP  B   #26
1228   D884 22 08              BHI      WAIT00+3
1229   D886 CE 16FF            LDX      #$16FF
1230   D889 20 03              BRA      WAIT00+3
1231   D88B CE 04FF   WAIT00   LDX      #$04FF
1232   D88E 09                 DEX
1233   D88F 08                 INX
1234   D890 09                 DEX
1235   D891 26 FB              BNE      *-3
1236   D893 39                 RTS
1237
1238                    *
1239   D894 BD D0CD   RUNPGM   JSR      DASH
1240   D897 B6 A015            LDA  A   STRTPC+1
1241   D89A 84 FE              AND  A   #$FE
1242   D89C B7 A015            STA  A   STRTPC+1
1243   D89F 7F 004F            CLR      HUNS
1244   D8A2 D6 2F     KEYOR    LDA  B   KEYPAD
1245   D8A4 C4 F0              AND  B   #$F0
1246   D8A6 27 06              BEQ      *+8
1247   D8A8 DA 4F              ORA  B   HUNS
1248   D8AA D7 4F              STA  B   HUNS
1249   D8AC 20 F4              BRA      KEYOR
1250   D8AE D6 4F              LDA  B   HUNS
1251   D8B0 C1 D0              CMP  B   #$D0
1252   D8B2 27 12              BEQ      DNLDRM
1253   D8B4 C1 E0              CMP  B   #$E0
1254   D8B6 27 45              BEQ      PUNCHT
```

```
1255  D8B8 C1 F0              CMP  B  #$F0
1256  D8BA 27 33              BEQ     DNLDEN
1257                    *
1258                    *
1259  D8BC FE A014  RUNGO     LDX     STRTPC
1260  D8BF DF 64              STX     RUNPC
1261  D8C1 07                 TPA
1262  D8C2 97 2B              STA  A  RUNWAI
1263  D8C4 20 29              BRA     DNLDEN
1264                    *
1265                    *
1266  D8C6 FE DE97  DNLDRM    LDX     CANPGM-4
1267  D8C9 FF A016            STX     LNUM
1268  D8CC FE DE99            LDX     CANPGM-2
1269  D8CF FF A014            STX     STRTPC
1270  D8D2 FE DE9B            LDX     CANPGM
1271  D8D5 DF 06              STX     TEMP
1272  D8D7 CE DE9F            LDX     #CANPGM+4
1273  D8DA BC DE9D  DNLDIP    CPX     CANPGM+2
1274  D8DD 27 10              BEQ     DNLDEN
1275  D8DF A6 00              LDA  A  0,X
1276  D8E1 08                 INX
1277  D8E2 DF 53              STX     PARMPX
1278  D8E4 DE 06              LDX     TEMP
1279  D8E6 A7 00              STA  A  0,X
1280  D8E8 08                 INX
1281  D8E9 DF 06              STX     TEMP
1282  D8EB DE 53              LDX     PARMPX
1283  D8ED 20 EB              BRA     DNLDIP
1284  D8EF D6 2F    DNLDEN    LDA  B  KEYPAD
1285  D8F1 C4 F0              AND  B  #$F0
1286  D8F3 26 FA              BNE     DNLDEN
1287  D8F5 BD DA41            JSR     PUTCRC
1288  D8F8 31                 INS
1289  D8F9 31                 INS
1290  D8FA 7E D9D4            JMP     NOKEY
1291
1292                    *
1293                    *
1294                    *
1295  D8FD B6 A017  PUNCHT    LDA  A  LNUM+1
1296  D900 B0 A015            SUB  A  STRTPC+1
1297  D903 B6 A016            LDA  A  LNUM
1298  D906 B2 A014            SBC  A  STRTPC
1299  D909 25 E4              BCS     DNLDEN
1300  D90B FE A016            LDX     LNUM
1301  D90E DF 64              STX     RUNPC
1302  D910 BD DA56            JSR     UPDATE-6
1303  D913 FE A014            LDX     STRTPC
1304  D916 FF A016            STX     LNUM
1305                    *
1306  D919 BD D9CA            JSR     LEADER
1307  D91C C6 07    PUNLP     LDA  B  #7
1308  D91E CE DAAB            LDX     #EOLDAT
1309  D921 BD D724            JSR     LOGOUT
1310  D924 FE A016            LDX     LNUM
1311  D927 08                 INX
1312  D928 BD DA5C            JSR     UPDATE
1313  D92B BD DA5C            JSR     UPDATE
1314  D92E FE A016            LDX     LNUM
1315  D931 BD D84F            JSR     DLNUM
1316  D934 8D 76              BSR     PUNIT
1317  D936 BD D282            JSR     WAIXMB
1318  D939 BD DADC            JSR     GFDSP
1319  D93C 96 4F              LDA  A  HUNS
```

```
1320  D93E 88 08            ADD  A  #8
1321  D940 CE DA88          LDX     #NUM0
1322  D943 BD D1C3          JSR     ADDAX
1323  D946 A6 00            LDA  A  0,X
1324  D948 BD D294          JSR     OUTCH
1325  D94B 5F               CLR  B
1326  D94C 8D 64            BSR     PUNIT0
1327  D94E FE A016          LDX     LNUM
1328  D951 08               INX
1329  D952 FF A016          STX     LNUM
1330  D955 BD DADC          JSR     GFDSP
1331  D958 8D 52            BSR     PUNIT
1332  D95A FE A016          LDX     LNUM
1333  D95D 9C 64            CPX     RUNPC
1334  D95F 27 10            BEQ     PUN99
1335  D961 09               DEX
1336  D962 9C 64            CPX     RUNPC
1337  D964 27 08            BEQ     PUN99
1338  D966 08               INX
1339  D967 08               INX
1340  D968 FF A016          STX     LNUM
1341  D96B 96 2F            LDA  A  KEYPAD
1342  D96D 84 80            AND  A  #$80
1343  D96F 27 AB            BEQ     PUNLP
1344
1345                    *
1346  D971 C6 06    PUN99   LDA  B  #6
1347  D973 CE DAA8          LDX     #EOLDAT
1348  D976 BD D724          JSR     LOGOUT
1349  D979 8D 4F            BSR     LEADER
1350  D97B BD D2B2          JSR     WAIXMB
1351  D97E CE DAAF          LDX     #CKSMSG
1352  D981 C6 06            LDA  B  #6
1353  D983 BD D724          JSR     LOGOUT
1354  D986 7F 0033          CLR     OPMASK
1355  D989 96 55            LDA  A  CRCREG
1356  D98B BD D21C          JSR     CODEI
1357  D98E 8D 1C            BSR     PUNIT
1358  D990 96 56            LDA  A  CRCREG+1
1359  D992 BD D21C          JSR     CODEI
1360  D995 8D 15            BSR     PUNIT
1361  D997 C6 06            LDA  B  #6
1362  D999 CE DAA8          LDX     #EOLDAT
1363  D99C BD D724          JSR     LOGOUT
1364  D99F BD D2B2          JSR     WAIXMB
1365  D9A2 8D 26            BSR     LEADER
1366  D9A4 DE 64            LDX     RUNPC
1367  D9A6 FF A016          STX     LNUM
1368  D9A9 7E D8EF          JMP     DNLDEN
1369                    *
1370  D9AC D6 33    PUNIT   LDA  B  DPMASK
1371  D9AE 96 4F            LDA  A  HUNS
1372  D9B0 8D 0D            BSR     PUNIT1
1373  D9B2 96 50    PUNIT0  LDA  A  TENS
1374  D9B4 8D 09            BSR     PUNIT1
1375  D9B6 96 51            LDA  A  ONES
1376  D9B8 8D 05            BSR     PUNIT1
1377  D9BA 86 20            LDA  A  #$20
1378  D9BC 7E D294          JMP     OUTCH
1379  D9BF 8B 30    PUNIT1  ADD  A  #$30
1380  D9C1 BD D294          JSR     OUTCH
1381  D9C4 86 2E            LDA  A  #'.
1382  D9C6 58               ASL  B
1383  D9C7 25 F8            BCS     PUNIT1+2
1384  D9C9 39               RTS
```

```
1385
1386   D9CA C6 32      LEADER    LDA B    #50
1387   D9CC 4F                   CLR A
1388   D9CD BD D294              JSR      OUTCH
1389   D9D0 5A                   DEC B
1390   D9D1 26 F9                BNE      *-5
1391   D9D3 39                   RTS
1392
1393   D9D4 86 21      NOKEY     LDA A    #33
1394   D9D6 97 52                STA A    KEYSPD
1395   D9D8 7D 0029              TST      RUNWAT
1396   D9DB 26 1F                BNE      DOLEDS
1397   D9DD 7D 002D              TST      ARCONF
1398   D9E0 26 1A                BNE      DOLEDS
1399   D9E2 96 3A                LDA A    XFORMR
1400   D9E4 81 FA                CMP A    #250
1401   D9E6 23 03                BLS      *+5
1402   D9E8 7E DADC              JMP      GEDSP
1403   D9EB 4D                   TST A
1404   D9EC 27 03                BEQ      *+5
1405   D9EE 7E D0D2              JMP      SMILE
1406                   *
1407   D9F1 BD D00E              JSR      SLEEP
1408   D9F4 86 34                LDA A    #$34
1409   D9F6 B7 4001              STA A    PIA+1
1410   D9F9 7E D886              JMP      WATTRO-5

1411
1412   D9FC 86 FA      DOLEDS    LDA A    #250
1413   D9FE 97 3A                STA A    XFORMR
1414   DA00 7D 002D              TST      ARCONF
1415   DA03 27 21                BEQ      LEDFIN+1
1416   DA05 96 37                LDA A    LEDCLK
1417   DA07 2B 1C                BMI      LEDFIN
1418   DA09 27 06                BEQ      LEDVOL
1419   DA0B 81 28                CMP A    #40
1420   DA0D 22 0D                BHI      LEDAMP
1421   DA0F 20 14                BRA      LEDFIN
1422   DA11 96 40      LEDVOL    LDA A    DVSAM+7
1423   DA13 BD D1D5              JSR      WVOLTS
1424   DA16 86 84                LDA A    #127+5
1425   DA18 97 37                STA A    LEDCLK
1426   DA1A 20 09                BRA      LEDFIN
1427   DA1C 96 48      LEDAMP    LDA A    DISAM+7
1428   DA1E BD D1FD              JSR      WAMPS
1429   DA21 86 05                LDA A    #5
1430   DA23 97 37                STA A    LEDCLK
1431   DA25 39         LEDFIN    RTS
1432   DA26 7E D9CD              JMP      DASH
1433
1434                   *
1435   DA29 CE A3FF    TSTCRC    LDX      #PGMRAM+BRAML-1
1436   DA2C 8D 28                BSR      UPDATE-6
1437   DA2E 8D 2C                BSR      UPDATE
1438   DA30 8C A010              CPX      #CRCWRD-1
1439   DA33 26 F9                BNE      *-5
1440   DA35 DE 55                LDX      CRCREG
1441   DA37 26 02                BNE      *+4
1442   DA39 0C                   CLC
1443   DA3A 39                   RTS
1444   DA3B 07                   TPA
1445   DA3C B7 A010              STA A    STALE
1446   DA3F 0D                   SEC
1447   DA40 39                   RTS

1448
```

```
1449
1450   DA41 CE A3FF  PUTCRC   LDX      #PGMRAM+BRAML-1
1451   DA44 8D 10             BSR      UPDATE-6
1452   DA46 8D 14             BSR      UPDATE
1453   DA48 8C A012            CPX      #CRCWRD+1
1454   DA4B 26 F9              BNE      *-5
1455   DA4D DE 55              LDX      CRCREG
1456   DA4F FF A011            STX      CRCWRD
1457   DA52 7F A010            CLR      STALE
1458   DA55 39                 RTS 1459
1460                  *
1461   DA56 86 AA              LDA A    #$AA
1462   DA58 97 55              STA A    CRCREG
1463   DA5A 97 56              STA A    CRCREG+1
1464   DA5C 86 08    UPDATE    LDA A    #8
1465   DA5E 97 57              STA A    CRCREG+2
1466   DA60 E6 00              LDA B    0,X
1467   DA62 4F      KRANKN     CLR A
1468   DA63 54                 LSR B
1469   DA64 49                 ROL A
1470   DA65 98 56              EOR A    CRCREG+1
1471   DA67 97 56              STA A    CRCREG+1
1472   DA69 84 01              AND A    #1
1473   DA6B 27 08              BEQ      ROTAC
1474   DA6D 86 02              LDA A    #2
1475   DA6F 98 56              EOR A    CRCREG+1
1476   DA71 97 56              STA A    CRCREG+1
1477   DA73 86 40              LDA A    #$40
1478   DA75 98 55    ROTAC     EOR A    CRCREG
1479   DA77 44                 LSR A
1480   DA78 76 0056            ROR      CRCREG+1
1481   DA7B 24 02              BCC      *+4
1482   DA7D 8A 80              ORA A    #$80
1483   DA7F 97 55              STA A    CRCREG
1484   DA81 7A 0057            DEC      CRCREG+2
1485   DA84 26 DC              BNE      KRANKN
1486   DA86 09                 DEX
1487   DA87 39                 RTS
1488
1489                  *
1490                  *
1491                  *
1492   DA88         NUM0       FCB      $FC
1493   DA89                    FCB      $90
1494   DA8A                    FCB      $7A
1495   DA8B                    FCB      $DA
1496   DA8C                    FCB      $96
1497   DA8D                    FCB      $CE
1498   DA8E                    FCB      $EE
1499   DA8F                    FCB      $98
1500   DA90                    FCB      $FE
1501   DA91                    FCB      $9E
1502   DA92                    FCB      $BE
1503   DA93                    FCB      $E6
1504   DA94                    FCB      $6C
1505   DA95                    FCB      $F2
1506   DA96                    FCB      $6E
1507   DA97                    FCB      $2E
1508                  *
1509   DA98                    FCB      $BE
1510   DA99                    FCB      $6C
1511   DA9A                    FCB      $2E
1512   DA9B                    FCB      $86
```

```
1513  DA9C                          FCB    $64
1514  DA9D                          FCB    $3E
1515  DA9E                          FCB    $F4
1516  DA9F                          FCB    $D6
1517  DAA0                          FCC    /ACFHLPUY/
1518  DAA8          FOLDAT          FCB    $D,0,0,$A,0,0,*N
1519  DAAF          CKSMSG          FCC    /CKSM= /
1520
1521                 *
1522  DAB5  36      STCLK1          PSH  A
1523  DAB6  86 3C                   LDA  A  #LINEF
1524  DAB8  97 27                   STA  A  CLK1+1
1525  DABA  32                      PUL  A
1526  DABB  97 26                   STA  A  CLK1
1527  DABD  7F 0024                 CLR     CLK2
1528  DAC0  39                      RTS 1529
1530                 *
1531  DAC1  36      STCLK2          PSH  A
1532  DAC2  86 06                   LDA  A  #LINEF1
1533  DAC4  97 25                   STA  A  CLK2+1
1534  DAC6  32                      PUL  A
1535  DAC7  97 24                   STA  A  CLK2
1536  DAC9  7F 0026                 CLR     CLK1
1537  DACC  39                      RTS 1538
1539                 *
1540  DACD  C1 0A   TIMEY           CMP  B  #10
1541  DACF  23 03                   BLS     *+5
1542  DAD1  5F                      CLR  B  1.
1543  DAD2  20 02                   BRA     *+4
1544  DAD4  C6 40                   LDA  B  #$40
1545  DAD6  BD D21C                 JSR     CODEI
1546  DAD9  7E D18A                 JMP     WRTLED
1547
1548                 *
1549                 *
1550  DADC  FE A016  GEDSP          LDX     LNUM
1551  DADF  DF 4F                   STX     HUNS
1552  DAE1  77 0050                 ASR     HUNS+1
1553  DAE4  25 31                   BCS     OPREMT
1554  DAE6  A6 00                   LDA  A  0,X
1555  DAE8  44                      LSR  A
1556  DAE9  44                      LSR  A
1557  DAEA  44                      LSR  A
1558  DAEB  44                      LSR  A
1559  DAEC  44                      LSR  A
1560  DAED  8B 10                   ADD  A  #16
1561  DAEF  97 4F                   STA  A  HUNS
1562  DAF1  A6 00                   LDA  A  0,X
1563  DAF3  84 1F                   AND  A  #$1F
1564  DAF5  7F 0050                 CLR     TENS
1565  DAF8  BD 022C                 JSR     CODE2D
1566  DAFB  5F                      CLR  B
1567  DAFC  96 4F                   LDA  A  HUNS
1568  DAFE  BD D1BA                 JSR     GDIGIT
1569  DB01  97 36                   STA  A  LHLED
1570  DB03  96 50                   LDA  A  TENS
1571  DB05  BD D1BA                 JSR     GDIGIT
1572  DB08  81 FC                   CMP  A  #$FC
1573  DB0A  26 01                   BNE     *+3
1574  DB0C  4F                      CLR  A
1575  DB0D  97 35                   STA  A  MIDLED
1576  DB0F  96 51                   LDA  A  ONES
```

```
1577  DB11 BD D1BB           JSR     GDIGIT
1578  DB14 97 34             STA A   RHLED
1579  DB16 39                RTS
1580  DB17 A6 00   OPRFMT    LDA A   0,X
1581  DB19 36                PSH A
1582  DB1A 09                DEX
1583  DB1B A6 00             LDA A   0,X
1584  DB1D 16                TAB
1585  DB1E C4 1F             AND B   #$1F
1586  DB20 44                LSR A
1587  DB21 44                LSR A
1588  DB22 44                LSR A
1589  DB23 44                LSR A
1590  DB24 44                LSR A
1591  DB25 48                ASL A
1592  DB26 CE DB31           LDX     #DSPVCT
1593  DB29 BD D1C3           JSR     ADDAX
1594  DB2C EE 00             LDX     0,X
1595  DB2E 32                PUL A
1596  DB2F 6E 00             JMP     0,X
1597
1598  DB31         DSPVCT    FDB     DAMPS
1599  DB33                   FDB     CMDOPR
1600  DB35                   FDB     DSPDN
1601  DB37                   FDB     DSPDN
1602  DB39                   FDB     TIMEX
1603  DB3B                   FDB     DSPDN
1604  DB3D                   FDB     WVOLTS
1605  DB3F                   FDB     DSPDN 1606
1607  DB41 C1 0F   CMDOPR    CMP B   #15
1608  DB43 22 06             BHI     *+8
1609                  *
1610  DB45 5F                CLR B
1611  DB46 48                ASL A
1612  DB47 59                ROL B
1613  DB48 7E DB5F           JMP     DLNUM1
1614                  *
1615  DB4B 5F                CLR B
1616  DB4C 48                ASL A
1617  DB4D 59                ROL B
1618  DB4E 8B E8             ADD A   #$E8
1619  DB50 C9 01             ADC B   #1
1620  DB52 7E DB5F           JMP     DLNUM1
1621
1622                  *
1623                  *
1624                  *
1625                  *
1626                  *
1627                  *
1628  DB55 CE 0110 CALCVT    LDX     #$0110
1629  DB58 DF 6A             STX     MFACT
1630  DB5A CE 0001           LDX     #$0001
1631  DB5D DF 6C             STX     MOFF
1632  DB5F CE 010A           LDX     #$010A
1633  DB62 DF 6E             STX     NMFACT
1634  DB64 CE 0004           LDX     #$0004
1635  DB67 DF 70             STX     NMOFF
1636                  *
1637                  *
1638                  *
1639                  *
```

```
1640    DB69 96 6A              LDA A   MFACT
1641    DB6B DE 6C              LDX     MOFF
1642    DB6D FF 6000            STX     TERRM
1643    DB70 CE 6000            LDX     #TERRM
1644    DB73 D6 68      CALOP6  LDA B   MRATE
1645    DB75 36                 PSH A
1646    DB76 AB 01              ADD A   1,X
1647    DB78 A7 03              STA A   3,X
1648    DB7A A6 00              LDA A   0,X
1649    DB7C 24 01              BCC     *+3
1650    DB7E 4C                 INC A
1651    DB7F A7 02              STA A   2,X
1652    DB81 08                 INX
1653    DB82 08                 INX
1654    DB83 8C 6096            CPX     #TERRM+ETSIZE
1655    DB86 27 07              BEQ     CALOP7
1656    DB88 32                 PUL A
1657    DB89 5A                 DEC B
1658    DB8A 26 E9              BNE     CALOP6+2
1659    DB8C 4C                 INC A
1660    DB8D 20 E4              BRA     CALOP6
1661
1662                    *
1663                    *
1664                    *
1665                    *
1666    DB8F 32         CALOP7  PUL A
1667    DB90 96 6E              LDA A   NMFACT
1668    DB92 DE 70              LDX     NMOFF
1669    DB94 FF 6096            STX     TERRNM
1670    DB97 CE 6096            LDX     #TERRNM
1671    DB9A D6 6F      CALOP8  LDA B   NMRATE
1672    DB9C 36                 PSH A
1673    DB9D AB 01              ADD A   1,X
1674    DB9F A7 03              STA A   3,X
1675    DBA1 A6 00              LDA A   0,X
1676    DBA3 24 01              BCC     *+3
1677    DBA5 4C                 INC A
1678    DBA6 A7 02              STA A   2,X
1679    DBA8 08                 INX
1680    DBA9 08                 INX
1681    DBAA 8C 612C            CPX     #TERRNM+ETSIZE
1682    DBAD 27 07              BEQ     CALOP9
1683    DBAF 32                 PUL A
1684    DBB0 5A                 DEC B
1685    DBB1 26 E9              BNE     CALOP8+2
1686    DBB3 4C                 INC A
1687    DBB4 20 E4              BRA     CALOP8
1688    DBB6 32         CALOP9  PUL A
1689    DBB7 39                 RTS
1690
1691                    *
1692                    *
1693                    *
1694                    *
1695                    *
1696                    *
1697    DBB8 CE 0F00    CALCAT  LDX     #$0F00
1698    DBBB DF 6A              STX     MFACT
1699    DBBD CE 0001            LDX     #$0001
1700    DBC0 DF 6C              STX     MOFF
1701    DBC2 CE 0600            LDX     #$0600
1702    DBC5 DF 6E              STX     NMFACT
1703    DBC7 CE 0001            LDX     #$0001
1704    DBCA DF 70              STX     NMOFF
```

```
1705
1706                    *
1707                    *
1708                    *
1709    DBCC 96 6A              LDA  A   MFACT
1710    DBCE CE 6000            LDX      #TERRM
1711    DBD1 D6 6D              LDA  B   MOFF+1
1712    DBD3 36         CALOP1  PSH  A
1713    DBD4 6F 00              CLR      0,X
1714    DBD6 E7 01              STA  B   1,X
1715    DBD8 08                 INX
1716    DBD9 08                 INX
1717    DBDA BC 6096            CPX      #TERRM+ETSIZE
1718    DBDD 27 09              BEQ      CALOP3
1719    DBDF 4A                 DEC  A
1720    DBE0 26 F2              BNE      CALOP1+1
1721    DBE2 32                 PUL  A
1722    DBE3 90 6B              SUB  A   MRATE
1723    DBE5 5C                 INC  B
1724    DBE6 20 EB              BRA      CALOP1
1725
1726                    *
1727                    *
1728                    *
1729                    *
1730    DBE8 32         CALOP3  PUL  A
1731    DBE9 96 6F              LDA  A   NMFACT
1732    DBEB CE 6096            LDX      #TERRNM
1733    DBEE D6 71              LDA  B   NMOFF+1
1734    DBF0 36         CALOP2  PSH  A
1735    DBF1 6F 00              CLR      0,X
1736    DBF3 E7 01              STA  B   1,X
1737    DBF5 08                 INX
1738    DBF6 08                 INX
1739    DBF7 BC 612C            CPX      #TERRNM+ETSIZE
1740    DBFA 27 09              BEQ      CALOP4
1741    DBFC 4A                 DEC  A
1742    DBFD 26 F2              BNE      CALOP2+1
1743    DBFF 32                 PUL  A
1744    DC00 90 6F              SUB  A   NMRATE
1745    DC02 5C                 INC  B
1746    DC03 20 EB              BRA      CALOP2
1747    DC05 32         CALOP4  PUL  A
1748    DC06 39                 RTS
1749
1750                    *
1751                    *
1752                    *
1753                    *
1754    DC07 7D 0066   LINEIN   TST      ITYPE
1755    DC0A 26 05              BNE      *+7
1756    DC0C 7D 005F            TST      CRRCNT
1757    DC0F 26 09              BNE      *+11
1758    DC11 7D A010            TST      STALE
1759    DC14 27 03              BEQ      *+5
1760    DC16 7E DA41            JMP      PUTCRC
1761    DC19 39                 RTS
1762    DC1A BD D26E            JSR      INCH
1763    DC1D 84 7F              AND  A   #$7F
1764    DC1F 81 58              CMP  A   #'X
1765    DC21 27 12              BEQ      PASS
1766    DC23 81 4E              CMP  A   #'N
1767    DC25 27 0E              BEQ      PASS
1768    DC27 81 57              CMP  A   #'W
1769    DC29 26 03              BNE      *+5
1770    DC2B 7E FC00            JMP      SFC00
```

```
1771  DC2E A1 54           CMP A   #'T
1772  DC30 26 05           BNE     LINEIN
1773  DC32 7E FC4E         JMP     SFC4E
1774  DC35 97 66    PASS   STA A   ITYPE
1775  DC37 81 58           CMP A   #'X
1776  DC39 27 05           BEQ     *+7
1777  DC3B BD DD44         JSR     RDN3
1778  DC3E 97 67           STA A   ILNUM
1779  DC40 BD DCC6         JSR     ICHAR
1780  DC43 25 24           BCS     ABDCMD
1781  DC45 36              PSH A
1782  DC46 7F 0055         CLR     CRCREG
1783  DC49 BD DD29         JSR     RDN2
1784  DC4C 84 1F           AND A   #$1F
1785  DC4E 33              PUL B
1786  DC4F CE DCFA         LDX     #OKCHAR+10
1787  DC52 E1 00           CMP B   0,X
1788  DC54 27 0A           BEQ     *+10
1789  DC56 08              INX
1790  DC57 8B 20           ADD A   #$20
1791  DC59 7C 0055         INC     CRCREG
1792  DC5C 20 F4           BRA     *-10
1793  DC5E 97 68           STA A   ICMD
1794  DC60 96 55           LDA A   CRCREG
1795  DC62 48              ASL A
1796  DC63 CE DCA2         LDX     #INVECT
1797  DC66 BD D1C3         JSR     ADDAX
1798  DC69 EE 00           LDX     0,X
1799  DC6B AD 00           JSR     0,X
1800  DC6D 20 0C           BRA     OPROK
1801
1802  DC6F 7F 0066 ABDCMD  CLR     ITYPE
1803  DC72 81 0D           CMP A   #$D
1804  DC74 27 91           BEQ     LINEIN
1805  DC76 BD D26F         JSR     INCH
1806  DC79 20 F4           BRA     ABDCMD
1807  DC7B 97 69    OPROK  STA A   IOPR
1808  DC7D 96 66           LDA A   ITYPE
1809  DC7F 81 4E           CMP A   #'N
1810  DC81 26 84           BNE     LINEIN
1811  DC83 7F 0066         CLR     ITYPE
1812  DC86 CE A01B         LDX     #PGMRAM
1813  DC89 96 67           LDA A   ILNUM
1814  DC8B 16              TAB
1815  DC8C BD D1C3         JSR     ADDAX
1816  DC8F 17              TBA
1817  DC90 BD D1C3         JSR     ADDAX
1818  DC93 96 68           LDA A   ICMD
1819  DC95 A7 00           STA A   0,X
1820  DC97 96 69           LDA A   IOPR
1821  DC99 A7 01           STA A   1,X
1822  DC9B 07              TPA
1823  DC9C B7 A010         STA A   STALE
1824  DC9F 7E DC07         JMP     LINEIN 1825
1826  DCA2         INVECT  FDB     RDNAMP
1827  DCA4                 FDB     RDLNUM
1828  DCA6                 FDB     RDN2
1829  DCA8                 FDB     RDN2
1830  DCAA                 FDB     RDN2
1831  DCAC                 FDB     RDN2
1832  DCAE                 FDB     RDN3
1833  DCB0                 FDB     RDN2
```

```
1834
1835                         *
1836                         *
1837                         *
1838   DCB2 8D 20    INUM     BSR    SKIPSP
1839   DCB4 20 02             BRA    TNUM1+2
1840   DCB6 8D 23    TNUM1    BSR    INSKIP
1841   DCB8 81 39             CMP A  #'9
1842   DCBA 23 02             BLS    *+4
1843   DCBC 0D                SEC
1844   DCBD 39                RTS
1845   DCBE 81 2F             CMP A  #$2F
1846   DCC0 23 FA             BLS    *-4
1847   DCC2 84 0F             AND A  #$F
1848   DCC4 0C                CLC
1849   DCC5 39                RTS
1850                         *
1851                         *
1852                         *
1853   DCC6 8D 0C    ICHAR    BSR    SKIPSP
1854   DCC8 20 02             BRA    ICHAR1+2
1855   DCCA 8D 0F    ICHAR1   BSR    INSKIP
1856   DCCC 81 39             CMP A  #'9
1857   DCCE 23 02             BLS    *+4
1858   DCD0 0C                CLC
1859   DCD1 39                RTS
1860   DCD2 0D                SEC
1861   DCD3 39                RTS
1862                         *
1863                         *
1864                         *
1865                         *
1866   DCD4 8D 05    SKIPSP   BSR    INSKIP
1867   DCD6 81 20             CMP A  #$20
1868   DCD8 27 FA             BEQ    SKIPSP
1869   DCDA 39                RTS
1870   DCDB BD D26E  INSKIP   JSR    INCH
1871   DCDE 84 7F             AND A  #$7F
1872   DCE0 CE DCF0           LDX    #OKCHAR
1873   DCE3 A1 00             CMP A  0,X
1874   DCE5 26 01             BNE    *+3
1875   DCE7 39                RTS
1876   DCE8 08                INX
1877   DCE9 8C DD04           CPX    #OKCHAR+20
1878   DCEC 26 F5             BNE    *-9
1879   DCEE 20 EB             BRA    INSKIP
1880   DCF0          OKCHAR   FCC    /0123456789ACFHLPUY/
1881   DD02                   FCB    $20,$D
1882                         *
1883   DD04 D6 50    MPYTEN   LDA B  TENS
1884   DD06 D7 4F             STA B  HUNS
1885   DD08 D6 51             LDA B  ONES
1886   DD0A D7 50             STA B  TENS
1887   DD0C 97 51             STA A  ONES
1888   DD0E 39                RTS
1889
1890   DD0F CE 0000  ZEREAD   LDX    #0
1891   DD12 DF 4F             STX    HUNS
1892   DD14 DF 50             STX    TENS
1893   DD16 8D 9A             BSR    TNUM
1894   DD18 25 0F             BCS    *+16
1895   DD1A 97 51             STA A  ONES
1896   DD1C 8D 98             BSR    TNUM1
1897   DD1E 25 08             BCS    *+10
1898   DD20 8D E2             BSR    MPYTEN
1899   DD22 8D 92             BSR    TNUM1
```

```
1900   DD24 25 02           BCS      *+4
1901   DD26 8D DC           BSR      MPYTEN
1902   DD28 39              RTS
1903                  *
1904                  *
1905                  *
1906                  *
1907   DD29 8D E4    RDN2   BSR      ZEREAD
1908   DD2B 4F              CLR  A
1909   DD2C D6 4F           LDA  B   HUNS
1910   DD2E 5D              TST  B
1911   DD2F 27 05           BEQ      *+7
1912   DD31 8B 64           ADD  A   #100
1913   DD33 5A              DEC  B
1914   DD34 20 F8           BRA      *-6
1915   DD36 D6 50           LDA  B   TENS
1916   DD38 5D              TST  B
1917   DD39 27 05           BEQ      *+7
1918   DD3B 8B 0A           ADD  A   #10
1919   DD3D 5A              DEC  B
1920   DD3E 20 F8           BRA      *-6
1921   DD40 D6 51           LDA  B   ONES
1922   DD42 5D              TST  B
1923   DD43 27 04           BEQ      *+6
1924   DD45 4C              INC  A
1925   DD46 5A              DEC  B
1926   DD47 20 F9           BRA      *-5
1927   DD49 39              RTS
1928
1929                  *
1930                  *
1931                  *
1932                  *
1933   DD4A 8D C3    RDN3   BSR      ZEREAD
1934   DD4C 4F              CLR  A
1935   DD4D D6 4F           LDA  B   HUNS
1936   DD4F 5D              TST  B
1937   DD50 27 05           BEQ      *+7
1938   DD52 8B 32           ADD  A   #50
1939   DD54 5A              DEC  B
1940   DD55 20 F8           BRA      *-6
1941   DD57 D6 50           LDA  B   TENS
1942   DD59 5D              TST  B
1943   DD5A 27 05           BEQ      *+7
1944   DD5C 8B 05           ADD  A   #5
1945   DD5E 5A              DEC  B
1946   DD5F 20 F8           BRA      *-6
1947   DD61 D6 51           LDA  B   ONES
1948   DD63 54              LSR  B
1949   DD64 5D              TST  B
1950   DD65 27 04           BEQ      *+6
1951   DD67 4C              INC  A
1952   DD68 5A              DEC  B
1953   DD69 20 F9           BRA      *-5
1954   DD6B 39              RTS
1955
1956                  *
1957                  *
1958                  *
1959   DD6C D6 68    RDLNUM LDA  B   ICMD
1960   DD6E C4 1F           AND  B   #$1F
1961   DD70 C1 0F           CMP  B   #15
1962   DD72 23 06           BLS      RDN3
1963                  *
1964                  *
1965   DD74 8D 99           BSR      ZEREAD
```

```
1966   DD76 96 51          LDA A   ONES
1967   DD78 8B 02          ADD A   #2
1968   DD7A 19             DAA
1969   DD7B 16             TAB
1970   DD7C C4 0F          AND B   #$F
1971   DD7E D7 51          STA B   ONES
1972   DD80 0C             CLC
1973   DD81 84 F0          AND A   #$F0
1974   DD83 27 01          BEQ     *+3
1975   DD85 0D             SEC
1976   DD86 96 50          LDA A   TENS
1977   DD88 89 01          ADC A   #1
1978   DD8A 19             DAA
1979   DD8B 16             TAB
1980   DD8C C4 0F          AND B   #$F
1981   DD8E D7 50          STA B   TENS
1982   DD90 0C             CLC
1983   DD91 84 F0          AND A   #$F0
1984   DD93 27 01          BEQ     *+3
1985   DD95 0D             SEC
1986   DD96 96 4F          LDA A   HUNS
1987   DD98 89 05          ADC A   #5
1988   DD9A 19             DAA
1989   DD9B 84 0F          AND A   #$F
1990   DD9D 97 4F          STA A   HUNS
1991   DD9F 20 AB          BRA     RDN3+2
1992                   *
1993                   *
1994                   *
1995                   *
1996   DDA1 96 68  RDNAMP  LDA A   TCMD
1997   DDA3 84 1F          AND A   #$1F
1998   DDA5 81 09          CMP A   #9
1999   DDA7 23 8D          BLS     RDN2
2000   DDA9 81 13          CMP A   #19
2001   DDAB 23 9D          BLS     RDN3
2002
2003                   *
2004                   *
2005                   *
2006                   *
2007   DDAD BD DD0F RDN4   JSR     ZEREAD
2008   DDB0 4F             CLR A
2009   DDB1 D6 4F          LDA B   HUNS
2010   DDB3 5D             TST B
2011   DDB4 27 05          BEQ     *+7
2012   DDB6 8B 19          ADD A   #25
2013   DDB8 5A             DEC B
2014   DDB9 20 FB          BRA     *-6
2015   DDBB D6 50          LDA B   TENS
2016   DDBD 54             LSR B
2017   DDBE 5D             TST B
2018   DDBF 27 05          BEQ     *+7
2019   DDC1 8B 05          ADD A   #5
2020   DDC3 5A             DEC B
2021   DDC4 20 FB          BRA     *-6
2022   DDC6 D6 50          LDA B   TENS
2023   DDC8 54             LSR B
2024   DDC9 24 06          BCC     *+8
2025   DDCB D6 51          LDA B   ONES
2026   DDCD CB 0A          ADD B   #10
2027   DDCF 20 02          BRA     *+4
2028   DDD1 D6 51          LDA B   ONES
2029   DDD3 54             LSR B
2030   DDD4 54             LSR B
```

```
2031   DDD5 5D              TST  B
2032   DDD6 27 04           BEQ  *+6
2033   DDD8 4C              INC  A
2034   DDD9 5A              DEC  B
2035   DDDA 20 F9           BRA  *-5
2036   DDDC 39              RTS
2037
2038                  *
2039                  *
2040                  *
2041                  *
2042                  *
2043                  *
2044                  *
2045                  *
2046                  *
2047                  *
2048                  *
2049                  *
2050                  *
2051                  *
2052                  *
2053                  *
2054                  *
2055                  *
2056                  *
2057                  *
2058                  *
2059   DDDD CE 63B6  RAMP    LDX  #RAMPM
2060   DDE0 6F 00            CLR  0,X
2061   DDE2 08              INX
2062   DDE3 8C 63C2          CPX  #RAMPM+12
2063   DDE6 26 F8            BNE  *-6
2064   DDE8 CE 63B6          LDX  #RAMPM
2065   DDEB A7 03            STA  A  3,X
2066   DDED A6 0D            LDA  A  13,X
2067   DDEF 26 03            BNE  *+5
2068   DDF1 4C              INC  A
2069   DDF2 6F 0C            CLR  12,X
2070   DDF4 5F              CLR  B
2071   DDF5 6D 0C            TST  12,X
2072   DDF7 26 18            BNE  TIM360
2073                  *
2074                  *
2075                  *
2076                  *
2077   DDF9 48       TIM36   ASL  A
2078   DDFA 59              ROL  B
2079   DDFB 48              ASL  A
2080   DDFC 59              ROL  B
2081   DDFD A7 02            STA  A  2,X
2082   DDFF E7 01            STA  B  1,X
2083   DE01 48              ASL  A
2084   DE02 59              ROL  B
2085   DE03 48              ASL  A
2086   DE04 59              ROL  B
2087   DE05 48              ASL  A
2088   DE06 59              ROL  B
2089   DE07 AB 02            ADD  A  2,X
2090   DE09 A7 02            STA  A  2,X
2091   DE0B E9 01            ADC  B  1,X
2092   DE0D F7 01            STA  B  1,X
2093   DE0F 20 3F            BRA  DIVLP-2
2094                  *
2095                  *
2096                  *
```

```
2097
2098  DE11 A7 01    TIM360  STA  A  1,X
2099  DE13 48               ASL  A
2100  DE14 59               ROL  B
2101  DE15 48               ASL  A
2102  DE16 59               ROL  B
2103  DE17 48               ASL  A
2104  DE18 59               ROL  B
2105  DE19 36               PSH  A
2106  DE1A 37               PSH  B
2107  DE1B AB 02            ADD  A  2,Y
2108  DE1D A7 02            STA  A  2,Y
2109  DE1F E9 01            ADC  B  1,X
2110  DE21 E7 01            STA  B  1,X
2111  DE23 24 02            BCC     *+4
2112  DE25 6C 00            INC     0,X
2113  DE27 33               PUL  B
2114  DE28 32               PUL  A
2115  DE29 48               ASL  A
2116  DE2A 59               ROL  B
2117  DE2B 48               ASL  A
2118  DE2C 59               ROL  B
2119  DE2D 36               PSH  A
2120  DE2E 37               PSH  B
2121  DE2F AB 02            ADD  A  2,Y
2122  DE31 A7 02            STA  A  2,Y
2123  DE33 E9 01            ADC  B  1,X
2124  DE35 E7 01            STA  B  1,X
2125  DE37 24 02            BCC     *+4
2126  DE39 6C 00            INC     0,X
2127  DE3B 33               PUL  B
2128  DE3C 32               PUL  A
2129  DE3D 48               ASL  A
2130  DE3E 59               ROL  B
2131  DE3F 36               PSH  A
2132  DE40 37               PSH  B
2133  DE41 AB 02            ADD  A  2,Y
2134  DE43 A7 02            STA  A  2,Y
2135  DE45 E9 01            ADC  B  1,X
2136  DE47 E7 01            STA  B  1,X
2137  DE49 24 02            BCC     *+4
2138  DE4B 6C 00            INC     0,X
2139  DE4D 33               PUL  B
2140  DE4E 32               PUL  A
2141
2142                     *
2143                     *
2144                     *
2145  DE4F C6 11            LDA  B  #17
2146  DE51 A6 02    DIVLP   LDA  A  2,X
2147  DE53 A0 05            SUB  A  5,Y
2148  DE55 A7 08            STA  A  8,X
2149  DE57 A6 01            LDA  A  1,X
2150  DE59 A2 04            SBC  A  4,X
2151  DE5B A7 07            STA  A  7,X
2152  DE5D A6 00            LDA  A  0,X
2153  DE5F A2 03            SBC  A  3,X
2154  DE61 A7 06            STA  A  6,X
2155  DE63 25 13            BCS     NOSET
2156  DE65 A7 00            STA  A  0,X
2157  DE67 A6 07            LDA  A  7,X
2158  DE69 A7 01            STA  A  1,X
2159  DE6B A6 08            LDA  A  8,X
2160  DE6D A7 02            STA  A  2,X
2161  DE6F 0D               SEC
```

```
2162  DE70 69 0B              ROL     11,X
2163  DE72 69 0A              ROL     10,X
2164  DE74 69 09              ROL     9,X
2165  DE76 20 07              BRA     NOSET+7
2166  DE78 0C       NOSET     CLC
2167  DE79 69 0B              ROL     11,X
2168  DE7B 69 0A              ROL     10,X
2169  DE7D 69 09              ROL     9,X
2170  DE7F 64 03              LSR     3,X
2171  DE81 66 04              ROR     4,X
2172  DE83 66 05              ROR     5,X
2173  DE85 5A                 DEC  B
2174  DE86 26 C9              BNE     DIVLP
2175  DE88 E6 0B              LDA  B  11,X
2176  DE8A B6 63BF  RAMPA     LDA  A  RAMPM+9
2177  DE8D B7 63BC            STA  A  RAMPM+6
2178  DE90 FE 63C0            LDX     RAMPM+10
2179  DE93 FF 63BD            STX     RAMPM+7
2180  DE96 39                 RTS
2181
2182                  *
2183                  *
2184                  *
2185  DE97                    FDB     PGMRAM+6
2186  DE99                    FDB     PGMRAM+2
2187  DE9B          CANPGM    FDB     PGMRAM
2188  DE9D                    FDB     CANEND
2189  DE9F                    FCB     1,1,1,1,1,1
2190        DEA5    CANEND    EQU     *
2191  DEA5 BD 0000            JSR     START0
2192  DEA8 BD D73A            JSR     KEYLED
2193  DEAB BD DC07            JSR     LINEIN
2194  DEAE 20 F8              BRA     *-6
2195                          END
0  ERROR(S) DETECTED IN PASS 2
```

LISTING NO. 2

USER CODE

```
010     F 1  200       REVERSE TURNTABLE 100% ($ <F 1 200>)
012     P 2   2        TEST INDEX (LOCAL SWITCH #2)
014     C 3  12        IF OPEN GO TO LINE 12
016     P 2   2        TEST INDEX
018     C 2  16        IF CLOSED GO TO LINE 16
020     L 1    .2      DELAY .2 SECONDS
022     F 1  100       FORWARD TURNTABLE 100% ($ <F 1 100>)
024     P 2   2        TEST INDEX
026     C 3  24        IF OPEN GO TO LINE 24
028     F 1   0        STOP TURNTABLE ($ <F 1   0>)
030     Y 2   4        LOWER MIG TORCH (CLOSE RELAY #4)
032     P 2   1        TEST TORCH IN POSITION (SWITCH #1)
034     C 3  32        IF OPEN GO TO LINE 32
036     Y 2   5        SWITCH MIG GAS ON (CLOSE RELAY #5)
038     L 1   4.0      DELAY 4 SECONDS (PREFLOW TIME)
040     Y 2   6        SWITCH WIRE ON (CLOSE RELAY #6)
042     L 3    .2      DEFINE RAMP TIME .2 SECONDS
044     U 1   5.0      SET 5 VOLTS
046     Y 2   3        SWITCH OSCILLATOR ON (CLOSE RELAY #3)
048     C 9  48        TEST ARC IF CURRENT = 0 RETRY START
050     U 3  22        RAMP TO 22.0 VOLTS
052     F 1  26        TURNTABLE FORWARD 26% ($ <F 1  26>)
```

LISTING NO. 3

MIG WELD (START CV CHANGE DURING WELD TO CC)

| LINE NUMBER | COMMAND | OPERAND |
|---|---|---|
| 334 | Y02 | |
| 335 | | 004 |
| 336 | P02 | |
| 337 | | 001 |
| 338 | C03 | |
| 339 | | 336 |
| 340 | Y02 | |
| 341 | | 005 |
| 342 | L01 | |
| 343 | | 02.0 |
| 344 | Y02 | |
| 345 | | 006 |
| 346 | L03 | |
| 347 | | 00.2 |
| 348 | U01 | |
| 349 | | 05.0 |
| 350 | Y02 | |
| 351 | | 003 |
| 352 | C09 | |
| 353 | | 352 |
| 354 | U03 | |
| 355 | | 19.0 |
| 356 | L01 | |
| 357 | | 01.0 |
| 358 | F01 | |
| 359 | | 026 |
| 360 | L11 | |
| 361 | | 060 |
| 362 | A01 | |
| 363 | | 125 |
| 364 | L11 | |
| 365 | | 060 |
| 366 | F01 | |
| 367 | | 000 |
| 368 | L01 | |
| 369 | | 01.5 |
| 370 | Y02 | |
| 371 | | 016 |
| 372 | L03 | |
| 373 | | 00.3 |
| 374 | A02 | |
| 375 | | 000 |
| 376 | Y02 | |
| 377 | | 013 |
| 378 | L01 | |
| 379 | | 04.0 |
| 380 | Y02 | |
| 381 | | 015 |
| 382 | Y02 | |
| 383 | | 014 |
| 384 | H02 | |
| 385 | | 000 |

LISTING NO. 4

TIG TOUCH START

| LINE NUMBER | COMMAND | OPERAND | |
|---|---|---|---|
| 000 | H08 | | BACKGROUND OFF |
| 001 | | 000 | |
| 002 | U01 | | SET VOLTS 0 |
| 003 | | 00.0 | |
| 004 | Y02 | | SWITCH TIG TORCH DOWN |
| 005 | | 008 | |
| 006 | Y02 | | SWITCH TIG GAS ON |
| 007 | | 002 | |
| 008 | Y02 | | SWITCH TIG-TOUCH ON |
| 009 | | 007 | |
| 010 | U01 | | SET VOLTS 1 |
| 011 | | 01.0 | |
| 012 | C09 | | IF ARC FAIL RE-TRY |
| 013 | | 012 | |
| 014 | H08 | | BACKGROUND ON |
| 015 | | 001 | |
| 016 | A01 | | SET AMPS 1 |
| 017 | | 001 | |
| 018 | L01 | | DELAY .3 SECONDS |
| 019 | | 00.3 | |
| 020 | Y02 | | SWITCH TIG TOUCH OFF |
| 021 | | 017 | |
| 022 | U04 | | COMPARE VOLTS TO 5 |
| 023 | | 05.0 | |
| 024 | C06 | | IF LESS GO TO COMPARE |
| 025 | | 022 | |
| 026 | A01 | | SET AMPS 50 |
| 027 | | 050 | |
| 028 | L01 | | DELAY .6 SECONDS |
| 029 | | 00.6 | |
| 030 | U04 | | COMPARE VOLTS TO 40 |
| 031 | | 40.0 | |
| 032 | C05 | | IF GREATER GO TO START |
| 033 | | 000 | |
| 034 | L03 | | SET RAMP TIME 1 SECOND |
| 035 | | 01.0 | |
| 036 | A03 | | RAMP AMPS & WAIT TO 175 |
| 037 | | 175 | |

What is claimed is:

1. A microprocessor-controlled arc-welding apparatus, comprising:

a three-phase transformer, the three phase transformer having at least one primary winding and having three secondary windings, the primary winding being adapted for coupling to a source of alternating current ("AC") electrical energy, each secondary winding being connected to a common ground lead;

at least three silicon controlled rectifiers ("SCR's"), each SCR being connected between a secondary winding of the three-phase transformer and a common welding lead having a common direct current ("DC") polarity, each SCR being responsive to a gating signal to rectify an AC signal applied to its associated secondary winding by conducting direct current during a portion of an AC phase when the SCR is forward biased subsequent to the point in time when the gating signal enables the SCR, the SCR's being mutually cooperable to generate a welding signal between the common welding lead and the common ground lead, the welding signal having a DC voltage with an average magnitude which is determined by the portion of the AC phase that the SCRs are enabled by the gating signal;

a sensor coupled to the common welding lead for directly sensing the welding signal;

an input/output controller, the input/output controller being coupled to the sensor, the input/output controller being coupled to the SCR's;

a memory; and, a microprocessor, the microprocessor being coupled to the input/output controller and to the memory, the microprocessor being adapted to read welding data signals from the sensor through the input/output controller, the microprocessor, in accordance with a program stored in the memory, being operable to compare the welding data signals from the sensor with control data in memory, the microprocessor being operable to signal the SCRs and provide gating signals in accordance with a program stored in memory which enables the SCRs for a portion of the AC phase so that the welding signal has a DC voltage which is determined by the microprocessor;

the microprocessor-controlled welding apparatus being capable of welding in a plurality of selectable arc-welding modes by selecting an appropriate program in memory, the microprocessor-controlled welding apparatus being capable of changing between a constant current mode and a constant voltage mode without rewiring the apparatus.

2. The microprocessor-controlled welding apparatus according to claim 1, further comprising:

a table stored in memory adapted to quickly permit the microprocessor to determine a proper gating signal for the SCR's, the table comprising a plurality of predetermined SCR gating parameters stored in memory locations;

the microprocessor being operable to read a first welding data signal and to record a first welding data parameter in memory based upon the first welding data signal;

the microprocessor being operable to read a second welding data signal at a point in time after the first welding data signal is read, the microprocessor being operable to record a second welding data parameter in memory based upon the second welding data signal;

the microprocessor being operable to compute a first derivative parameter indicating the rate of change of the welding signal by subtracting the first welding data parameter from the second welding data parameter;

the microprocessor being operable to compute a difference parameter indicating the extent to which the sensed welding signal fails to conform with program control by subtracting the second welding data parameter from a control parameter selected by the microprocessor from control data in memory;

the microprocessor being operable to look up a memory location in the table determined by the difference parameter and the first derivative parameter, such memory location containing a predetermined SCR gating parameter stored therein, the predetermined SCR gating parameter being representative of gating control to be applied to the SCR's based upon the extent to which the sensed welding signal fails to conform with program control and the rate of change of the welding signal; and the microprocessor being operable to signal the SCR's and to provide gating signals determined from the predetermined SCR gating parameter.

3. The microprocessor-controlled welding apparatus according to claim 2, further comprising:

an SCR control circuit, the SCR control circuit being connected between the input/output controller and the SCRs, the SCR control circuit including timers responsive to a SCR gating parameter for determining a delay for gating signals applied to the SCRs, each SCR having a timer associated therewith, the SCR control circuit being operable to signal the SCRs by generating a gating signal for each SCR after a delay determined by the time associated with each SCR.

4. The microprocessor-controlled welding apparatus according to claim 3, further comprising:

a background voltage supply coupled to the common welding lead and the common ground lead, for providing a background voltage between the common welding lead and the common ground lead during selected periods of time that a welding signal is not being generated, the background voltage supply being responsive to signals from the microprocessor to selectively provide said background voltage.

5. The microprocessor-controlled welding apparatus according to claim 4, further comprising:

a weld function control circuit coupled to the input/output controller, the weld function control circuit being adapted for selectively controlling weld functions such as wire feed, gas flow and background voltage in response to signals from the microprocessor.

6. The microprocessor-controlled welding apparatus according to claim 1, further comprising:

an input/output data port coupled to the microprocessor for providing direct communication of digital data to an external digital device.

7. The microprocessor-controlled welding apparatus according to claim 6, further comprising in combination:

a digital computer coupled to the input/output data port, the digital computer being capable of controlling the microcomputer-controlled welding apparatus.

8. The microprocessor-controlled welding apparatus according to claim 6, further comprising in combination:

a welding robot coupled to the input/output data port, the welding robot being responsive to signals from the microprocessor to perform steps in a welding sequence.

9. The microprocessor-controlled welding apparatus according to claim 3, further comprising:

a printer coupled to the input/output controller, the printer being responsive to signals from the microprocessor to print out quality control data concerning welding operations.

10. The microprocessor-controlled welding apparatus according to claim 3, further comprising:

a synchronization circuit coupled to a winding of the three-phase transformer, the synchronization circuit including a phase locked loop and a polarity detector adapted to detect the polarity of an AC signal applied to such winding, the phase locked loop being locked to said AC signal, the synchronization circuit including a timer which is initiated responsive to detection of a first zero crossing of a reference signal generated by the phase locked loop, the synchronization circuit being adapted to detect a second zero crossing of said reference signal, the synchronization circuit being operable to compute a measure of the elapsed time between cycles of the phase locked loop, by measuring the elapsed time between the first zero crossing and the second zero crossing, the synchronization circuit being operable to divide the measure of such elapsed time into equal periods corresponding to the number of SCR's and to generate synchronization signals which are coupled to the SCR control circuit;

the SCR control circuit being operable to generate a gating signal for each SCR responsive to a corresponding synchronization signal, such gating signal being generated after a delay determined by an SCR gating parameter provided by the microprocessor; and the synchronization circuit being operable to recompute the timing of said synchronization signals during subsequent cycles of said AC signal to synchronize the timing of gating signals for SCRs despite variations in the frequency of said AC signal.

11. The microprocessor-controlled welding apparatus according to claim 10, wherein the three secondary windings of the three-phase transformer have a center-tap connected to the common ground lead, and further comprising three additional SCRs, each additional SCR being connected to an end of a secondary winding opposite from one of the first three SCRs.

12. A method of controlling a welding apparatus, comprising the steps of:

sensing a first welding sample using a circuit that produces a signal indicative of welding current or voltage;

sensing a second welding sample at a later time using the circuit that produces a signal indicative of welding current or voltage;

computing a first derivative parameter using a processor by subtracting the first welding sample from the second welding sample;

computing a difference parameter using a processor by subtracting the second welding sample from a predetermined control parameter;

looking up an adjustment parameter from a table of predetermined parameters where the table of predetermined parameters contains a predetermined parameter corresponding to each of a range of first derivative parameters and to each of a range of difference parameters; and, adjusting elements controlling welding current or voltage, responsive to the adjustment parameter obtained from the table.

13. The method according to claim 12, further comprising the step of:

synchronizing with an alternating current used to supply power for welding by determining the frequency of the alternating current using a phase locked loop, and by determining the phase error of the phase locked loop using a zero crossing detector.

14. The method according to claim 13, wherein the step of adjusting elements controlling welding current or voltage is performed by firing silicon controlled rectifiers, each at a time delay offset from the beginning of the cycle of an alternating signal produced by the phase locked loop by a time determined by the adjustment parameters, connected by the amount equal to the phase error that the alternating signal produced by the phase locked loop is offset from the alternating current used to supply power for welding, the phase error being determined by a zero crossing detector.

15. The microprocessor-controlled welding apparatus according to claim 2, further comprising:

an inductor, the inductor being connected in series between the SCR's and the common welding lead, the inductor operating to tend to smooth the rectified direct current produced by the SCR's.

16. The microprocessor-controlled welding apparatus according to claim 15, further comprising:

a diode, the diode being connected between the common ground lead and the common welding lead.

17. The microprocessor-controlled welding apparatus according to claim 16, further comprising:

a capacitor, the capacitor being connected between the common ground lead and the common welding lead.

18. The microprocessor-controlled welding apparatus according to claim 2, further comprising:

a user program interpreter stored in memory for interpreting software user program commands which may be supplied by an operator, the interpreter providing the microprocessor-controlled welding apparatus with a capability of changing between a constant current mode and a constant voltage mode under program control in response to software user program commands.

19. A microprocessor-controlled welding apparatus, comprising:

a three-phase transformer, the three-phase transformer having at least one primary winding and having three secondary windings, the primary winding being adapted for coupling to a source of alternating current ("AC") electrical energy;

at least three solid state switching devices, each solid state switching device being connected between a secondary winding of the three-phase transformer and a first common welding lead, each switching device being responsive to a gating signal to rectify an AC signal applied to its associated secondary winding by conducting direct current during a portion of an AC phase after the gating signal fires the switching device, the switching device being mutually cooperable to generate a welding signal between the first common welding lead and a second welding lead coupled to the secondary windings of the three-phase transformer, the welding signal having a direct current voltage with an average magnitude which is determined by the portion of the AC phase that the switching devices are fired by the gating signal;

a sensor coupled to the first common welding lead for directly sensing the welding signal;

an input/output controller, the input/output controller being coupled to the sensor, the input/output controller being coupled to the switching devices;

a memory;

a microprocessor, the microprocessor being coupled to the input/output controller and to the memory, the microprocessor being adapted to lead welding data signals from the sensor through the input/output controller, the microprocessor, in accordance with a program stored in memory, being operable to compare the welding data signals from the sensor with control data in memory, the microprocessor being operable to signal the switching devices and to provide gating signals in accordance with a program stored in memory which fire the switching devices for a portion of the AC phase so that the welding signal has a direct current voltage which is determined by the microprocessor;

the microprocessor being operable to read a first welding data signal and to record a first welding data parameter in memory based upon the first welding data signal;

the microprocessor being operable to read a second welding data signal at a later point in time, the microprocessor being operable to record a second welding data parameter in memory based upon the second welding data signal;

the microprocessor being operable to compute an error parameter indicating the extent to which the sensed welding signal fails to conform with program control by subtracting the second welding data parameter from a control parameter selected by the microprocessor from control data in memory;

the microprocessor being operative to compute a first derivative parameter indicating the rate of change of the welding signal by subtracting the first welding data parameter from the second welding data parameter;

the microprocessor being operative to look up a memory location in a table stored in memory containing a plurality of predetermined gating parameters stored in memory locations, the table being adapted to quickly permit the microprocessor to determine a proper gating signal for the switching devices, the memory location in the table being determined by both the error parameter and the first derivative parameter, the memory location containing a predetermined gating parameter representative of gating control to be applied to the switching devices based upon the extent to which the sensed welding signal fails to conform with program control and the rate of change of the welding signal; and, the microprocessor being operative to signal the switching device and to provide firing signals determined from the predetermined gating parameter obtained from the table.

20. The microprocessor-controlled welding apparatus according to claim 19, further comprising:

a synchronization circuit coupled to a winding of the three-phase transformer, the synchronization circuit including a phase locked loop and a zero crossing detector, the phase locked loop being operative to prove an indication of the frequency of the source of AC electrical energy, the zero crossing detector being operative to detect the phase error of the phase locked loop compared with the source of AC electrical energy, the synchronization circuit being operative to compute a measure of the elapsed time between cycles of the phase locked loop which may be divided into equal periods corresponding to the number of solid state switching devices, the synchronization circuit being operative to generate signals which may be used for firing the switching devices in synchronization with the source of AC electrical energy.

* * * * *

UNITED STATES PATENT AND TRADEMARK OFFICE
CERTIFICATE OF CORRECTION

PATENT NO. : 4,561,059                               Page 1 of 2

DATED      : December 24, 1985

INVENTOR(S) : Clint A. Davis and Melvin P. Trail

It is certified that error appears in the above-identified patent and that said Letters Patent is hereby corrected as shown below:

Column 6, line 21, change "The" to -- This --.

Column 7, line 66, after "frequency" insert -- reference --.

Column 16, line 46, change "reads to" to -- reads the --.

Column 18, lines 4-5, change "tripper" to -- trigger --.

Column 19, line 12, change "determmes" to --determines --.

Column 23, line 53, after "reached" insert a period.

Column 24, line 58, change "(0-255')" to -- (0-255).

Column 25, line 35, before ""U"" insert -- The --.

Column 26, line 45, after "372-375." insert -- The command "Y02 013" switches the oscillator off. --.

Column 27, line 31, change "top" to -- tip --.

UNITED STATES PATENT AND TRADEMARK OFFICE
CERTIFICATE OF CORRECTION

PATENT NO. : 4,561,059

DATED : December 24, 1985

INVENTOR(S) : Clint A. Davis and Melvin P. Trail

It is certified that error appears in the above-identified patent and that said Letters Patent is hereby corrected as shown below:

Column 28, line 19, after "weld start" insert a period.

Column 31, line 1, change "insert" to -- inert --.

Signed and Sealed this

Twenty-second Day of April 1986

[SEAL]

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,561,059

DATED : December 24, 1985

INVENTOR(S) : Clint A. Davis and Melvin P. Trail

It is certified that error appears in the above—identified patent and that said Letters Patent is hereby corrected as shown below:

Column 4, line 57, after "withdrawing", delete -- of --.

Signed and Sealed this

Twenty-seventh Day of May 1986

[SEAL]

Attest:

DONALD J. QUIGG

Attesting Officer

Commissioner of Patents and Trademarks